(12) United States Patent
Orumchian et al.

(10) Patent No.: US 9,940,374 B2
(45) Date of Patent: Apr. 10, 2018

(54) PROVIDING FEEDBACK IN A OPERATING PLAN DATA AGGREGATION SYSTEM

(75) Inventors: Kim Orumchian, Santa Clara, CA (US); Art Stabenow, Santa Clara, CA (US); Dean Skelton, Santa Clara, CA (US); David Petiot, Santa Clara, CA (US)

(73) Assignee: RIGHT90, INC., Austin, TX (US)

( * ) Notice: Subject to any disclaimer, the term of this patent is extended or adjusted under 35 U.S.C. 154(b) by 847 days.

(21) Appl. No.: 11/116,123

(22) Filed: Apr. 26, 2005

(65) Prior Publication Data

US 2006/0287908 A1    Dec. 21, 2006

Related U.S. Application Data

(60) Provisional application No. 60/565,758, filed on Apr. 26, 2004.

(51) Int. Cl.
| | |
|---|---|
| *G06Q 30/00* | (2012.01) |
| *G06F 17/30* | (2006.01) |
| *G06Q 10/04* | (2012.01) |
| *G06Q 10/06* | (2012.01) |
| *G06Q 30/02* | (2012.01) |
| *G06Q 30/06* | (2012.01) |
| *G06Q 40/04* | (2012.01) |

(52) U.S. Cl.
CPC .. *G06F 17/30563* (2013.01); *G06F 17/30321* (2013.01); *G06F 17/30592* (2013.01); *G06Q 10/04* (2013.01); *G06Q 10/063* (2013.01); *G06Q 10/0631* (2013.01); *G06Q 30/02* (2013.01); *G06Q 30/0202* (2013.01); *G06Q 30/06* (2013.01); *G06Q 40/04* (2013.01); *G06F 2216/03* (2013.01); *Y10S 707/99933* (2013.01); *Y10S 707/99956* (2013.01)

(58) Field of Classification Search
None
See application file for complete search history.

(56) References Cited

U.S. PATENT DOCUMENTS

| | | | | |
|---|---|---|---|---|
| 5,712,985 | A | * | 1/1998 | Lee et al. .................. 705/7 |
| 5,819,232 | A | * | 10/1998 | Shipman .................. 705/8 |
| 5,873,097 | A | | 2/1999 | Harris et al. |
| 5,920,854 | A | | 7/1999 | Kirsch et al. |
| 5,926,820 | A | | 7/1999 | Agrawal et al. |

(Continued)

FOREIGN PATENT DOCUMENTS

WO    WO-0111497 A1    2/2001

OTHER PUBLICATIONS

"Bass Diffusion 1969" downloaded from Wikipedia on Jun. 30, 2015.*

(Continued)

*Primary Examiner* — Susanna M. Diaz
*Assistant Examiner* — George H Walker, III

(57) ABSTRACT

In one embodiment, a method is provided. The method includes receiving forecast information from sales people in a computer. The method further includes receiving comments on specific entries of the forecast information from non-sales people in the computer. The method also includes receiving changes of the forecast information from the non-sales people in the computer. The method additionally includes providing a display of the comments and the changes to the sales people in an interface to the computer.

48 Claims, 47 Drawing Sheets

(56) References Cited

U.S. PATENT DOCUMENTS

| | | | |
|---|---|---|---|
| 6,092,090 A * | 7/2000 | Payne | G06Q 10/10 715/234 |
| 6,094,651 A | 7/2000 | Agrawal et al. | |
| 6,108,647 A | 8/2000 | Poosala et al. | |
| 6,317,685 B1 | 11/2001 | Ran | |
| 6,317,686 B1 | 11/2001 | Ran | |
| 6,366,905 B1 | 4/2002 | Netz | |
| 6,408,292 B1 | 6/2002 | Backalash et al. | |
| 6,430,565 B1 | 8/2002 | Berger et al. | |
| 6,629,102 B1 | 9/2003 | Malloy et al. | |
| 6,671,715 B1 | 12/2003 | Langseth et al. | |
| 6,766,325 B1 | 7/2004 | Pasumansky et al. | |
| 6,775,675 B1 | 8/2004 | Nwabueze et al. | |
| 6,901,536 B2 | 5/2005 | Davenport | |
| 6,980,980 B1 | 12/2005 | Yeh | |
| 7,003,560 B1 | 2/2006 | Mullen | |
| 7,149,736 B2 | 12/2006 | Chkodrov et al. | |
| 7,260,513 B2 | 8/2007 | Petralescu et al. | |
| 7,272,660 B1 | 9/2007 | Powers et al. | |
| 7,370,001 B2 * | 5/2008 | Harris | G06Q 10/06315 705/7.25 |
| 7,590,554 B2 * | 9/2009 | Chen | G06Q 10/06 705/7.11 |
| 7,805,383 B2 * | 9/2010 | Veit | G06Q 10/087 705/1.1 |
| 7,904,327 B2 | 3/2011 | Phelan et al. | |
| 8,086,607 B2 | 12/2011 | Orumchian et al. | |
| 8,938,453 B2 | 1/2015 | Lewak | |
| 2001/0013004 A1 | 8/2001 | Haris et al. | |
| 2002/0065697 A1 * | 5/2002 | Cautley et al. | 705/7 |
| 2002/0116348 A1 * | 8/2002 | Phillips et al. | 705/400 |
| 2002/0143604 A1 * | 10/2002 | Cox et al. | 705/10 |
| 2002/0144174 A1 * | 10/2002 | Nwabueze | G06F 17/30867 714/1 |
| 2002/0173997 A1 | 11/2002 | Menard et al. | |
| 2002/0178077 A1 | 11/2002 | Katz et al. | |
| 2002/0198976 A1 | 12/2002 | Davenport | |
| 2003/0036944 A1 * | 2/2003 | Lesandrini | G06Q 30/02 705/7.32 |
| 2003/0046130 A1 * | 3/2003 | Golightly | G06Q 10/04 705/7.24 |
| 2003/0065663 A1 | 4/2003 | Chu | |
| 2003/0088540 A1 | 5/2003 | Edmunds et al. | |
| 2003/0130883 A1 * | 7/2003 | Schroeder et al. | 705/10 |
| 2003/0130884 A1 | 7/2003 | Michaluk | |
| 2003/0158795 A1 | 8/2003 | Markham et al. | |
| 2003/0172145 A1 | 9/2003 | Nguyen | |
| 2003/0195873 A1 | 10/2003 | Lewak et al. | |
| 2003/0204534 A1 | 10/2003 | Hopeman et al. | |
| 2003/0225768 A1 | 12/2003 | Chaudhuri et al. | |
| 2004/0078257 A1 | 4/2004 | Schweitzer et al. | |
| 2004/0093296 A1 | 5/2004 | Phelan et al. | |
| 2004/0128202 A1 * | 7/2004 | Baum et al. | 705/22 |
| 2004/0162768 A1 * | 8/2004 | Snyder et al. | 705/28 |
| 2004/0193576 A1 | 9/2004 | Petculescu et al. | |
| 2005/0044197 A1 | 2/2005 | Lai | |
| 2005/0071320 A1 * | 3/2005 | Chkodrov | G06F 17/30489 |
| 2005/0086246 A1 | 4/2005 | Wood et al. | |
| 2005/0267871 A1 | 12/2005 | Marchisio et al. | |
| 2006/0168006 A1 | 7/2006 | Shannon et al. | |
| 2006/0212362 A1 | 9/2006 | Donsbach et al. | |
| 2007/0265904 A1 | 11/2007 | Lindquist et al. | |
| 2009/0254532 A1 | 10/2009 | Yang et al. | |
| 2010/0121675 A1 * | 5/2010 | Charles | 705/10 |
| 2010/0241649 A1 | 9/2010 | Lewak et al. | |
| 2010/0287146 A1 | 11/2010 | Skelton et al. | |

OTHER PUBLICATIONS

Rajesh Gadodia, Right in Time, Intelligent Enterprise; Feb. 7, 2004.*
Co-pending U.S. Appl. No. 11/115,970, filed Apr. 26, 2005.
Co-pending U.S. Appl. No. 11/116,129, filed Apr. 26, 2005.
Co-pending U.S. Appl. No. 11/116,125, filed Apr. 26, 2005.
Co-pending U.S. Appl. No. 11/116,143, filed Apr. 26, 2005.
Co-pending U.S. Appl. No. 12/264,123, filed Nov. 3, 2008.
Notice of Allowance dated Jun. 8, 2009 in Co-pending U.S. Appl. No. 11/115,970, filed Apr. 26, 2005.
Notice of Allowance dated Apr. 2, 2009 in Co-pending U.S. Appl. No. 11/115,970, filed Apr. 26, 2005.
Notice of Allowance dated Feb. 25, 2009 in Co-pending U.S. Appl. No. 11/115,970, filed Apr. 26, 2005.
Notice of Allowance dated Jun. 26, 2008 in Co-pending U.S. Appl. No. 11/116,143, filed Apr. 26, 2005.
Final Office Action dated Jan. 7, 2010 in Co-pending U.S. Appl. No. 11/116,125, filed Apr. 26, 2005.
Non-Final Office Action dated Jun. 3, 2008 in Co-pending U.S. Appl. No. 11/115,970, filed Apr. 26, 2005.
Non-Final Office Action dated Aug. 9, 2007 in Co-pending U.S. Appl. No. 11/115,970, filed Apr. 26, 2005.
Non-Final Office Action dated Sep. 8, 2009 in Co-pending U.S. Appl. No. 11/116,129, filed Apr. 26, 2005.
Non-Final Office Action dated Mar. 16, 2009 in Co-pending U.S. Appl. No. 11/116,129, filed Apr. 26, 2005.
Non-Final Office Action dated Jan. 22, 2009 in Co-pending U.S. Appl. No. 11/116,125, filed Apr. 26, 2005.
Non-Final Office Action dated Oct. 16, 2007 in Co-pending U.S. Appl. No. 11/116,143, filed Apr. 26, 2005.
International Search Report of PCT Application No. PCT/US2005/014363, dated Oct. 24, 2005, 2 pages.
Written Opinion of PCT Application No. PCT/US2005/014363, dated Oct. 24, 2005, 3 pages.
Supplementary European Search Report of EP Application No. EP05742949.0, dated Mar. 24, 2009, 3 pages.
Australian Search Report of SG Application No. SG200717236-4, dated Jul. 16, 2009, 4 pages.
Supplementary Australian Search Report of SG Application No. SG200717236-4, dated Jul. 16, 2009, 5 pages.
Written Opinion of SG Application No. SG200717236-4, dated Sep. 17, 2009, 7 pages.
Train et al. "Microsoft SQL Server 2000 Analysis Services Step by Step" [Online] Sep. 6, 2000, Microsoft Press, XP002520184, Retrieved from the Internet: URL: http://proquest.safaribooksonline.com/0735609047/ch09lev1sec4, Retrieved on Mar. 19, 2009, Chapter 9, Processing Optimization, Working with Partitions, 13 pages.
Kennedy, "The Reality of Real-time OLAP"; Microsoft SQL 2000 Technical Articles, [Online] 2003, XP002520182, Retrieved from the Internet: URL:http://msdn.microsoft.com/en-us/library/aa902683(SQL.80,printer).aspx, Retrieved on Mar. 19, 2009, *the whole document *, 9 pages.
Laird et al., "Designing SQL Server 2000 Databases for .Net Enterprise Servers", [Online] Jan. 15, 2001, Syngress, XP002520185, Retrieved from the Internet: URL:http://www.google.com/books?id=oAD7HVhOBOAC, Retrieved on Mar. 19, 2009, * p. 22 *, 5 pages.
Ramamritham et al., "Report on DART '96: databases: active and real-time (concepts meet practice)", ACM Sigmod Record, [Online], vol. 26, No. 3, 1997, pp. 51-53, XP002520183, Retrieved from the Internet:URL:http://portal.acm/citation.cfm?id=262762.262769, Retrieved on Mar. 19, 2009, * the whole document *.
Oracle, Oracle OLAP Application Developer's Guide Release 9.2.0.4.1, Oct. 2003, Section 1 Overview, (retrieved on Jun. 24, 2009) retrieved from the Internet <download.oracle.com/products/bi/pdf/9204_olap_appdev_guide.pdf>—see in particular section "Using OLAP to Answer Business Questions" comparing sales, 412 pages.
Madsen, "Implementing Aggregates for a Dimensional Data Warehouse" (retrieved on Jun. 25, 2009), retrieved from the Internet <http://web.archive.org/web/20020413015621/http://clickstreamdatawarahousing.com/aggregate_article.html> published Apr. 13, 2002 as per Wayback Engine—see in particular section "Recreating Versus Updating Aggregates", 10 pages.
Co-pending U.S. Appl. No. 12/498,340, filed Jul. 6, 2009.
Examination Report dated Oct. 16, 2009, dated in European Application No. 05742949.0, pp. 1-5.

(56) References Cited

OTHER PUBLICATIONS

Response to Examination Report dated Oct. 16, 2009, as filed in European Application No. 05742949.0 on Feb. 26, 2010, pp. 1-10.
Summons to Attend Oral Proceedings dated Apr. 15, 2013, mailed in European Application No. 05742949.0, pp. 1-8.
Response to Summons to Attend Oral Proceedings dated Apr. 15, 2013, as filed in European Application No. 05742949.0 on Sep. 17, 2013, pp. 1-40.
Decision to Refuse dated Jul. 30, 2014, mailed in European Application No. 05742949.0, pp. 1-17.
Ground of Appeal in Response to Decision to Refuse dated Jul. 30, 2014, as filed in European Application No. 05742949.0 on Dec. 8, 2014, pp. 1-31.
First Office Action dated Mar. 5, 2012, mailed in Indian Application No. 3545/KOLNP/2006, pp. 1-2.
Response to First Office Action dated Mar. 5, 2012, as filed in Indian Application No. 3545/KOLNP/2006 on May 7, 2012, pp. 1-64.
Notice of Hearing dated Mar. 9, 2017, mailed in Indian Application No. 3545/KOLNP/2006, 1 page.

\* cited by examiner

| Right 90 | | | | | | | | | _ □ ⊠ |
|---|---|---|---|---|---|---|---|---|---|
| File Edit Tools Help | | | | | | | | | |
| Edit Submit  210 215 | | | | | | Current User  Kim Orumchian Forecast Status  UPDATING | | 205 | |

| | | | | | | | | | |
|---|---|---|---|---|---|---|---|---|---|
| F o r e c a s t   T r e e | Forecast Total | 16600 | ? | $262,700 | 18600 | ? | $307,700 | 192,433 | $4,451,941 |
| | − Kim Orumchain  220 | 16600 | ? | $262,700 | ? | ? | $307,700 | 192,433 | $4,451,941 |
| | − Intel  230 | 6700 | ? | $60,000 | 7100 | ? | $56,100 | 40,631 | $390.765 |
| C u s t o m e r s | − ML2722  240 | ? | ? | $27,000 | ? | ? | $33,600 | 24,300 | $145,800 |
| | Backlog | 4500 | $6 | $27,000 | 5600 | ? | ? | 24,300 | $145,800 |
| | Backlog [surplus/deficit] | 0 | $6.00 | $0 | 0 | $6.00 | $0 | 0 | $0 |
| 245 | Last Period Forecast | 4300 | $6 | $25,800 | 9200 | $6 | $18,200 | 10,900 | $65,400 |
| | % Change Current/Last | %5 | %0 | %5 | %75 | %0 | %75 | 122.94% | 122.94% |
| P r o d u c t s | + ML2723 | | | $33,000 | | | $22,500 | 16.331 | $244,965 |
| | 250 | | | | 260 | | | | 270 |

| CONNECTED TO: R90WEB1 | Current User  Kim Orumchian | |
|---|---|---|

| | | 360 | | | Forecast Summary ▽ for Q2+Q3 ▽ Measured by Dollars ▽ | | | | | |
|---|---|---|---|---|---|---|---|---|---|---|
| Home Logout | FORECAST SUMMARY | | | | | | | | | |
| Marty Green | All Areas/East USA | | | | | | | | | |
| VP Sales | Forecast Overview | | | View By: Months ▽ Type: Table ▽ | | | | | | |
| Acme Semiconductor | Region | Apr. 2003 | May 2003 | Jun.2003 | Q2 | Jul.2003 | Aug.2003 | Sep.2003 | Q3 | Forecast Total |
| Your approval is needed | NE USA | $0.32M | $0.38M | $2.81M | $3.51M | $0.34M | $0.56M | $0.52M | $1.42M | $4.92M |
| APPROVAL FORECAST | SE USA | $0.56M | $0.53M | $1.26M | $2.35M | $0.50M | $0.66M | $0.64M | $1.80M | $4.16M |
| Forecast Tools ▽ | Total | $0.68M | $0.91M | $4.07M | $5.86M | $0.84M | $1.22M | $1.16M | $3.22M | $9.08M |
| Drill-down ▽ | | | | | | | | | | |
| Settings ▽ | | | | | | | | | | |
| Help & Support ▽ | | | | | | | | | | |

310

| Positive Impacts |
|---|
| NE USA. has increased their sales forecast total $3.45M from last. ▲235.02% |
| SE USA has seen an increase in forecast total of $2.66M from last forecast. ▲ 177.40% |
| ML2724 has seen an increase in forecast total of $2.57M from last forecast. ▲ 459.68% |
| nVidia has seen an increase in forecast total of $2.42M from last forecast ▲ 636.22% |
| ML2842 has seen an increase in forecast total of $0.77M from last forecast. ▲712.18% |
| Negative Impacts Sales Inc., |
| No Relevant Data |

| Top 10 Customers | |
|---|---|
| Customer | Forecast |
| Customer | Forecast |
| nVidia | $$2.81M |
| Dialogic | $$0.88M |
| Seagate | $$0.81M |
| NEC | $$0.79M |
| Dell | $$0.75M |
| ViewSonic | $$0.61M |
| Cisco | $$0.55M |
| APC | $$0.54M |
| SanDisk | $$0.41M |
| Intel | $$0.39M |

300

| | | | | | | | | | |
|---|---|---|---|---|---|---|---|---|---|
| Home    Logout | FORECAST SUMMARY | | Forecast Summary ▽ for Q2+Q3 ▽ Measured by Dollars ▽ | | | | | | |
| Marty Green | All Prod Families ~~~ 360 | | | | | | | | |
| VP Sales | Forecast Overview | | | View By: Months ▽ Type: Table ▽ | | | | | |
| Zoran Semiconductor | Product | Apr. 2003 | May 2003 | Jun.2003 | Q2 | Jul.2003 | Aug.2003 | Sep.2003 | Q3 | Forecast Total |
| Your approval is needed | ML2722 | $0.08M | $0.07M | $0.06M | $0.21M | $0.05M | $0.06M | $0.07M | $0.18M | $0.38M |
| APPROVAL FORECAST | ML2723 | $0.05M | $0.06M | $0.10M | $0.21M | $0.10M | $0.12M | $0.07M | $0.29M | $0.50M |
| | ML2724 | $0.16M | $0.78M | $2.62M | $3.56M | $0.22M | $0.32M | $0.32M | $0.86M | $4.42M |
| Forecast Tools ▽ | ML2725 | $0.06M | $0.08M | $0.19M | $0.33M | $1.04M | $0.17M | $0.16M | $0.97M | $0.71M |
| Drill-down ▽ | ML2726 | $0.31M | $0.40M | $0.23M | $0.94M | $0.16M | $0.18M | $0.23M | $0.57M | $1.51M |
| Settings ▽ | ML2727 | $0.06M | $0.06M | $0.12M | $0.24M | $0.15M | $0.18M | $0.11M | $0.44M | $0.68M |
| Help & Support ▽ | ML2728 | $0.10M | $0.87M | $0.15M | $0.92M | $0.12M | $0.13M | $0.13M | $0.38M | $1.30M |
| | ML2833 | $0.05M | $0.10M | $0.03M | $0.18M | $0.03M | $0.03M | $0.06M | $0.12M | $0.30M |
| | Total | $2.94M | $4.36M | $4.34M | $11.66M | $1.88M | $2.91M | $2.47M | $7.24M | $18.90M |

| Areas & Entities / Customers / Products | Top 10 Customers | |
|---|---|---|
| ◊Indicates the existence of change history. click to view | Customer | Forecast |
| Positive Impacts | nVidia | $$2.81M |
| | dLink | $$1.30M |
| East USA. has increased their sales forecast total $6.11M from last.▲205..90% | Netgear | $$1.30M |
| ML2724 has seen an increase in forecast total of $3.41M from last forecast.▲336.09% | Dialogic | $$0.88M |
| nVidia has seen an increase in forecast total of $2.42M from last forecast.▲636.22% | Arris | $$0.87M |
| Asia Pacific has seen an increase in forecast total of $2.04M from last.▲116.94% | Seagate | $$0.81M |
| West USA has seen an increase in forecast total of $1.62M from last.▲107.18% | NEC | $$0.79M |
| Negative Impacts Sales Inc., | Dell | $$0.75M |
| No Relevant Data | MSI | $$0.71M |
| | Pioneer | $$0.69M |

FIG. 13

| | | | | | | | | | | |
|---|---|---|---|---|---|---|---|---|---|---|
| Home Logout | FORECAST SUMMARY | | | [Forecast Summary ▽] for [Q2+Q3 ▽] Measured by [Dollars ▽] | | | | | | |
| Marty Green | All Customers  360 | | | | | | | | | |
| VP Sales | Forecast Overview | | | View By: [Months ▽] Type: [Table ▽] | | | | | | |
| Zoran Semiconductor | Product | Apr. 2003 | May 2003 | Jun.2003 | Q2 | Jul.2003 | Aug.2003 | Sep.2003 | Q3 | Forecast Total |
| Your approval is needed | AMD | $0.02M | $0.03M | $0.06M | $0.13M | $0.03M | $0.06M | $0.03M | $0.12M | $0.25M |
| [APPROVAL FORECAST] | APC | $0.05M | $0.06M | $0.15M | $0.26M | $0.03M | $0.13M | $0.12M | $0.28M | $0.54M |
| | Arris | $0.12M | $0.20M | $0.14M | $0.46M | $0.10M | $0.15M | $0.16M | $0.41M | $0.87M |
| | BrightLine | $0.08M | $0.05M | $0.03M | $0.25M | $0.02M | $0.03M | $0.02M | $0.07M | $0.23M |
| Forecast Tools ⊚ | Cartwright Inc | $0.08M | $0.09M | $0.08M | $0.16M | $0.07M | $0.07M | $0.07M | $0.21M | $0.46M |
| Drill-down ⊚ | Cisco | $0.09M | $0.10M | $0.08M | $0.27M | $0.10M | $0.10M | $0.08M | $0.28M | $0.55M |
| Settings ⊚ | Dell | $0.00M | $0.10M | $0.10M | $0.31M | $0.18M | $0.17M | $0.10M | $0.45M | $0.75M |
| Help & Support ⊚ | Dialogic | $0.02M | $0.02M | $0.74M | $0.78M | $0.01M | $0.05M | $0.05M | $0.11M | $0.88M |
| | Total | $2.12M | $2.06M | $5.68M | $10.75M | $2.148M | $2.84M | $4.81M | $9.79M | $20.55M |

385

Areas & Entities | Customers | Products

◇Indicates the existence of change history. click to view

Positive Impacts

East USA. has increased their sales forecast total $6.11M from last. ▲205.90%
ML2724 has seen an increase in forecast total of $3.41M from last forecast. ▲336.09%
nVidia has seen an increase in forecast total of $2.42M from last forecast. ▲636.22%
Asia Pacific has seen an increase in forecast total of $2.04M from last forecast. ▲116.94%
West USA has seen an increase in forecast total of $1.62M from last forecast. ▲107.18%

315

Negative Impacts Sales Inc.,

No Relevant Data

| Top 10 Products | |
|---|---|
| Product | Forecast |
| ML2724 | $$4.42M |
| ML2841 | $$1.66M |
| ML2726 | $$1.51M |
| ML2728 | $$1.30M |
| ML2845 | $$1.02M |
| ML2843 | $$0.88M |
| ML2747 | $$0.74M |
| ML2725 | $$0.71M |
| ML2827 | $$0.58M |
| ML2844 | $$0.54M |

| | |
|---|---|
| Home Logout<br>Marty Green<br>VP Sales<br>Zoran<br>Semiconductor | Drill-down |
| | ☒ export |
| | Forecast Gap Analysis / Production Analysis / Inventory Analysis \ [Sales Forecast vs. Actuals ▽] |
| | Inventory Report: |
| | The total difference between the current forecast and last quarter actual is: |
| Continually<br>Updated<br>You will be<br>notified<br>when updates<br>occur | Quarter 2: gap from previous quarter actuals<br>Revenue Dollars  $3,129,066.64 +50.66% from $6,176,731.48<br>Margin Dollars     $787,661.64  25.25% from $3,125,763.48 | $2,595,680.00 additional inventory dollars are required for 11 parts.<br>($874,276.00) less inventory dollars are required for 5 parts.<br>$1,721,404.00 net greater inventory dollars. |
| | Inventory Dollar Change Detail: |
| | The following parts units are increasing | The following parts units are decreasing |
| Updates have<br>been made | ML2724<br>   Quarter 2: 116,916 units @ $12.00/unit = $1,426,992.00 additional inventory dollars | ML2727<br>   Quarter 2: -36,956 @ $11.00/unit = ($406,516.00) fewer inventory dollars |
| Forecast ▽<br>Tools | ML2843<br>   Quarter 2: 68,400 units @ $6.50/unit = $444,600.00 additional inventory dollars | ML2834<br>   Quarter 2: -31,940 @ $13.00/unit = ($415,220.00) fewer inventory dollars |
| Drill- down ▽ | ML2728<br>   Quarter 2: 19,620 units @ $20.00/unit = $392,400.00 additional inventory dollars | ML2722<br>   Quarter 2: -3,842 @ $5.00/unit = ($19,210.00) fewer inventory dollars |
| Product Family<br>Summary |
| Area Summary | ML2842<br>   Quarter 2: 6,540 units @ $4.00/unit = $26,160.00 additional inventory dollars | ML2841<br>   Quarter 2: -2,640 @ $6.00/unit = ($15,840.00) fewer inventory dollars |
| Executive<br>Summaries | ML2833<br>   Quarter 2: 5,311 units @ $8.00/unit = $42,488.00 additional inventory dollars | ML2723<br>   Quarter 2: -1,749 @ $10.00/unit = ($17,490.00) fewer inventory dollars |
| Settings ▽ |
| Help &<br>Support ▽ | ML2841<br>   Quarter 2: 4,400 units @ $23.00/unit = $101,200.00 additional inventory dollars | |

| | |
|---|---|
| Home    Logout | FORECAST TOOLS |
| Marty Green | Judgement |
| VP Sales    340 | |
| Zoran Semiconductor | How do you want to alter June/2003 for Orumedrian /All Products /All Customers? |

○ Apply change by percent — 465 — 470 — 475

[increase ▽] forecast [revenue ▽] by [       ] % for the projection

460

— 440        or

⦿ Apply change by value

Change forcast [revenue ▽] to [ $2,724,600.00 ] for this projection
                 revenue
                 units
                              — 445           450

| Result of the Change |
|---|
| Revenue $2,724,600.00 |
| Units        96,600 |
| Pre-judgment Values |
| Revenue $2,724,600.00 |
| Units        96,600 |

[Submit]  [Cancel]          [Add notes to this change]

My Judgment History

| Date of Update | Type of Update | Amount of Update | Locales & Entries | Customer | Product | Time |
|---|---|---|---|---|---|---|

Sidebar:
- Your approval is needed
- [APPROVE FORECAST]
- Forecast Tools ⊗
- Drill-down ⊗
- Settings ⊗
- Help & Support ⊗
- 430

| Home | Logout | FORECAST TOOLS |
|---|---|---|
| | | Judgement |

Marty Green
VP Sales  340
Zoran Semiconductor

How do you want to alter June/2003 for Orumehian /All Products /All Customers?

Your approval is needed

APPROVAL FORECAST

| Forecast Tools | ▽ |
| Drill- down | ▽ |
| Settings | ▽ |
| Help & Support | ▽ |

○ Apply change by percent

[increase ▽] forecast [revenue ▽] by [    ] % for the projection

— 440                              or

● Apply change by value

Change forcast [units ▽] to [$1,410,248.00] for this projection
                   ‑445              450

| Result of the Change | |
|---|---|
| Revenue | $1,410,248.45 |
| Units | 50,001 |

| Pre-judgment Values | |
|---|---|
| Revenue | $1,410,248.45 |
| Units | 50,001 |

[Submit]  [Cancel]        [Add notes to this change]

430 — My Judgment History

| Date of Update | Type of Update | Amount of Update | Locales & Entries | Customer | Product | Time | |
|---|---|---|---|---|---|---|---|
| 4/5/2004 11:15:30 pm | UPDATE QUANITY | -48.2402% | Orumchian | | June/ 2003 | | Remove |

| | | | | | | | | |  – ☐ ✕ |
|---|---|---|---|---|---|---|---|---|---|
| Home  Logout Marty Green | FORECAST SUMMARY All | | Sales Forecast vs. Updt.Fcst ▽ | | for Q2+Q3 ▽ | Measured by Dollars ▽ | | | |
| VP Sales Zoran Semiconductor | Forecast Overview | | | View By: Months ▽ | | Type: Table ▽ | | | |
| | Area | Detail | Apr 2003 | May 2003 | Jun 2003 | Jul 2003 | Aug 2003 | Sep 2003 | Forecast Total |
| Continually Updated You will be notified when updates occur | Asia Pacific | Forecast | $0.56M | $1.17M | $0.58M | $0.43M | $0.54M | $0.51M | $3.79M |
| | | Updated | $0.56M | $1.17M | 510 $0.58M | $0.43M | $0.54M | $0.51M | $3.79M |
| | East USA | Forecast | $0.87M | $0.91M | $3.00M | $0.84M | $1.22M | $1.16M | $8.00M |
| | | Updated | $0.87M | $0.91M | ◊$3.35M ▲12% | $0.84M | $1.22M | $1.18M ◊ | $8.35M ▲4% |
| Updates have been made | West USA | Forecast | $0.37M | $0.99M | $0.51M | $0.37M | $0.48M | $0.41M | $3.13M |
| | | Updated | $0.37M | $0.99M | 510 $0.51M | $0.37M | $0.48M | $0.41M | $3.13M |
| 340 | Total | Forecast | $1.80M | $3.07M | $4.09M | $1.64M | $2.24M | $2.08M | $14.92M |
| | | Updated | $1.80M | $3.07M | ◊ $4.44M ▲9% | $1.64M | $2.24M | $2.08M ◊ | $15.27M ▲2% |

| Areas & Entities | Customers | Products | | Top 10 Customers | |
|---|---|---|---|---|---|
| ◊Indicates the existence of change history. click to view | | | | Customer | Forcast |
| Positive Impacts | | | | nVidia | ◊$2.21M ▲19% |
| | | | | dLink | $1.30M |
| ML2724 has seen an increase in forecast total of $0.35M.▲9.97% East USA. has increased their sales forecast total $0.35M.▲ 4.33% nVidia has seen an increase in forecast total of $0.35M.▲18.65% | | | | Netgear | $1.30M |
| | | | | Dialogic | $0.88M |
| | | | | Arris | $0.87M |
| | | | | NEC | $0.79M |
| | | | | Dell | $0.75M |
| Negative Impacts | | | | Seagate | ◊$0.74M |
| No Relevant Data | | | | MSI | $0.71M |
| | | | | Pioneer | $0.69M |

Left sidebar: Forecast Tools, Drill-down, Settings, Help & Support, 315

| Home Logout<br>Marty Green | Change History | | |
|---|---|---|---|
| VP Sales<br>Zoran<br>Semiconductor | Change History for<br>June/2003 | East USA<br>All Products<br>All Customers | |
| Continually Updated<br>You will be notified when updates occur<br>Updates have been made | Original Forecast | | Forecast $4,074,800.00<br>Quantity 193,600 |
| | ▸ Judgement Unit Change by Rob Sinclair | Resulted in a revenue<br>change of and unit change of | ($1,314,351.55)<br>(46,599) = $2,760,448.45<br>147,001 |
| | ▸ Judgement Revenue by Marty Green<br>Change | Resulted in a revenue<br>change of and unit change of | $239,754.70<br>0 = $3,000,203.15<br>147,001 |
| | OFFICIAL FORECAST | | |
| Forecast Tools ⊗ | ▸ Rep.<br>Correction | by Kim Orumchian Resulted in a revenue<br>change of end unit change of | $346,574.97<br>58,592 = $3,346,778.12<br>205,593 |
| Drill-down ⊗ | Current Forecast Totals | | Forecast $3,346,778.12<br>Quantity 205,593 |
| Settings ⊗ | | | |
| Help & Support ⊗ | 520 | | |
| | 300 | | |

FIG. 25

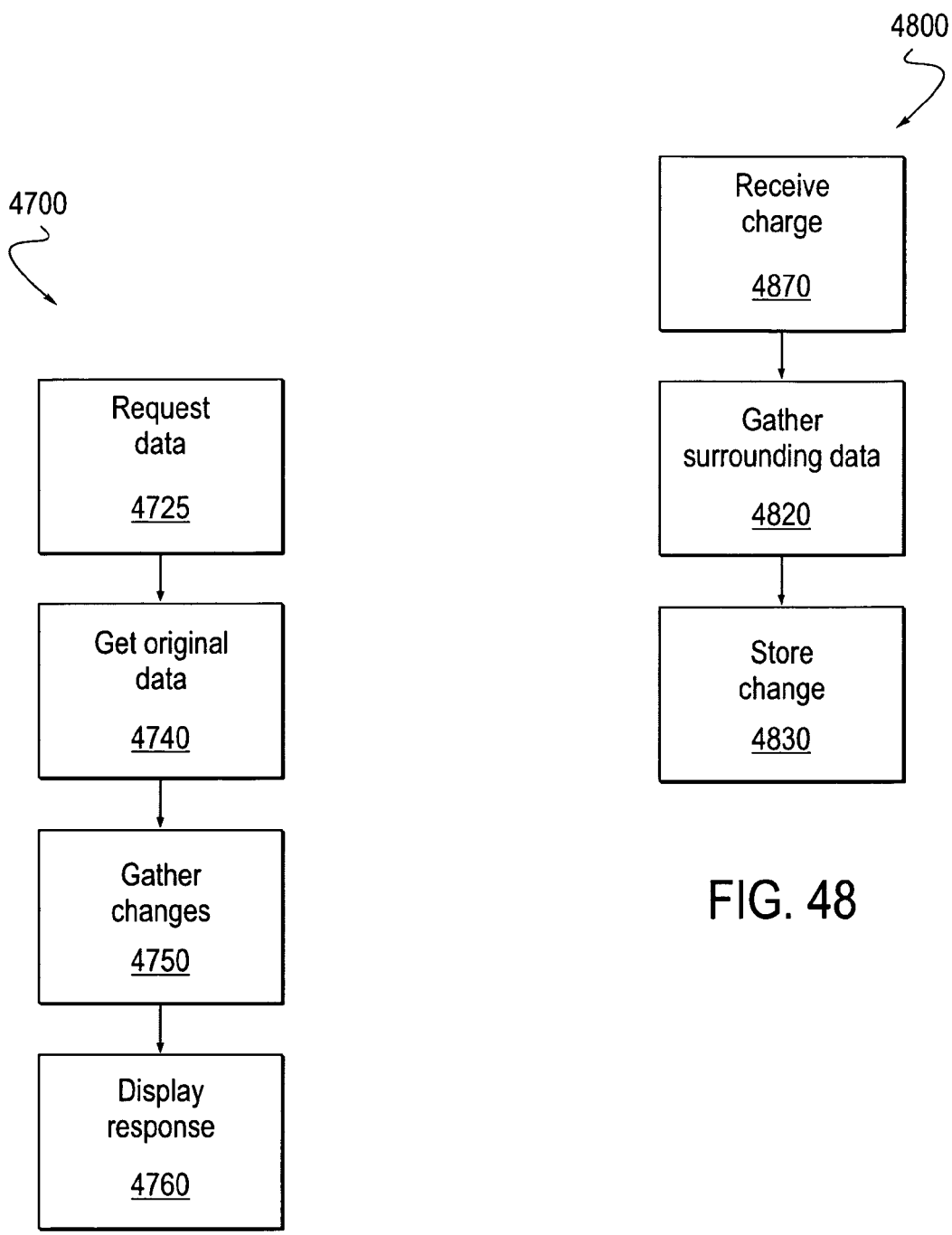

PROVIDING FEEDBACK IN A OPERATING PLAN DATA AGGREGATION SYSTEM

CROSS-REFERENCE TO RELATED APPLICATIONS

This application claims priority to U.S. Provisional Patent Application Ser. No. 60/565,758, filed Apr. 26, 2004, which is hereby incorporated herein by reference.

BACKGROUND

Data is used by the investment and business communities to judge the value of investments, the business case for transactions, the performance of managers, and trends in industries, among many other things. Data may be used in other areas and by other communities to make judgments and decisions on a variety of matters. As such, data for a company or organization is important in general, and up-to-date data (such as projected sales data for example) is potentially invaluable. However, forecast data in a company is typically stored in formats or systems which are not amenable to updates on an asynchronous or random basis.

For example, forecasting cycles are often based on monthly and quarterly updates to information. Government regulations often require reporting on no more than a quarterly basis (every three months). Activities in the real world rarely occur on scheduled dates for updates, a customer may cancel or enhance an order at any time. Moreover, indirect actions with direct effects on customers (such as competitor product announcements or vendor supply changes for example) are also rarely coordinated with a time which is convenient based on accounting schedules.

Thus, it may be advantageous to provide a system which allows for updates on a random or asynchronous basis. Additionally, information in the form of projections is often based on judgment. Thus, it may be advantageous to provide a system in which changes may be made to information based on judgments made after input of such information. Moreover, some information (datapoints) may have particular significance. Thus, it may be advantageous to provide a system in which a user may be notified of changes to particular datapoints.

SUMMARY

The present invention is described and illustrated in conjunction with systems, apparatuses and methods of varying scope. In addition to the aspects of the present invention described in this summary, further aspects of the invention will become apparent by reference to the drawings and by reading the detailed description that follows. A method and apparatus for forecasting data with real-time updates is described.

In one embodiment, the invention is a system. The system includes a first client. The system also includes an analysis server coupled to the first client. The system further includes a first customer database of information coupled to the analysis server. The first customer database is to embody forecast data and to receive essentially real-time updates to the forecast data. The first customer database may support an OLAP cube associated with the analysis server.

The analysis server may incorporate an OLAP cube therein, with the OLAP cube to analyze and update the information of the first customer database. The first customer database may be dedicated to use by a first set of selected users of the system. An identification server coupled to the first client and coupled to the first customer database may also be included. The first client may be a smart client, and the first client may include its own OLAP cube. A second client may also be coupled to the identification server and the analysis server. Moreover, a second customer database of information may be coupled to the identification server and the analysis server, with the second customer database dedicated to use by a second set of users of the system. The information manipulated by the system may be financial information.

The first customer database may include watches of data. The first customer database may also include sales forecast data. The first customer database may further include sales forecast data with changes from non-sales personnel.

In another embodiment, the invention is also a system. The system includes an analysis server including an OLAP cube. The system also includes an information database coupled to the analysis server to support the OLAP cube. The information database is to embody forecast data and to receive essentially real-time updates to the forecast data. The system also may include an identification server coupled to the information database. The system may further include a client coupled to the analysis server and to the identification server. Moreover, the information database may store financial information.

In yet another embodiment, the invention is a method of maintaining information. The method includes receiving a set of forecast data. The method also includes incorporating the forecast data into a database of the information through an OLAP cube. The method further includes extracting a baseline forecast from the database. Also, the method includes receiving updates to the database. Moreover, the method includes propagating updates almost immediately throughout the information through the OLAP cube.

The method may also include watching a set of watched data points of the information. The method may further include notifying a user of changes in the set of watched data points responsive to the propagating and receiving updates. Similarly, the method may also include providing information to a user. The method may further include receiving expected changes of the information from the user. The method may also include propagating the expected changes as updates almost immediately throughout the information through the OLAP cube.

Additionally, the method may include reviewing updates received and propagated through the information. The method may include providing user-readable updates of information responsive to the reviewing. The forecast data may be financial information. Also, the method may be executed by a processor in response to instructions, with the instructions embodied in a machine-readable medium. Moreover, the method may include receiving actual data corresponding to the information. The method may further include comparing the actual data to the information and providing user-readable comparisons of information and the actual data.

In one embodiment, the invention is a method. The method includes receiving forecast information from sales people in a computer. The method further includes receiving comments on specific entries of the forecast information from non-sales people in the computer. The method also includes receiving changes of the forecast information from the non-sales people in the computer. The method additionally includes providing a display of the comments and the changes to the sales people in an interface to the computer.

The comments may be received from marketing and executive personnel. Forecast information and associated comments and changes may be stored in a database and OLAP cube associated with the computer. The computer may actually be a network of computers hosting the database and OLAP cube. The method may be executed by a processor in response to instructions, with the instructions embodied in a machine-readable medium.

The method may further include receiving requests to watch specific data of the forecast information. Moreover, the method may include providing updates when specific data changes responsive to the requests to watch. Similarly, the method may include receiving judgments from the non-sales people related to a set of data of the forecast information and changing the set of data of the forecast responsive to the judgments. The method may also include analyzing the changes for largest magnitude changes. The method may further include providing a set of impacts to the sales people, the impacts showing the changes based on a rank ordering of magnitude of the changes.

Moreover, the comments and changes may be received through devices other than the computer that are coupled to the computer for communication. Similarly, the forecast data may be received through devices other than the computer that are coupled to the computer for communication. Additionally, the interface to the computer may be through devices other than the computer that are coupled to the computer for communication.

In yet another embodiment, the invention is a system. The system includes a user interface to receive forecast data. The system also includes an analysis server including an OLAP cube. The system further includes an information database coupled to the analysis server to support the OLAP cube. The information database is to embody the forecast data and to receive essentially real-time updates to the forecast data through the user interface. The user interface is to display the forecast data through the user interface with feedback as the data changes over time.

In still another embodiment, the invention is a method of providing feedback from members of an organization on forecasts to sales people entering data for the forecasts. The method includes receiving the data for the forecasts from the sales people in a computer. The method also includes storing the data for the forecasts within a database in conjunction with an OLAP cube as forecast information. The method further includes receiving comments on specific entries of the forecast information in the OLAP cube from the members of the organization in the computer. The method also includes receiving changes of the forecast information from the members of the organization in the computer. Morover, the method includes integrating the comments and the changes into the OLAP cube and the database. Also, the method includes providing a display of the comments and the changes to the sales people in an interface to the computer.

In still another embodiment, the invention is a method. The method includes receiving forecast data in a database with an associated window value. The method also includes accessing data based on associated window values. The method further includes comparing the data accessed based on associated window values to other data.

In another embodiment, the invention is a method of maintaining information. The method includes receiving a set of forecast data. The method also includes incorporating the forecast data into a database of the information through an OLAP cube. The method further includes extracting a baseline forecast from the database. The method also includes receiving updates to the database. The method further includes propagating updates almost immediately throughout the information through the OLAP cube. The method also includes extracting an updated baseline forecast from the database, the updated baseline forecast derived from the baseline forecast.

In another embodiment, the invention is a method. The method includes receiving forecast information in a computer from a first group of users. The method also includes integrating the forecast information into a database and corresponding OLAP cube accessible by the computer. The method further includes receiving comments on specific entries of the forecast information in the computer from a second group of users. The method also includes receiving changes of the forecast information in the computer from a second group of users The method further includes integrating comments and changes into the database and OLAP cube. Moreover, the method includes providing a display of the comments and the changes to the first group of users in an interface to the computer.

The present invention is exemplified in the various embodiments described, and is limited in spirit and scope only by the appended claims.

BRIEF DESCRIPTION OF THE DRAWINGS

The present invention is illustrated in various exemplary embodiments and is limited in spirit and scope only by the appended claims.

FIG. 2 illustrates information for a sales person in one embodiment.

FIG. 5 illustrates information for a larger region in one embodiment.

FIG. 13 illustrates display by product of information in an embodiment.

FIG. 14 illustrates display by customer of information in an embodiment.

FIG. 17 illustrates an inventory report for information in an embodiment.

FIG. 22 illustrates application of judgment in an embodiment.

FIG. 23 further illustrates application of judgment in an embodiment.

FIG. 24 illustrates a forecast after application of judgment in an embodiment.

FIG. 25 illustrates change history for information in an embodiment.

FIG. 47 illustrates an embodiment of a process of responding to a request for data.

FIG. 48 illustrates an embodiment of a process of storing a change in data.

Like reference symbols in the various drawings indicate like elements.

DETAILED DESCRIPTION

Figure 1:
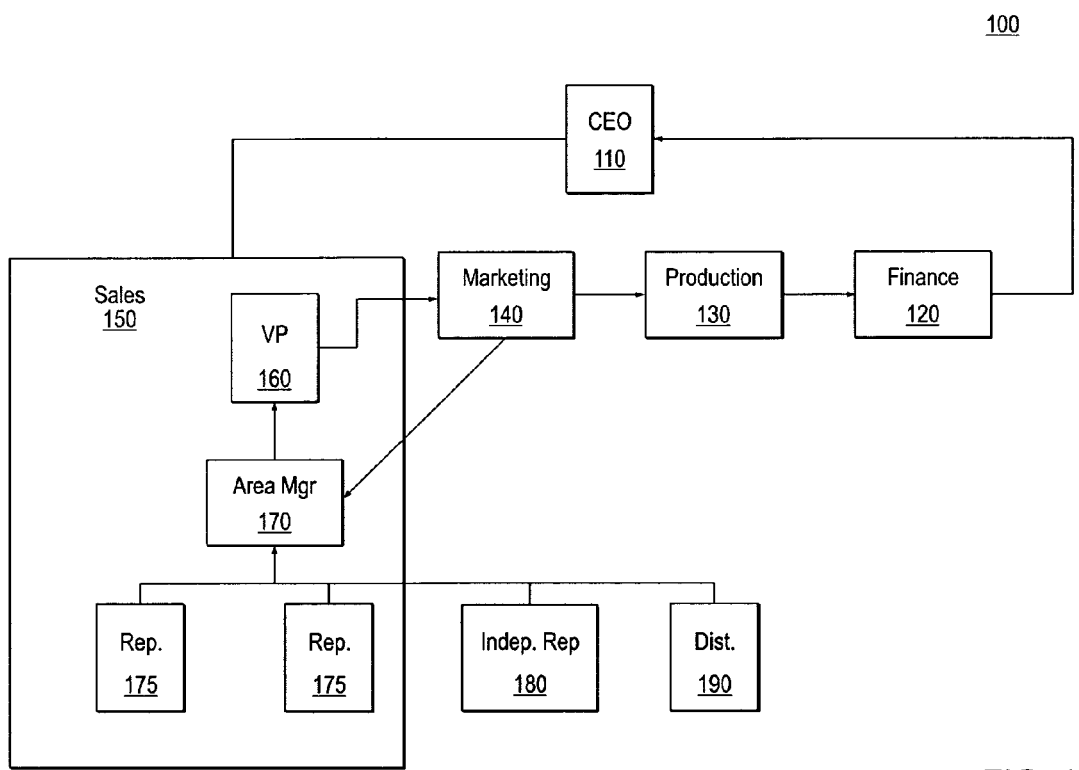
FIG. 1 illustrates information flowing through an organization.

The present invention is described and illustrated in conjunction with systems, apparatuses and methods of varying scope. In addition to the aspects of the present invention described in this summary, further aspects of the invention will become apparent by reference to the drawings and by reading the detailed description that follows. A method and apparatus for forecasting data with real-time updates is described. In general, the method and apparatus relate to gathering forecast data from a variety of sources, developing a baseline forecast from the gathered data, and updating the baseline forecast based on essentially real-time changes in data as gathered from the variety of sources and other data sources. Moreover, the method and apparatus allow for viewing of forecast data with updates and may allow for simulation or alteration of the data.

In one embodiment, the invention is a system. The system includes a first client. The system also includes an analysis server coupled to the first client. The system further includes a first customer database of information coupled to the analysis server. The first customer database is to embody forecast data and to receive essentially real-time updates to the forecast data. The first customer database may support an OLAP cube associated with the analysis server.

The analysis server may incorporate an OLAP cube therein, with the OLAP cube to analyze and update the information of the first customer database. The first customer database may be dedicated to use by a first set of selected users of the system. An identification server coupled to the first client and coupled to the first customer database may also be included. The first client may be a smart client, and the first client may include its own OLAP cube. A second client may also be coupled to the identification server and the analysis server. Moreover, a second customer database of information may be coupled to the identification server and the analysis server, with the second customer database dedicated to use by a second set of users of the system. The information manipulated by the system may be financial information.

The first customer database may include watches of data. The first customer database may also include sales forecast data. The first customer database may further include sales forecast data with changes from non-sales personnel.

In another embodiment, the invention is also a system. The system includes an analysis server including an OLAP cube. The system also includes an information database coupled to the analysis server to support the OLAP cube. The information database is to embody forecast data and to receive essentially real-time updates to the forecast data. The system also may include an identification server coupled to the information database. The system may further include a client coupled to the analysis server and to the identification server. Moreover, the information database may store financial information.

In yet another embodiment, the invention is a method of maintaining information. The method includes receiving a set of forecast data. The method also includes incorporating the forecast data into a database of the information through an OLAP cube. The method further includes extracting a baseline forecast from the database. Also, the method includes receiving updates to the database. Moreover, the method includes propagating updates almost immediately throughout the information through the OLAP cube.

The method may also include watching a set of watched data points of the information. The method may further include notifying a user of changes in the set of watched data points responsive to the propagating and receiving updates. Similarly, the method may also include providing information to a user. The method may further include receiving expected changes of the information from the user. The method may also include propagating the expected changes as updates almost immediately throughout the information through the OLAP cube.

Additionally, the method may include reviewing updates received and propagated through the information. The method may include providing user-readable updates of information responsive to the reviewing. The forecast data may be financial information. Also, the method may be executed by a processor in response to instructions, with the instructions embodied in a machine-readable medium. Moreover, the method may include receiving actual data corresponding to the information. The method may further include comparing the actual data to the information and providing user-readable comparisons of information and the actual data.

In one embodiment, the invention is a method. The method includes receiving forecast information from sales people in a computer. The method further includes receiving comments on specific entries of the forecast information from non-sales people in the computer. The method also includes receiving changes of the forecast information from the non-sales people in the computer. The method additionally includes providing a display of the comments and the changes to the sales people in an interface to the computer.

The comments may be received from marketing and executive personnel. Forecast information and associated comments and changes may be stored in a database and OLAP cube associated with the computer. The computer may actually be a network of computers hosting the database and OLAP cube. The method may be executed by a processor in response to instructions, with the instructions embodied in a machine-readable medium.

The method may further include receiving requests to watch specific data of the forecast information. Moreover, the method may include providing updates when specific data changes responsive to the requests to watch. Similarly, the method may include receiving judgments from the non-sales people related to a set of data of the forecast information and changing the set of data of the forecast responsive to the judgments. The method may also include analyzing the changes for largest magnitude changes. The method may further include providing a set of impacts to the sales people, the impacts showing the changes based on a rank ordering of magnitude of the changes.

Moreover, the comments and changes may be received through devices other than the computer that are coupled to the computer for communication. Similarly, the forecast data may be received through devices other than the computer that are coupled to the computer for communication. Additionally, the interface to the computer may be through devices other than the computer that are coupled to the computer for communication.

In yet another embodiment, the invention is a system. The system includes a user interface to receive forecast data. The system also includes an analysis server including an OLAP cube. The system further includes an information database coupled to the analysis server to support the OLAP cube. The information database is to embody the forecast data and to receive essentially real-time updates to the forecast data through the user interface. The user interface is to display the forecast data through the user interface with feedback as the data changes over time.

In still another embodiment, the invention is a method of providing feedback from members of an organization on forecasts to sales people entering data for the forecasts. The method includes receiving the data for the forecasts from the sales people in a computer. The method also includes storing the data for the forecasts within a database in conjunction with an OLAP cube as forecast information. The method further includes receiving comments on specific entries of the forecast information in the OLAP cube from the members of the organization in the computer. The method also includes receiving changes of the forecast information from the members of the organization in the computer. Morover, the method includes integrating the comments and the changes into the OLAP cube and the database. Also, the method includes providing a display of the comments and the changes to the sales people in an interface to the computer.

In still another embodiment, the invention is a method. The method includes receiving forecast data in a database with an associated window value. The method also includes accessing data based on associated window values. The method further includes comparing the data accessed based on associated window values to other data.

In another embodiment, the invention is a method of maintaining information. The method includes receiving a set of forecast data. The method also includes incorporating the forecast data into a database of the information through an OLAP cube. The method further includes extracting a baseline forecast from the database. The method also includes receiving updates to the database. The method further includes propagating updates almost immediately throughout the information through the OLAP cube. The method also includes extracting an updated baseline forecast from the database, the updated baseline forecast derived from the baseline forecast.

In another embodiment, the invention is a method. The method includes receiving forecast information in a computer from a first group of users. The method also includes integrating the forecast information into a database and corresponding OLAP cube accessible by the computer. The method further includes receiving comments on specific entries of the forecast information in the computer from a second group of users. The method also includes receiving changes of the forecast information in the computer from a second group of users The method further includes integrating comments and changes into the database and OLAP cube. Moreover, the method includes providing a display of the comments and the changes to the first group of users in an interface to the computer.

FIG. 1 illustrates information flowing through an organization. Organization 100 may be typical of companies or other organizations concerned with finances. Ceo 110 needs financial information as a basic part of the job. Sales organization 150 is thus asked to prepare a forecast of sales. This forecast may span months or years for example. Examples illustrated are for 6 months, but other time periods may fit circumstances in various situations. Other forecasts may be requested within an organization within the spirit and scope of the present invention. For example, forecasts of inventory or expenses may be prepared and tracked in real-time.

Within sales organization 150, sales representatives 175 provide forecasts of their upcoming sales. Similarly, independent representative 180 and distributor 190 provide forecasts of upcoming sales. Area manager 170 receives these forecasts, and passes them up to vice president of sales 160. Vp 160 then passes the forecasts to marketing department 140. At this point, and at previous links, feedback or analysis of the financial data (forecasts) may occur, such as through changes to estimates, requests for information about or verification of data, or other forms of feedback or analysis.

Marketing 140 then sends current data to production 130 (engineering and manufacturing for example). Production 130 may comment and provide changes based on manufacturing considerations (such as delays or stockpiles for example) and then pass the information to finance 120. Finance department 120 may comment and provide changes based on financial considerations, such as availability of capital or status of accounts (such as past due accounts for example). Finance department 120 then passes the updated forecast data to ceo 110 as a baseline forecast.

Ceo 110 may use this baseline for managerial analysis and for reference when speaking to non-members of the organization, such as news media outlets, customers, vendors and regulators for example. With a static forecast, the data may be stale by the time ceo 110 sees it. With real-time updates, ceo 110 may rely more effectively on available data to analyze and comment on the organization's financial situation.

To illustrate in further detail the forecasting and update process, reference may be made to how data is provided initially. Again, the process is presented in terms of sales data, but data of various types may be forecasted and tracked in real-time. FIG. 2 illustrates information for a sales person in one embodiment. The information is entered and/or displayed through user interface 200. Field or frame 260 is a display of information for the sales person 220. As illustrated, this is a display in currency (such as dollars for example) for a salesperson 220 including a company 230, a part 240 for that company, details 245 for the part 240, and another part 250 for which details are not presently selected. Field or frame 260 is a user interface for products sold by salesperson 220 which allows for entry of forecast data related to specific products for the salesperson 220.

In one embodiment, a sales representative or similar individual (user) enters information into each cell in frame 260, and is required to "touch" each cell (enter or confirm data in the cell) to attempt to verify that no data is inadvertently left out or entered incorrectly. Moreover, the user may be required to touch each cell of the summary data of part 270. Additionally, status information related to what is being entered is displayed as status 205, and submit 210 and exit 215 buttons are provided for submission of entered data and exit of the software respectively. Once data has been entered, a similar user interface may be used to display the data. If changes are made to the data, those changes may also be displayed as described below.

Figure 3:
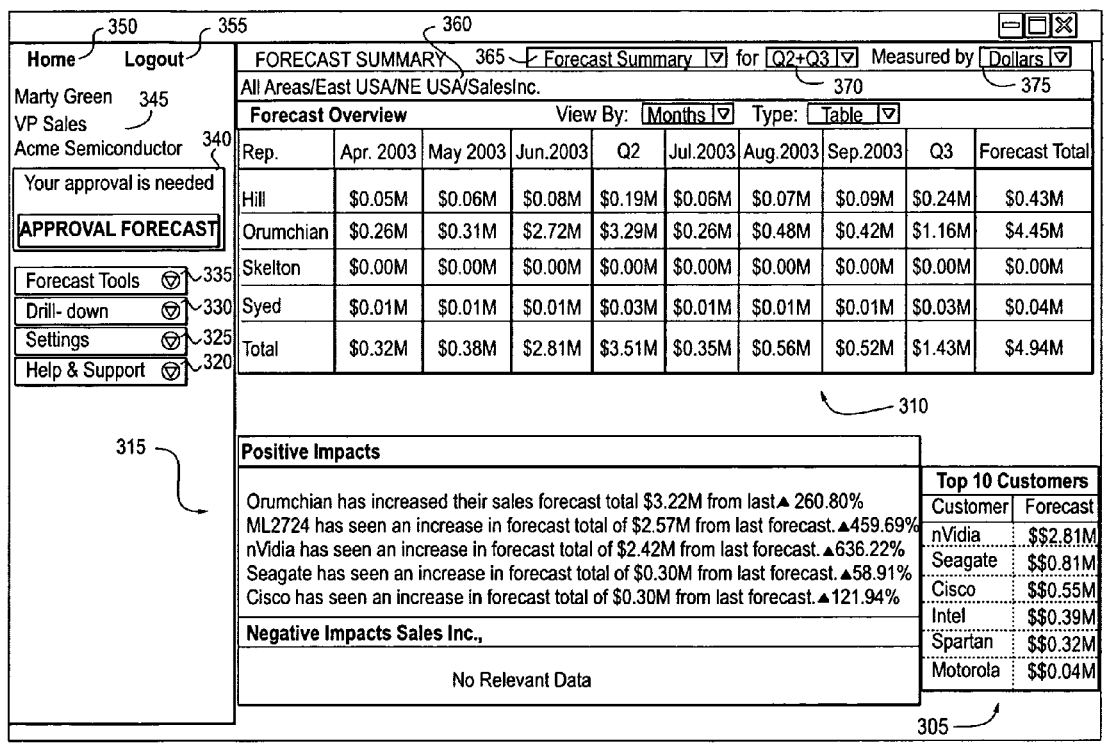
FIG. 3 illustrates information for a customer in one embodiment.

As illustrated, a similar user interface 300 may be used for display of information once it is entered. FIG. 3 illustrates information for a customer in one embodiment. Interface 300 provides a forecast overview, impact messages, top 10 customers, and navigation tools. Forecast display 310 provides information about a particular sales representative (for all sales people) in one embodiment. The information is displayed in a cell format, with sales people separated by row and columns devoted to time periods. Display 360 indicates what is being displayed, in this case a representative sales inc. In the ne usa part of the east usa region. Moreover, selector 365 determines the format of the display 310, in this case a summary, time selector 370 determines the displayed time period, and type selector 375 determines the type of display, such as dollars or units. Additionally, display 310 provides for user selection of a method of viewing (by months as illustrated) and a type of view (table as illustrated).

Another part of the display is the impacts message display 315, which provides messages about impacts to a projection based on changes. Still another part of the display is top 10 customers display 305, which may be used to provide forecasts on the top 10 customers in real time, regardless of what else is displayed. Additionally, status and navigation tools are provided. Forecast button 335 leads to the displayed forecast data. Drill down button 330 allows a user to delve into details of an entry of a subset of displayed data. Settings button 325 allows the user to change settings of the display. Help button 320 allows the user to access online help and potentially to access help over a network for example. Identity 345 displays an identity of the current user, and projection status 340 displays the status of the projection (such as whether it needs to be approved or it is active and will provide updates). Moreover, logout button 355 and home button 350 allow for exiting the system or navigating to a predetermined home part of the system respectively.

Figure 4:
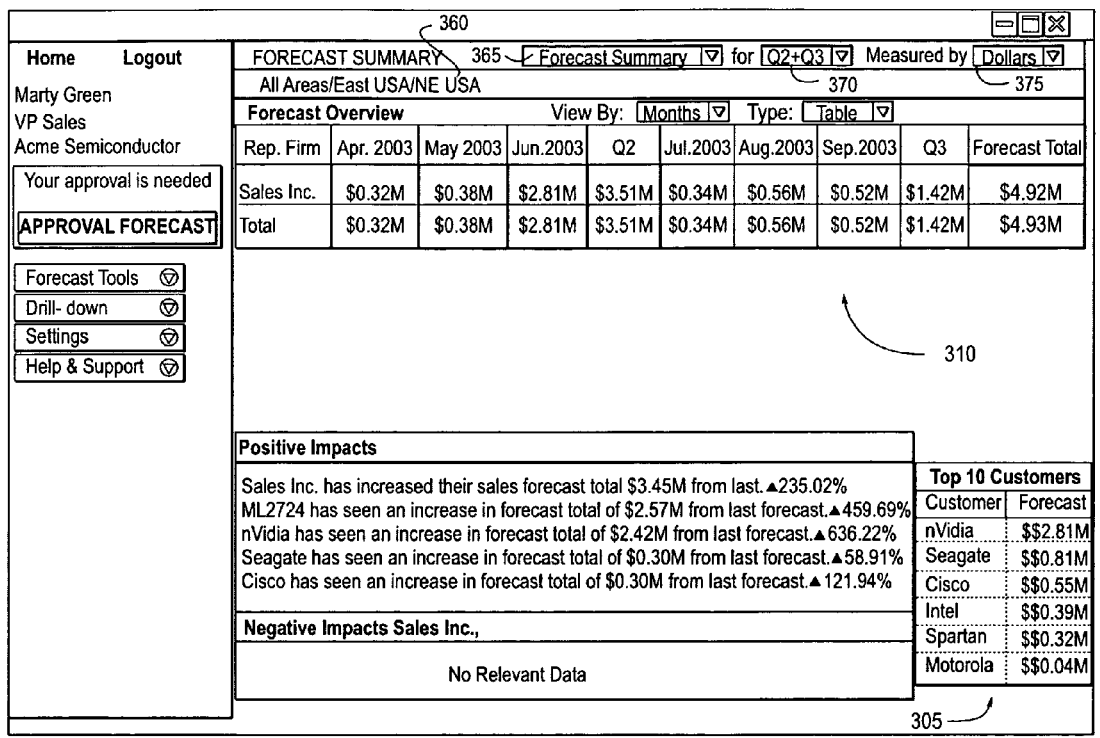
FIG. 4 illustrates information for a region in one embodiment.

With information from users related to various customers and areas, an overview of a broader area may be provided. FIG. 4 illustrates information for a region in one embodiment. By navigating to a different region, or a region encompassing the previously displayed data for example, information for a region may be displayed. In this example, the display of frame 310 now provides data for sales inc., as the data for the ne usa region. Display 360 indicates what region is displayed. Note that the data displayed for sales inc. Is an aggregation of the data displayed in FIG. 3, as this is essentially displaying data at a higher level of abstraction or a different level of organization from the data of FIG. 3.

Aggregation of data for larger regions may similarly proceed. FIG. 5 illustrates information for a larger region in one embodiment. Display 310 now provides data for the ne usa and se usa regions, with the ne usa region aggregating the sales inc. Data of FIG. 4. Similarly, the se usa region aggregates appropriate data. As may be expected, display 360 indicates what is being displayed, in this case the east usa area.

Figure 6:
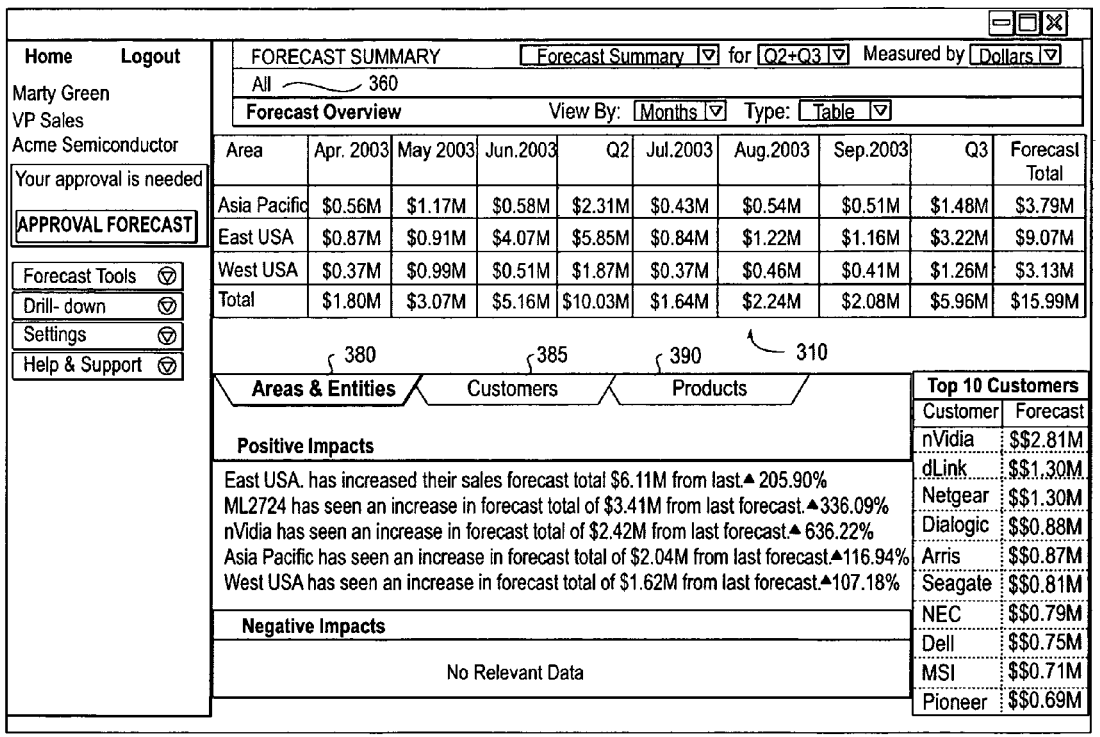
FIG. 6 illustrates information for worldwide operations of a company in one embodiment.

As one may expect, aggregation may ultimately go to a worldwide level. FIG. 6 illustrates information for worldwide operations of a company in one embodiment. User interface 300 now provides data on a worldwide basis, with an indication of what area is displayed in display 360. In particular, display 310 provides data for east usa, west usa, and asia pacific regions. The east usa data is an aggregation of the data of FIG. 5. Moreover, as illustrated, no changes have been made to the information. Additionally, the display 310 allows for display by area or entity (tab 380), by customer (tab 385), and by product (tab 390). However, having gathered the information and displayed it, it may be useful to manipulate the information, such as by various users over a network using individual clients or workstations for example.

Figure 7:
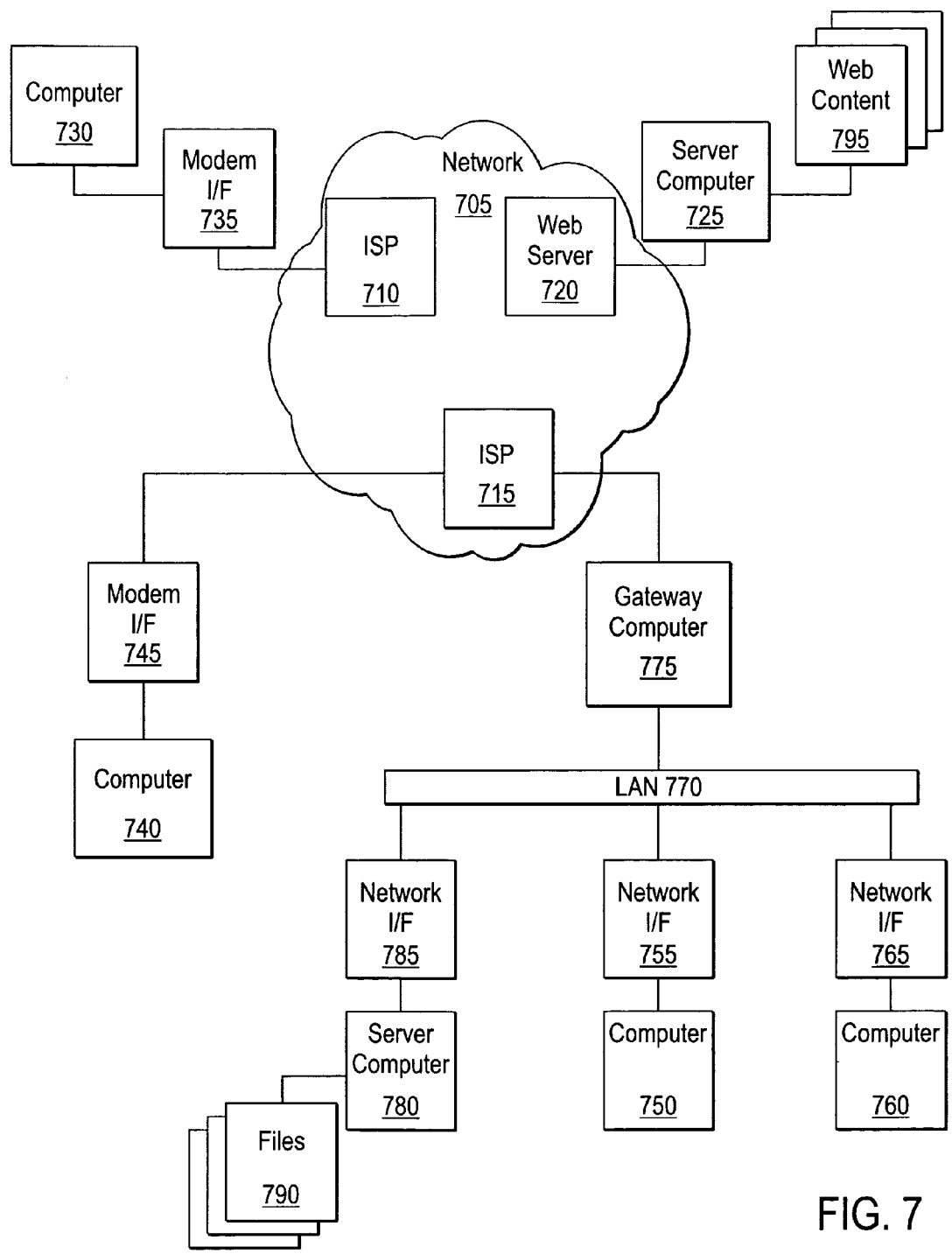
FIG. 7 illustrates an embodiment of a network which may be used in conjunction with forecasting data with real-time updates.
Figure 8:
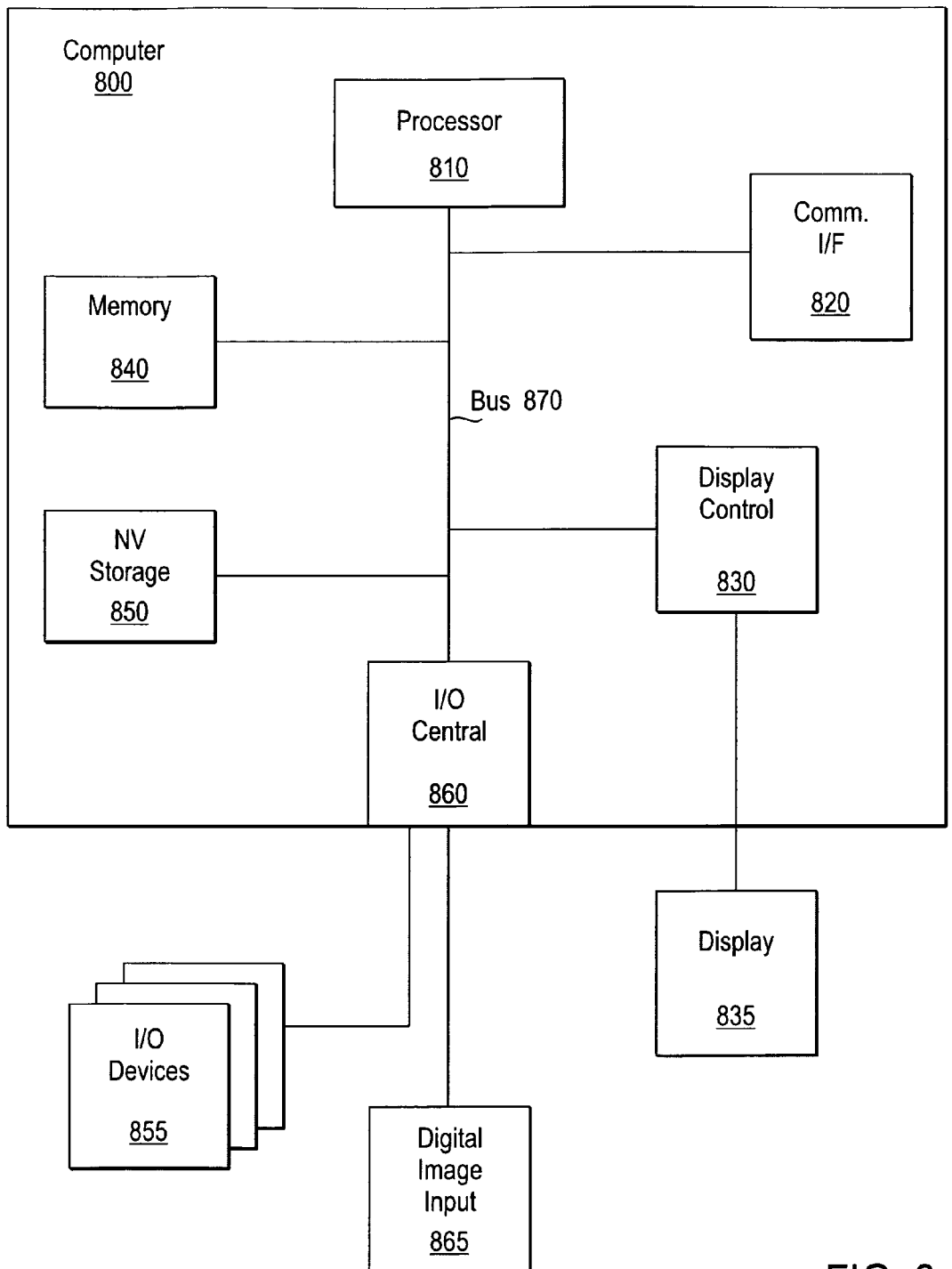
FIG. 8 illustrates an embodiment of a machine which may be used in conjunction with forecasting data with real-time updates.

The following description of FIGS. 7-8 is intended to provide an overview of computer hardware and other operating components suitable for performing the methods of the invention described above and hereafter, but is not intended to limit the applicable environments. Similarly, the computer hardware and other operating components may be suitable as part of the apparatuses of the invention described above. The invention can be practiced with other computer system configurations, including hand-held devices, multiprocessor systems, microprocessor-based or programmable consumer electronics, network pcs, minicomputers, mainframe computers, and the like. The invention can also be practiced in distributed computing environments where tasks are performed by remote processing devices that are linked through a communications network.

FIG. 7 shows several computer systems that are coupled together through a network 705, such as the internet. The term "internet" as used herein refers to a network of networks which uses certain protocols, such as the tcp/ip protocol, and possibly other protocols such as the hypertext transfer protocol (http) for hypertext markup language (html) documents that make up the world wide web (web). The physical connections of the internet and the protocols and communication procedures of the internet are well known to those of skill in the art.

Access to the internet 705 is typically provided by internet service providers (isp), such as the isps 710 and 715. Users on client systems, such as client computer systems 730, 740, 750, and 760 obtain access to the internet through the internet service providers, such as isps 710 and 715. Access to the internet allows users of the client computer systems to exchange information, receive and send e-mails, and view documents, such as documents which have been prepared in the html format. These documents are often provided by web servers, such as web server 720 which is considered to be "on" the internet. Often these web servers are provided by the isps, such as isp 710, although a computer system can be set up and connected to the internet without that system also being an isp.

The web server 720 is typically at least one computer system which operates as a server computer system and is configured to operate with the protocols of the world wide web and is coupled to the internet. Optionally, the web server 720 can be part of an isp which provides access to the internet for client systems. The web server 720 is shown coupled to the server computer system 725 which itself is coupled to web content 795, which can be considered a form of a media database. While two computer systems 720 and 725 are shown in FIG. 7, the web server system 720 and the server computer system 725 can be one computer system having different software components providing the web server functionality and the server functionality provided by the server computer system 725 which will be described further below.

Client computer systems 730, 740, 750, and 760 can each, with the appropriate web browsing software, view html pages provided by the web server 720. The isp 710 provides internet connectivity to the client computer system 730 through the modem interface 735 which can be considered part of the client computer system 730. The client computer system can be a personal computer system, a network computer, a web tv system, or other such computer system.

Similarly, the isp 715 provides internet connectivity for client systems 740, 750, and 760, although as shown in FIG. 7, the connections are not the same for these three computer systems. Client computer system 740 is coupled through a modem interface 745 while client computer systems 750 and 760 are part of a lan. While FIG. 7 shows the interfaces 735 and 745 as generically as a "modem," each of these interfaces can be an analog modem, isdn modem, cable modem, satellite transmission interface (e.g. "direct pc"), or other interfaces for coupling a computer system to other computer systems.

Client computer systems 750 and 760 are coupled to a lan 770 through network interfaces 755 and 765, which can be ethernet network or other network interfaces. The lan 770 is also coupled to a gateway computer system 775 which can provide firewall and other internet related services for the local area network. This gateway computer system 775 is coupled to the isp 715 to provide internet connectivity to the client computer systems 750 and 760. The gateway computer system 775 can be a conventional server computer system. Also, the web server system 720 can be a conventional server computer system.

Alternatively, a server computer system 780 can be directly coupled to the lan 770 through a network interface 785 to provide files 790 and other services to the clients 750, 760, without the need to connect to the internet through the gateway system 775.

FIG. 8 shows one example of a conventional computer system that can be used as a client computer system or a server computer system or as a web server system. Such a computer system can be used to perform many of the functions of an internet service provider, such as isp 710. The computer system 800 interfaces to external systems through the modem or network interface 820. It will be appreciated that the modem or network interface 820 can be considered to be part of the computer system 800. This interface 820 can be an analog modem, isdn modem, cable modem, token ring interface, satellite transmission interface (e.g. "direct pc"), or other interfaces for coupling a computer system to other computer systems.

The computer system 800 includes a processor 810, which can be a conventional microprocessor such as an intel pentium microprocessor or motorola power pc microprocessor. Memory 840 is coupled to the processor 810 by a bus 870. Memory 840 can be dynamic random access memory (dram) and can also include static ram (sram). The bus 870 couples the processor 810 to the memory 840, also to non-volatile storage 850, to display controller 830, and to the input/output (i/o) controller 860.

The display controller 830 controls in the conventional manner a display on a display device 835 which can be a cathode ray tube (crt) or liquid crystal display (lcd). The input/output devices 855 can include a keyboard, disk drives, printers, a scanner, and other input and output devices, including a mouse or other pointing device. The display controller 830 and the i/o controller 860 can be implemented with conventional well known technology. A digital image input device 865 can be a digital camera which is coupled to an i/o controller 860 in order to allow images from the digital camera to be input into the computer system 800.

The non-volatile storage 850 is often a magnetic hard disk, an optical disk, or another form of storage for large amounts of data. Some of this data is often written, by a direct memory access process, into memory 840 during execution of software in the computer system 800. One of skill in the art will immediately recognize that the terms "machine-readable medium" or "computer-readable medium" includes any type of storage device that is accessible by the processor 810 and also encompasses a carrier wave that encodes a data signal.

The computer system 800 is one example of many possible computer systems which have different architectures. For example, personal computers based on an intel microprocessor often have multiple buses, one of which can be an input/output (i/o) bus for the peripherals and one that directly connects the processor 810 and the memory 840 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 840 for execution by the processor 810. A web tv system, which is known in the art, is also considered to be a computer system according to the present invention, but it may lack some of the features shown in FIG. 8, such as certain input or output devices. A typical computer system will usually include at least a processor, memory, and a bus coupling the memory to the processor.

In addition, the computer system 800 is controlled by operating system software which includes a file management system, such as a disk operating system, which is part of the operating system software. One example of an operating system software with its associated file management system software is the family of operating systems known as Windows® from microsoft corporation of redmond, Wash., and their associated file management systems. Another example of an operating system software with its associated file management system software is the linux operating system and its associated file management system. The file management system is typically stored in the non-volatile storage 850 and causes the processor 810 to execute the various acts required by the operating system to input and output data and to store data in memory, including storing files on the non-volatile storage 850.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention, in some embodiments, also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, cd-roms, and magnetic-optical disks, read-only memories (roms), random access memories (rams), eproms, eeproms, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language, and various embodiments may thus be implemented using a variety of programming languages.

Figure 9:
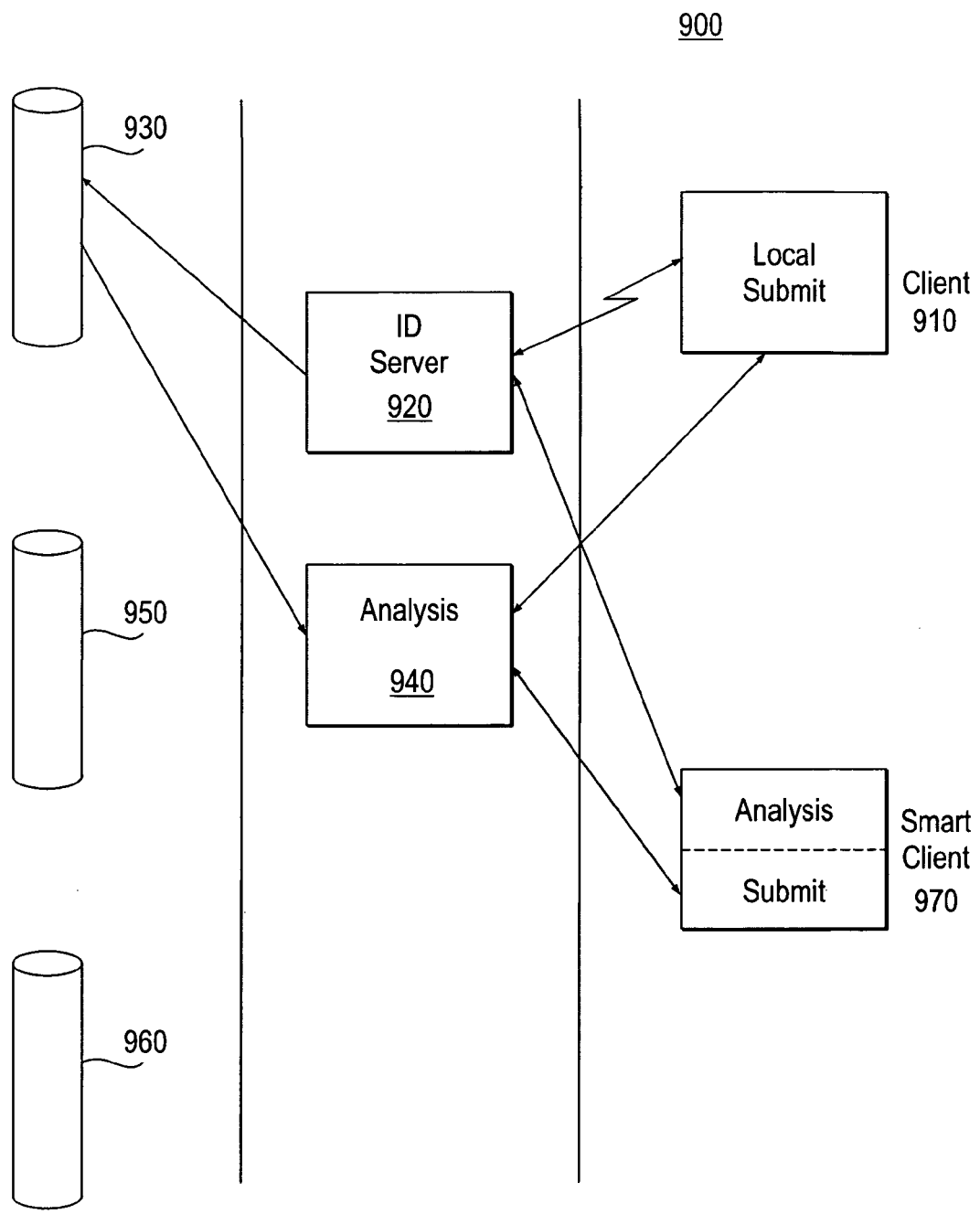
FIG. 9 illustrates an embodiment of a system for use in forecasting data with real-time updates.

Various networks and machines such as those illustrated in FIGS. 7 and 8 may be utilized. FIG. 9 illustrates an embodiment of a system for use in forecasting data with real-time updates. System 900 includes clients, servers, and supporting databases. Various embodiments of systems may be used, with different configurations as needed due to circumstances surrounding an implementation or installation of such a system. The system 900 may be used with various types of data which is suitable for both forecasting and for essentially real-time updates. Essentially real-time updates refer to updates provided to the system as soon as practicable—this may be immediate, or it may occur as soon as a person with the appropriate information is in a position to relay that information to the system 900.

System 900 includes a client portion, with clients 910 and 970, a server portion with identification server 920 and analysis server 940, and a database portion with databases 930, 950 and 960. In one embodiment, databases 930, 950 and 960 are each dedicated to specific customers (such as a first customer, second customer and third customer). Identification or authentication server 920 received access requests from various clients such as clients 910 and 970. Server 920 then authenticates or identifies the client(s) and current users to determine which database (if any) should be accessible. Analysis server 940 then starts receiving requests from the clients, allowing for analysis of data in the selected database.

Authentication and access may be handled in various ways. For example, once a client (client 910 for example) is authenticated, it may be redirected to the analysis server 940 with something such as a token which encodes an address for server 940 and information about which database (such as 930) to use. Alternatively, client 910 may receive a key (such as a portion of a public key-private key pair for example), which may be used to access a previously known address for server 940 (the key may enable a response for example). The key may also be required to be transmitted from server 940 to database 930 to access data, for example.

Analysis server 940 may be implemented in part using an olap cube. Olap cubes are available from various commercial entities, such as microsoft corp. Of redmond, Wash., for example. An olap cube may perform automated analysis of data when supported by a database such as database 930 for example, allowing for fast throughput of data and fast propagation of changes. In one embodiment, all analysis occurs at server 940, as client 910 is a local client used only to submit information and queries and to view information in the user interface. In another embodiment, client 970 is a smart client which incorporates some analysis capabilities (such as through a local olap cube and repository for example). Client 970, as a smart client, can then be operated in isolation from the network and server 940, while still allowing for analysis and display of data actually stored or replicated at client 970.

Figure 10:
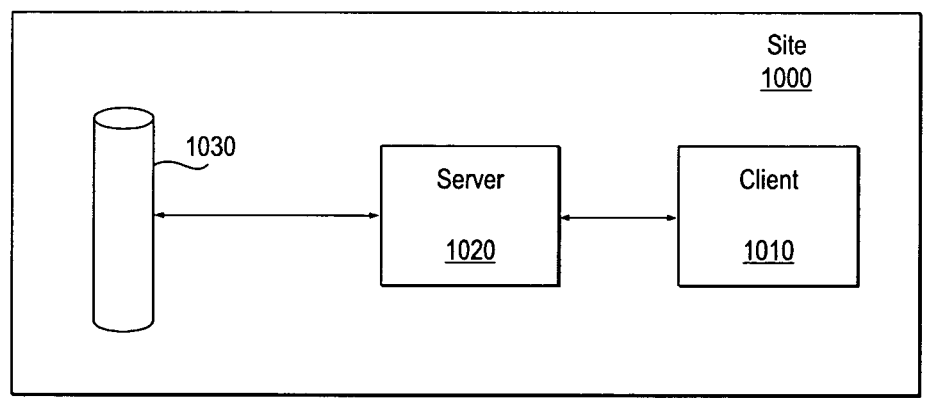
FIG. 10 illustrates an alternate embodiment of a system for use in forecasting data with real-time updates.

As illustrated, FIG. 9 reflects a system which may be distributed geographically and organizationally, thus allowing for revenue generation based on access to and maintenance of the system for example. FIG. 10 illustrates an alternate embodiment of a system for use in forecasting data with real-time updates. Site 1000 includes a client 1010 (potentially many clients), a server 1020 and a database 1030. As the system is self-contained, authentication may or may not be needed (site 1000 may be restricted to authorized users for example). Client 1010 may be implemented as a local client without analytical capabilities, or as a smart client, and server 1020 may be implemented for analysis with an olap cube for example.

Figure 11:
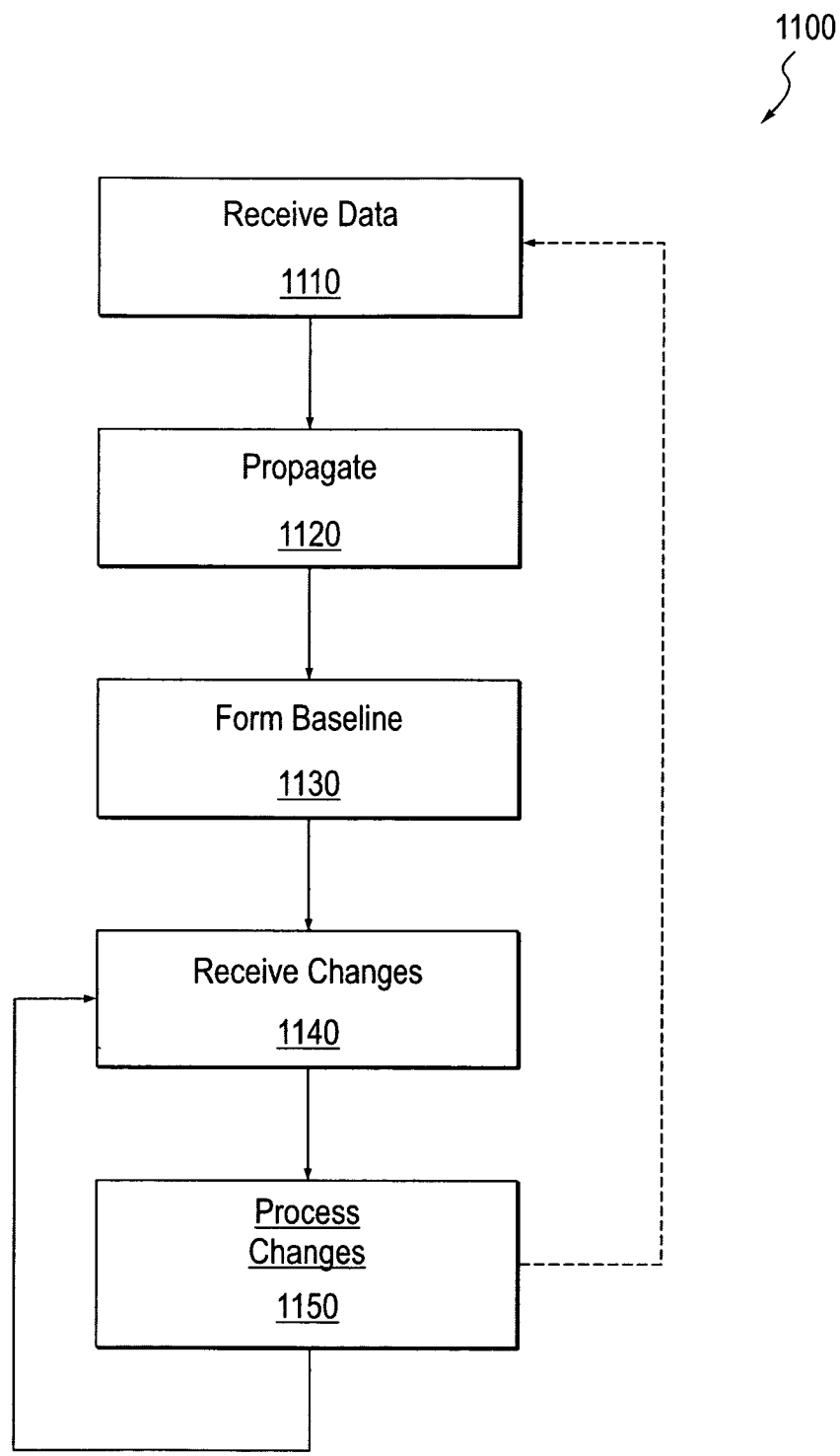
FIG. 11 illustrates an embodiment of a method for use in forecasting data with real-time updates.

How the systems and other embodiments operate may vary. FIG. 11 illustrates an embodiment of a method for use in forecasting data with real-time updates. The method (1100) and other methods of this document are illustrated as a set of process modules which may be rearranged and may be performed or operated in a parallel or series manner, for example. At module 1110, data is received, such as financial data for an initial forecast. At module 1120, the data is propagated in the system (such as in an olap cube or supporting database). At module 1130, a forecast baseline is formed, such as due to arriving at a deadline or due to a determination that enough data has been collected for example.

With the baseline available, some information about the forecast may change, and other information may remain static. At module 1140, changes are received. At module 1150, the received changes are propagated or processed, with updates propagating through the system, alerts or notifications being sent, and any recorded adjustments being applied as appropriate. Modules 1140 and 1150 may be executed multiple times in an iterative fashion as changes are received, thus allowing for essentially continuous and almost real-time updates. Moreover, as time comes for the next forecast (the next quarter for example), the process may return to module 1110.

Figure 12:
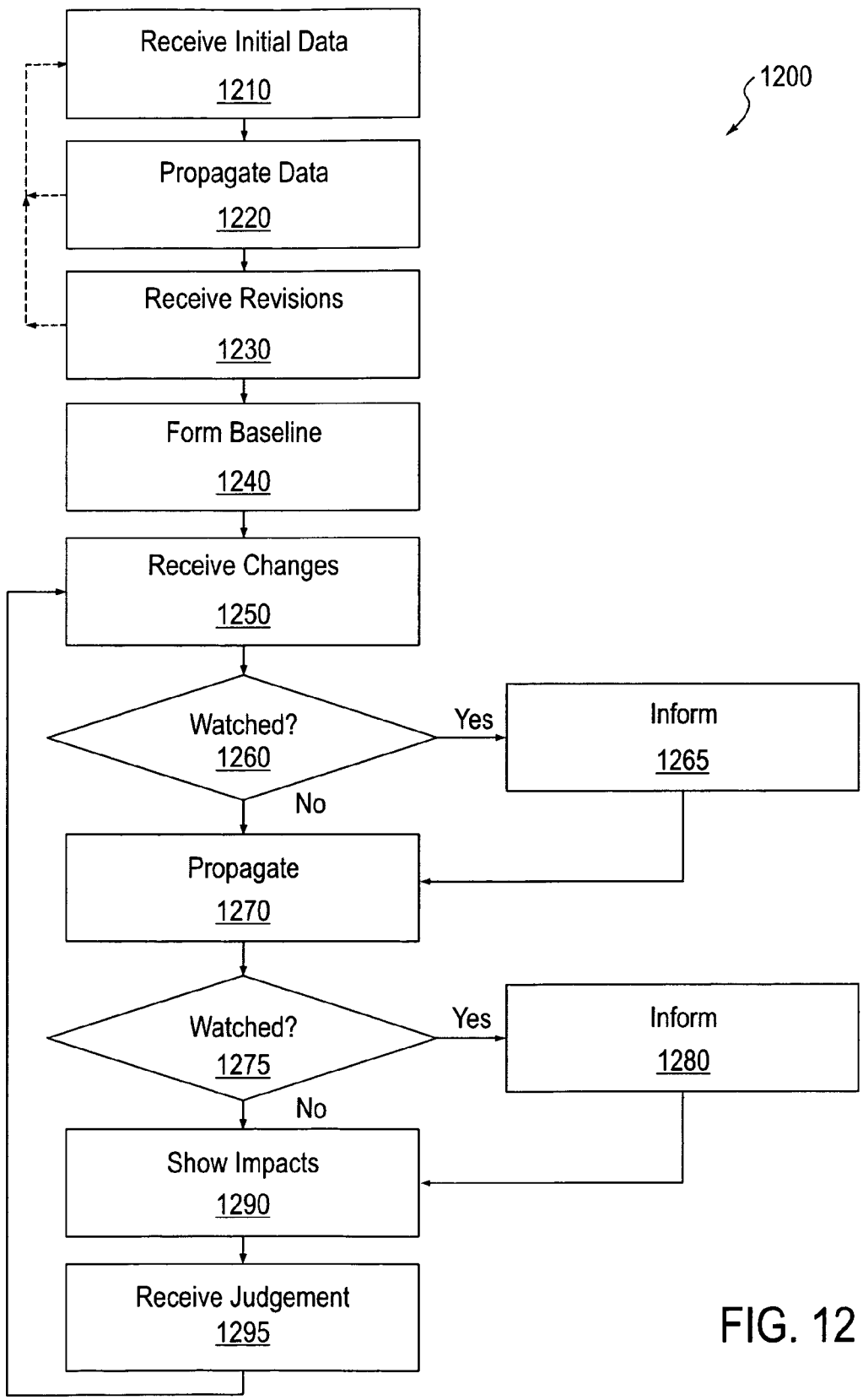
FIG. 12 illustrates an alternate embodiment of a method for use in forecasting data with real-time updates.

Specific processes may be utilized in some embodiments. FIG. 12 illustrates an alternate embodiment of a method for use in forecasting data with real-time updates. At module 1210, initial data of a forecast is received, such as raw data from sales representatives for example. At module 1220, the data received is propagated through the system. At module 1230, revisions to data, such as judgments applied to raw data leading up to a forecast are received. Such judgments may come from supervisors of sales representatives, marketing department personnel, manufacturing or engineering personnel, financial personnel, and even the ceo or other high-level personnel. Modules 1210, 1220 and 1230 may be repeated due to data arriving at different times or other variations in input cycles for example. At module 1240, the baseline is formed, with forecast data from modules 1210, 1220 and 1230.

At module 1250, changes are received, such as updates to previously forecast data. While some changes may be confirmations of forecasts (change from expectation to actual), many changes may be actual changes as orders come in at different prices, quantities and the like from forecasted data. At module 1260, a determination is made as to whether the actual changed data was watched. If so, at module 1265, notification is sent based on the watch request, with a level of detail appropriate to the request for the watch and system capabilities. At module 1270, the changes are propagated through the system, such as through an olap cube and/or database. At module 1275, the various datapoints that are affected are checked to determine if any of them are watched. If so, at module 1280, notification is provided based on the watch request. At module 1290, impacts to the forecast prior to receipt of the changed data are shown, preferably in a manner allowing for easy user interpretation of the data. At module 1295, judgment or adjustments are received from users responsive to the changed information, resulting in the receipt of further changes at module 1250 and so forth.

Further aspects and features of an embodiment may be understood with reference to a user interface for the embodiment and a description of how and why the interface changes. FIG. 13 illustrates display by product of information in an embodiment. As mentioned, information may be displayed by region, for example. As illustrated, display 310 provides information by product, with similar or the same information. The display 360 indicates that this is a display by product, for all families in the illustrated example. Just as the impacts may be provided in impact display 315 for regions, they may also be provided for products, such that impacts may be displayed based on the view of the data provided in display 310. Alternatively, a user may specify that impacts are provided at a global level, or other predetermined/preselected level for that user for example.

FIG. 14 illustrates display by customer of information in an embodiment. Again, the option of displaying information in a different way is illustrated. Rather then display by either part or region, display by customer allows for a determination of which customers are increasing orders, decreasing orders, or experiencing short-term changes for example. As the data is preferably stored with associations to customers, parts, regions, sales persons, and other relevant information, displaying the data in various different ways becomes possible. Moreover, as the data populates an olap cube, shifting between displays involves simply shifting from displaying one aspect of the information as it is maintained in the olap cube to displaying a different aspect of the information as it is already maintained in the olap cube. Note that the data may be displayed responsive to selecting the tab 385 (marked customers) and that display 360 indicates how the data is viewed.

Figure 15:
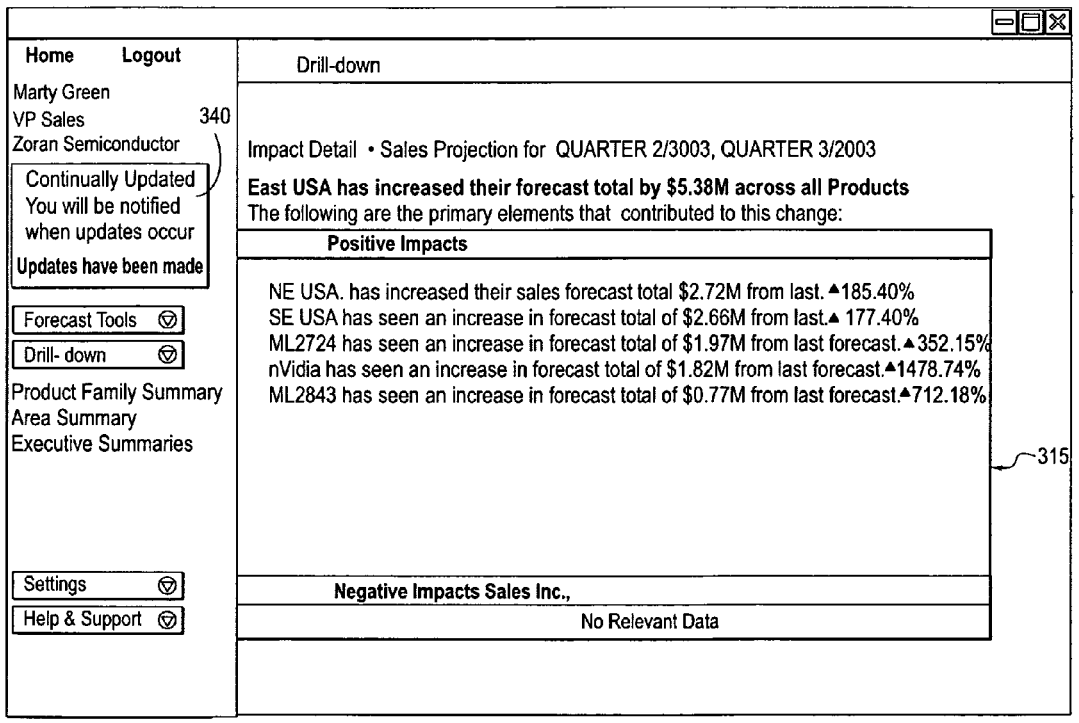
FIG. 15 illustrates display of a specific impact in an embodiment.

As illustrated above, the data in FIG. 13 and FIG. 14 is displayed before a forecast is compiled into a baseline. However, changes in data may occur at any time, particularly after the baseline is formed. FIG. 15 illustrates display of a specific impact in an embodiment. Impacts are translations into human understandable language (such as english for example) of changes in data as propagated through the system. In the instance illustrated, impacts display 315 is expanded to allow for closer examination of the impacts reported. Moreover, one may drill down into the impacts, to determine how the impacts came about or what the source of the impact is. Additionally, impacts may occur before, during or after formation of a baseline forecast. Thus, status indicator 340 indicates these impacts are being viewed after a forecast has been accepted (or after the user no longer has options for input), and further indicates that continuous updates will be received.

Figure 16:
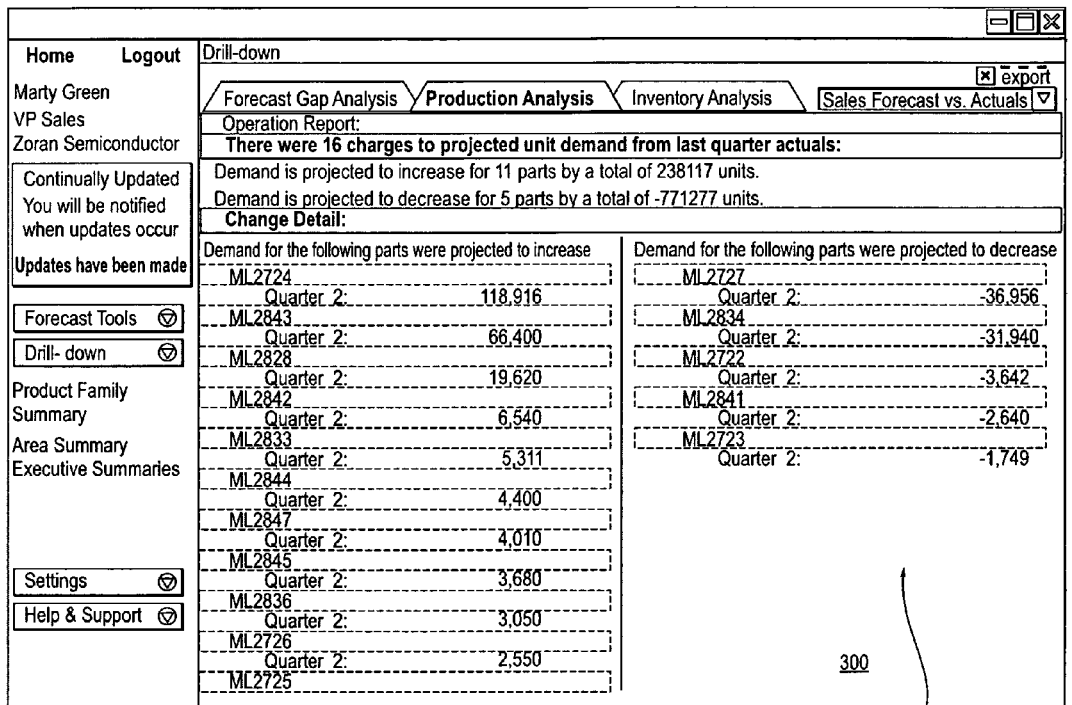
FIG. 16 illustrates an operations report for information in an embodiment.

Other presentations of the data are also available. FIG. 16 illustrates an operations report for information in an embodiment. Operations display 405 provides a view of the data based on an operational or manufacturing viewpoint, with information about changes in demand or absolute demand quantities illustrated and a summary of changes as well. Again, drilling down may also be an option, such that demand for a part may be broken down into when the demand will occur or why the changes are occurring.

FIG. 17 illustrates a forecasted change to inventory report for information in an embodiment. Unlike the view in operations display 405 of FIG. 16, the inventory report illustrated in operations display 405 focuses more on monetary value of the change impact of forecast updates, with both a summary and detailed information. Such a report may also be provided for services based on capacity to fulfill demand and actual demand.

Figure 18:
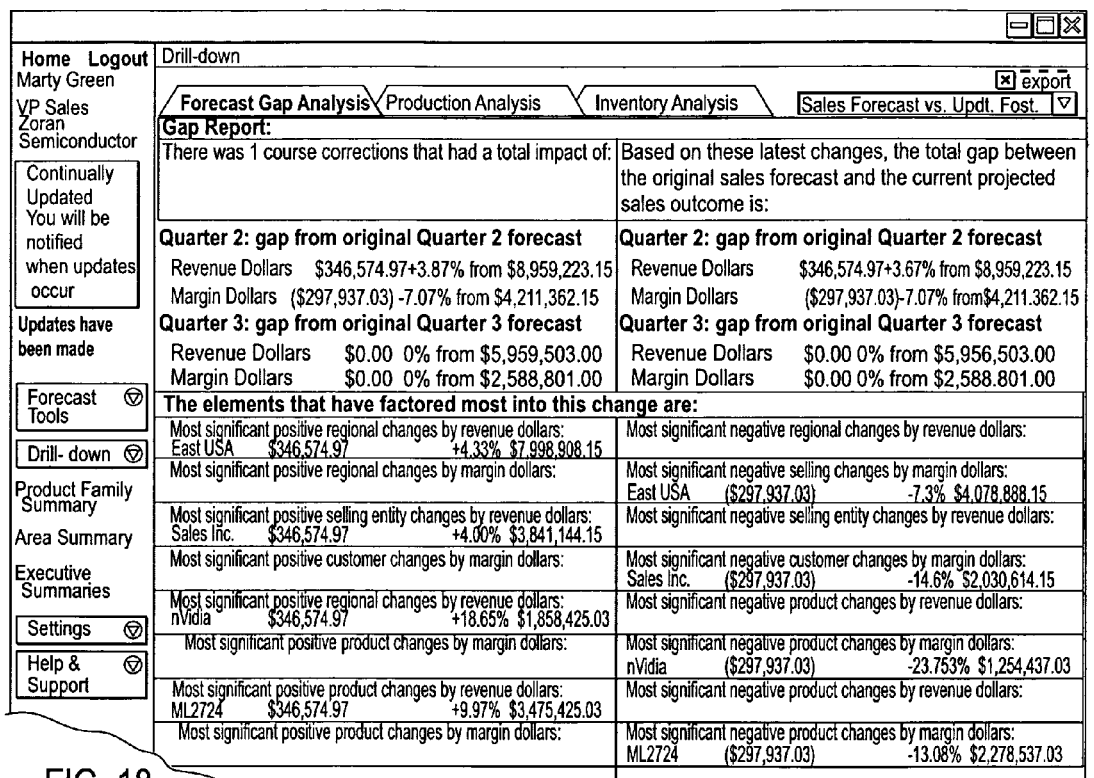
FIG. 18 illustrates a gap report for information in an embodiment.

Likewise, a gap report may also be provided in operations display 405. FIG. 18 illustrates a gap report for information in an embodiment. The gap report may provide a view of variances between a projection and current actual numbers, and thus indicate what orders need to happen to ensure that the company delivers on its expected forecast.

Figure 19:
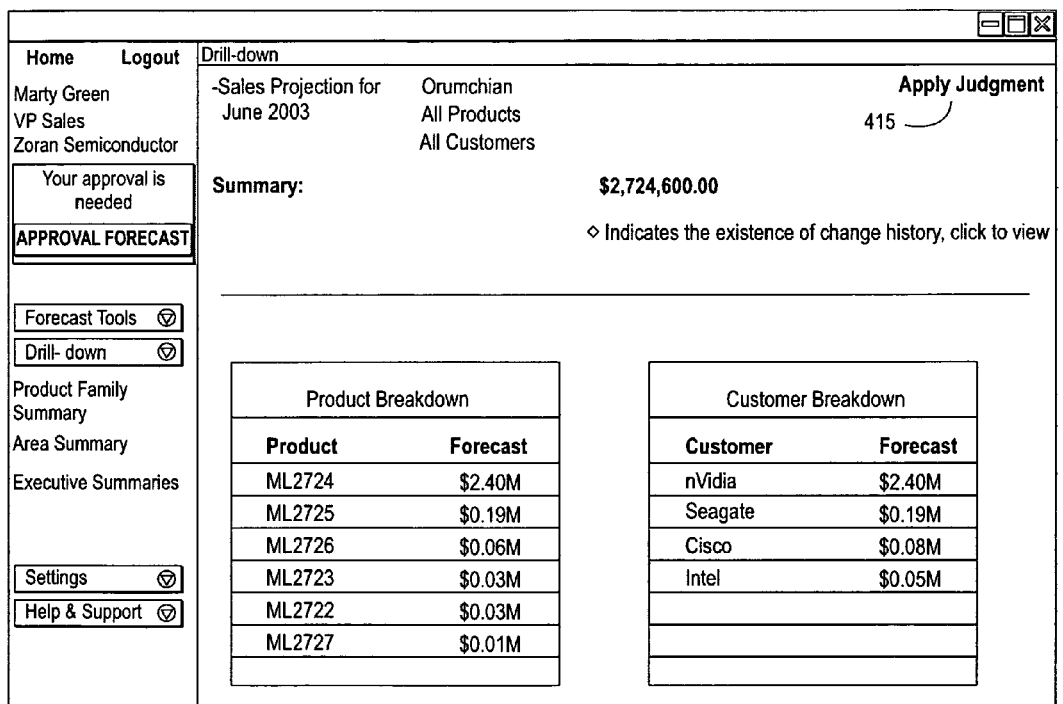
FIG. 19 illustrates a drilled down display of information for a sales person in one embodiment.

Drilling down is typically available, unless a user is restricted from such an action. FIG. 19 illustrates a drilled down display of information for a sales person in one embodiment. Based on an earlier projection, data for a single sales person may be displayed by drilling down on a display of data for multiple sales people (such as was found in FIG. 3 for example). Drill-down display 410 provides the details of the data making up the entry for one sales person. Moreover, if the user has authority to do so, apply judgment button 415 allows for entry of judgment about whether the forecast is accurate, or how it needs to change. This will be described further below.

Figure 20:
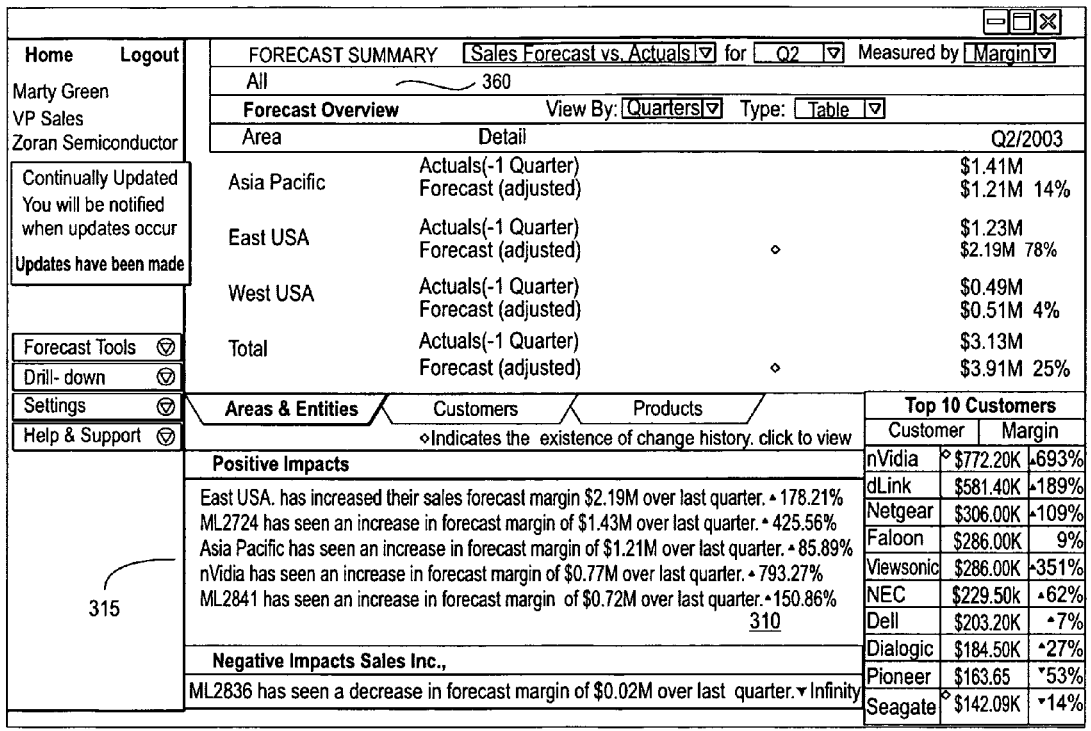
FIG. 20 illustrates an updated forecast in an embodiment.

Updates may occur while someone is viewing data such as drilled-down data, or when a user is offline. FIG. 20 illustrates an updated forecast in an embodiment. Note that changes may have occurred in the forecast for various reasons. The display 310 provides summary data, with some of the data flagged by balls indicating changes in the forecast. Such changes may be the result of applications of judgment (post-forecast) or of actual changes to forecasted data based on real-time updates. Impacts display 315 may provide further information in some instances, such as when an actual change provides an impact.

Figure 21:
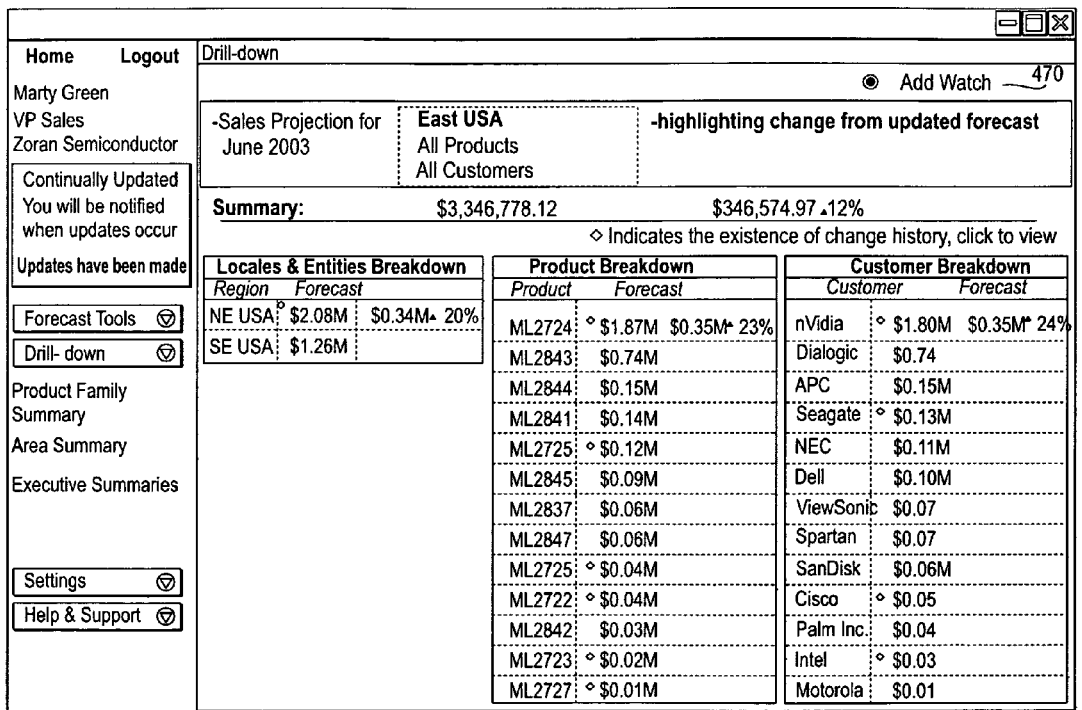
FIG. 21 illustrates a drilled down display of a region in an embodiment.

In pursuing information about updates, one may view drilled-down data and corresponding changes or information. FIG. 21 illustrates a drilled down display of a region in an embodiment. Drill-down display 425 presents data specific to the region selected in this illustration, such as sub-region-specific, part-specific and customer-specific information. Thus, drill-down display 425 may present a different view from that provided in display 310 for example. Moreover, add watch button 420 allows a user to watch a given data point for changes, over a certain threshold, within a certain time, or otherwise, for example.

Both judgments and watches may be understood with reference to further illustrations. FIG. 22 illustrates application of judgment in an embodiment. Judgment interface 430 includes value change option 440 and percentage change option 460. Value change option 440 includes type 445 (units or revenue for example) and value 450 (amount of change for example). Percentage change option 460 includes direction 465 (increase/decrease), type 470 (revenue or units for example) and amount 475 (the amount of change for example). As illustrated, a change by value is executed, with a set amount provided—the end result of the change is specified. With a change by percentage, the amount of change (delta) is specified. Additionally, because a change (judgment) is being entered, status 340 indicates that an approval must be provided for the change to take effect.

FIG. 23 further illustrates application of judgment in an embodiment. In this instance, since a judgment has already been applied, judgment history 480 is populated with an entry which is displayed. This may allow a user to avoid a redundant judgment entry, or may provide context for future applications of judgment. Again, a judgment is being entered in value change option 440, thus further changing the data in question.

FIG. 24 illustrates a forecast after application of judgment in an embodiment. With the change entered, a view of the original data provides an indication that judgment has been applied. In particular, judgment indicator balls 510 are now present, indicating the presence of judgment history associated with the displayed data or with data aggregated into the displayed data. As one may expect, drilling down to the changed data will allow one to see a judgment history such as history 480 of FIG. 23. FIG. 25 illustrates change history for information in an embodiment. By drilling down, or by selecting the judgment indicator ball 510, the history 520 is displayed, including information about who entered the judgment, type of change, who it affected, and the amount of the change. In the illustrated example, the sales person responded to the judgment after the forecast was made by providing a further correction.

Figure 26:
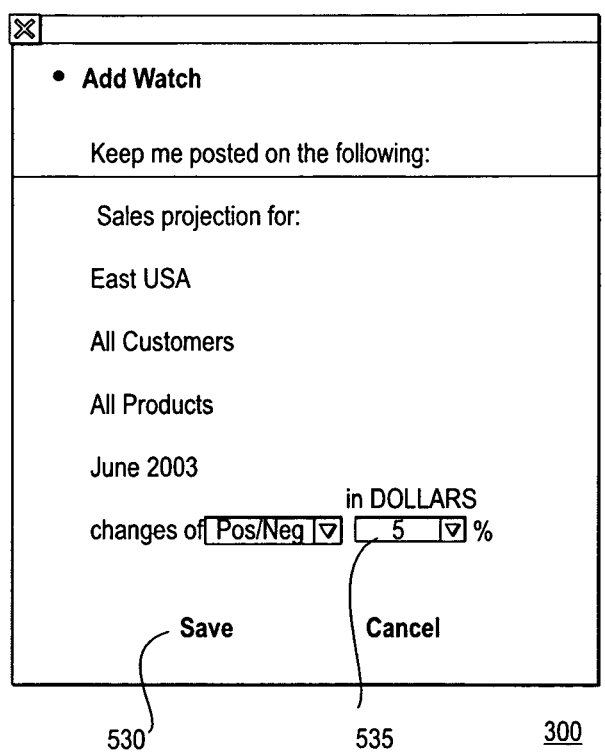
FIG. 26 illustrates addition of a watch in an embodiment.

While judgments change the forecast, watches indicate changes, either actual or forecast. FIG. 26 illustrates addition of a watch in an embodiment. Watch window 530 pops up when application of a watch is selected, and includes change type 535 in which the amount of a change to be watched for is entered. Thus, the user can control whether a very small change, a catastrophic change, or some intermediate change triggers the watch. Typically, a watch sends an email or similar message to the user setting the watch once the predetermined threshold is reached or exceeded (missed or undershot).

When data is changed from an original value to a new value, such as in response to a request to apply judgment, this may have a number of effects. This may be a change in percentage or absolute terms for example, and may result from specific expectations or information, or from general expectations (hunch, intuition, etc.) For example. The change to the data results in a propagated change to other data. Alternatively, a change could be made to other data with changes back-propagated to some or all of the data contributing to the changed data. Moreover, if a piece of data is set for watching, with notification to the user should the data change, and a change propagates through, this may trigger the watch alert. Watching may be set for any change, changes above a specified threshold, or changes before a certain date for example. Also, watches may not be required to detect changes that would be visible, such that if the display generally is in billions, a change in the thousands may be sufficient to trigger a notification.

While illustrations of changes have been provided on a high-level basis (the whole world for example), changes of unit quantities may also occur. Information for a single product may be displayed over a geographical area, rather than for a geographical area for all products for example. Information may also be displayed for a set of customers for a single product or product line, for example, or on other bases. Moreover, the information may be displayed in units of product rather than currency. Preferably, information on both a currency number and a units (quantity) number is stored. Thus, display of information in the user interface may be shifted between the two types of displays. The units may be a physical quantity (number of parts or devices for example), an estimated physical quantity (number of meals served for example), or some form of service metric (number of hours billed for example). Moreover, the various datapoints may be absolute numbers or scaled (such as quantity in thousands for example). Also, watches and judgments may be applied on a quantity basis rather than a currency basis.

Because specific products or services may be tracked, updates may be based on changes in a single order or a long-term relationship for example. A customer may decide to exit a business or discontinue a product, thus ending a need for a purchased component for example. Similarly, a vendor may decide to discontinue a product, thus requiring a customer to ramp up purchase to ensure an adequate stockpile after the component is discontinued. Such resulting updates may be a confirmation or cancellation or other change to a forecasted order, for example. Moreover, such updates may propagate further up. Additionally, any judgments may be dynamic (reduce a number by 10% always for example), or may be conditional (reduce a forecast number to x until it decreases to x). Thus, propagation may stop prior to reaching every related data point.

Further Considerations for Financial Embodiments

The following description of an exemplary system related specifically to financial data provides details of an embodiment, along with implementation details which may be incorporated in various embodiments. The features and details may be used in part in other embodiments within the spirit and scope of the present invention, and may be combined with other features and details described previously. In particular, most of the details provided are appropriate for many types of data, and are not restricted to financial data.

The system, in one embodiment, lets companies streamline the process of creating a bottom-up forecast of sales and financial data. In one embodiment, this includes collecting the data from those on the front lines. This may include receiving data from sales representatives, distributors, representative firms, customers, retailers, or other sources of forecast data. Following this, the data may be aggregated within the system, and the system may then allow sales and marketing management to apply judgment. The hierarchical judgment applications may be tracked, such as by maintaining data about judgments applied to specific data and to corresponding changes to other data. Moreover, prior to or after applying judgment, the consequences of the judgment applied may be understood, as the changes flow through the data (as implemented by the olap cube), and are displayed. Moreover, analytical tools may also be employed to understand the data. Examples of such tools include regression analysis, statistical analysis, data mining, and correlation analysis among other tools.

After an initial review of the data provided, a sales vice president or similar person in authority may create an official forecast baseline, preferably after the person has understood, judged and approved the data that has been rolled up to him. At this point, the person may release the data for others in the company to consume; and define the baseline against which updates will be tracked. The baseline may be yearly, quarterly, monthly, bi-weekly, weekly, even daily if desired, and may be implemented on some other time-frame. Moreover, multiple users or persons in authority may play a role in building the forecast or modifying the forecast, such as by allowing for marketing input for example. Thus, some portions of the forecast may come from marketing; marketing may apply judgment at some point in the process; or marketing may provide longer-term forecasting (in contrast to shorter-term sales forecasting) for example.

The released forecast then provides departments within the company, such as production, engineering and operations, insight into what will need to be built, both when and where. Moreover, this allow for vetting (and thus feedback) from production, and may allow for prediction of trends for parts or supplies for example. Similarly, this allows finance departments to analyze and predict financial data such as a gross margin, either on a line-by-line level or at an enterprise level, for example. This then allows for planning of capital needs and for simulation or 'what if' type of scenarios, both within the system or in a separate financial system. Additionally, finance departments can provide feedback to the baseline as well, such as by indicating which accounts are doubtful and should be discouraged until payment is more reasonable, or by indicating what expected financial trends may do to various industries.

From this, the ceo may then see all perspectives of the forecast, along with the broad overview of the forecast. This allows the ceo to obtain 'one number' for the entire company—allowing for intelligent discussions with media and outside interests when the ceo interacts with the public. Alternatively, the ceo can track a set of numbers and associated relationships, allowing the ceo to also understand the perspectives within the company which relate to these numbers. Moreover, this provides a clear and detailed view of expected developments of the company. As the ceo may also simulate changes, apply judgments or watch numbers (along with other departments and people), the ceo and staff may then analyze potential changes. As such, this facilitates key decisions a ceo may need to make. Such decisions, whether made by the ceo or some other member of the company, may include determining what parts to retire and when; how much of internal resources to allocate; where to invest based on what appears to be driving the business; how to streamline internal operations; and how to maximize capital efficiency for example.

With the baseline in place, not only analysis and feedback, but also real-time updates are available. The system may show the impact of changes if they pass a certain threshold, and show the impacts by department, group or otherwise. This then allows the company to react to external (market for example) forces, allows all groups to consider and agree on options to handle changes, and allows for a group or consensus decision on whether or not to choose specific options.

In one embodiment, the process may be described as follows:

Data collection is automated, to the extent possible. This may include sending out automated reminders to those generating the data (or inputting the data they observe for example). The users or forecasters (who may be sales people with many other demands on their time) enter data using a simple user interface which is robust enough to trap or catch common errors such as entering too many or too few zeros, unintentionally large or small changes, or incomplete data or omissions for example. Moreover, the user may be provided data to help create the right forecast. For example, a backlog may be used as a starting point, or the last forecast may be used as such a starting point. Additionally, feedback may be provided on forecast accuracy, such as by attempting to curb over-optimistic forecasts or sandbagging.

With data entered, or with a deadline approaching or past, notifications may be sent to those who are tasked with reviewing and judging the data. Notices may relate to delinquent forecasts, forecasts in and ready for approval, or problems with forecast creation for example. The system provides tools to view the data, view aggregated data (which may be viewed or drilled down to various levels), apply judgment (globally or locally for example), send forecasts back for rework/correction/reconsideration for example, and approve the forecast (and/or send to the next hierarchical level).

Preferably, the interface is simple, with controls that change global perspective (such as switching to a graphic or tabular view for example). This may further include providing comparisons to various time periods (such as a previous forecast, successive quarters, year on year comparisons, and current information versus baseline comparisons for example). Similarly, comparisons to actual sales or actual data may be provided.

Moreover, data may be shown in various forms, or with various aspects of the overall collection of data displayed, and data may be drilled down from higher to lower levels of data aggregation, ultimately to atomic data levels. Thus, data may be provided as revenue, units, gross margin currency, gross margin percentage, simple margin currency, simple margin percentage, average selling price, or in any other format either collected or derivable from collected data. Similarly, data may be sliced by various means, such as by region, customer, part (or service), or by some custom aggregation of atomic data or previously aggregated data for example. A custom aggregation may allow for display of data by program, segment or other varying groupings of data for example.

Moreover, data may be displayed based on various breakdowns. For example, users can drill into any value at any point by clicking and may then see what makes it up. Thus, users may break down data on parts, customers, or regions for example. Similarly, users can then click on any subentity (such as a division of a customer or a part of a region for example) to get further breakdowns.

In some embodiments, baseline creation and continuous updates form separate tasks and may have separate interfaces. Thus, a different business process may be used for each. Creating a baseline is often oriented towards a bottom-up commit—sales people providing commitments to the company for example. Creating updates is often more of a change notification prompting or requiring decisions and/or action—the biggest customer starts canceling orders and high-level executives need to act right away.

With the data stored in the system, this enables continuous updates—a change may be propagated essentially immediately. The system may immediately notify all groups to a change in terms that make the impact (of the change) clear. These groups may include sales, marketing, production, engineering, operations, finance, and executive groups for example. Moreover, the updates may be provided using a simple client or interface, and may be tied to production to ensure that sales people will get goods for their customers in the right quantities at the right times.

While continuous and essentially real-time updates provide a fairly accurate picture as changes occur, judgment may be used to predict changes, and judgment histories may be employed to determine when predicted changes occur, or whether predictions are already integrated into a forecast. Judgments may be applied hierarchically to forecast data. Thus, a judgment may be applied to a high-level number, and then changes may be cascaded or propagated to lower levels, allowing users to see the effects of the judgment.

Tracking and inspecting the history of judgments applied (by attaching judgments and judgment history to data for example) allows users to determine whether judgments should be reversed for example. Moreover, variances of actual results from judgments may be examined and analyzed. Additionally, as judgment may be applied prior to or after a baseline is formed, differences of pre-baseline versus post baseline judgment may be tracked.

While judgments allow for predictions, watches allow for action. Every user has the opportunity to design custom notifications around anything they can see from their vantage point in the system. Thus, the user may choose to watch a data point for a particular customer, part, service, time period, or other data point, as long as it is visible. The user may set a custom threshold for notification, and a users may create and save collections of watches with corresponding messages that can be turned into reports for example.

Further analysis and related judgments and watches may be applied to custom aggregations of data. Preferably, the system lets customers aggregate data in any way they choose. For example, part data may be aggregated based on programs. Customer data may be aggregated based on market segments, region data may be aggregated based on climates, selling entity data (salespeople, representative, etc.) May be aggregated based on performance. Each of these aggregations are exemplary, and illustrative of the options for aggregation provided in part due to use of the olap cube. These aggregations may be employed for a variety of purposes, including simple reporting, analysis, or export to other systems for example.

Impacts of changes are often an important goal of analysis, watches, judgments, aggregations or any other exercises carried out on financial data. The system automatically determines what the biggest impacts are and displays them by absolute rank and relative change percentage—basically by tracking changes as they occur and maintaining a set of lists of such information. This allows users to drill down into sources of the biggest impacts. Moreover, impacts are provided according to whatever the drill down perspective is, (such as through context sensitive impacts) in some embodiments.

Multiple Organization Considerations

The system described above can be used profitably by a single organization. However, having multiple organizations using the same system requires that data be segregated to satisfy confidentiality concerns, for example. As indicated previously, data repositories may be separate, either logically or physically (or both). Moreover, processing facilities may also be separated, logically and/or physically. Thus, a first user may use a first client to access a system, and thereby access a first data repository using an olap cube. A second user may use a second client to access the system. In so doing, the second user may access a second data repository, and would preferably use a different olap cube or at least a different instantiation of an olap cube or cubes.

Thus, each user, or at least each organization, has access to olap cubes which in turn work only with data from a dedicated repository. Moreover, each dedicated repository may have associated with it customizations for the organization and/or user in question. Thus, an instance of an olap cube may effectively be customized for the user or organization when access to the dedicated repository is granted.

By providing dedicated instances of olap cubes and dedicated repositories, a flexible structure which may be hosted across multiple servers is formed. This supports providing a web-hosted application, such as through use of asp technology. Multiple users or organizations may be supported through dedicated repositories, dedicated instances of olap cubes, and shared supporting software and physical resources. Similarly, this architecture does not tie down the location of physical resources, allowing for either distributed resources (such as geographically separated servers and networks for example) or concentrated resources (such as server farms for example). Considerations such as geographic diversity/redundancy or ease of maintenance may come into play because the technology allows for such flexibility.

Further Examples of Various Embodiments

Specific details of various embodiments may be understood with reference to the following description and accompanying figures. The various embodiments may share features with other embodiments, such that an embodiment may incorporate features from several different embodiments illustrated herein, even though those features are not specifically illustrated together in a single embodiment. Similarly, various embodiments need not include all of the features or aspects illustrated in an embodiment, provided the embodiment still meets the claims.

Feedback

Figure 27:
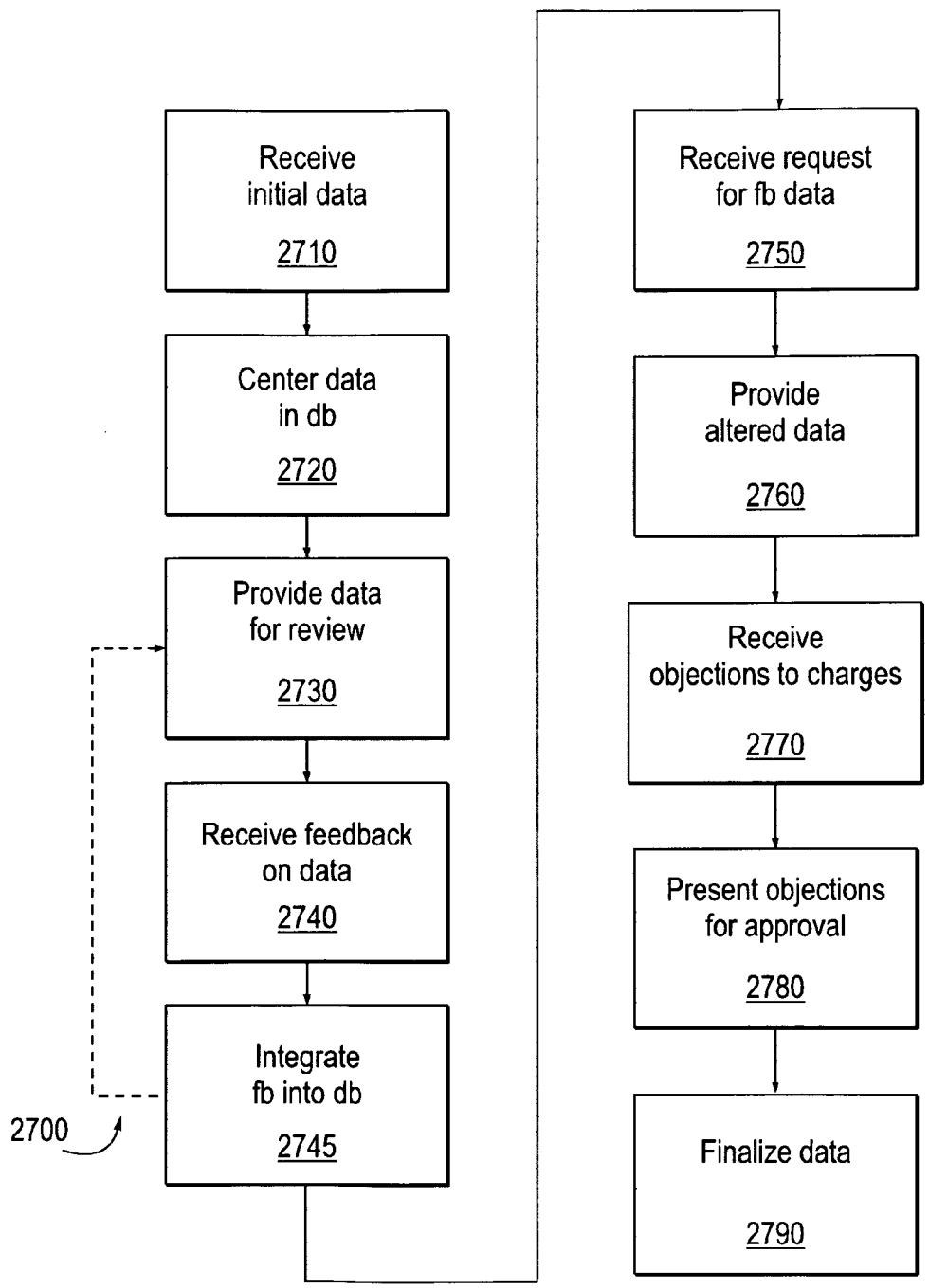
FIG. 27 illustrates an embodiment of a process of providing feedback in a real-time forecasting system.

One example of a feature present in some embodiments is a feedback capability. FIG. 27 illustrates an embodiment of a process of providing feedback in a real-time forecasting system. Process 2700 relates to providing such feedback, and includes collecting data (receiving data), receiving feedback on that data, providing the altered data or data with feedback to the original user providing the original data, and receiving and checking for approval further changes to the data after feedback is received.

Process 2700 begins at module 2710 with receipt of data, such as forecast data entered by a field operative for an enterprise. At module 2720, the entered data is integrated or submitted into a database, and may also be populated into an olap cube, for example. The data is then provided for review at module 2730, presumably with data collected from other field operatives. Feedback information is provided for the data at module 2740, including changes to data and other forms of feedback. This feedback may take on various forms, and may be entered by various people or entities. At module 2745, the feedback data is integrated or entered into the corresponding database, and may also be populated in an olap cube, for example. Modules 2730, 2740 and 2745 may form a subprocess which is repeated for various people, organizations or groups, for example.

At module 2750, a request is received for data in its current state from a field operative. Thus, the field operative is seeking data after feedback information has been provided. The altered data is provided in response to the request at module 2760, such as through a database request for information related to a given user, for example. Thus, the user may view information or data which is visible based on an associated userid (e.g. Data the user has privileges for or is authorized for) or may view data based on what information the user originally entered, for example. At module 2770, the user may provide objections to changes to the data, such as contesting changes to some or all of the data, or contesting the reasoning behind such changes if available. These objections are received by the system, and may be submitted for review by a predetermined user at module 2780—thereby allowing for intelligent adoption or rejection of objections or changes. At module 2790, the data in question is finalized, signaling that the data will not change further, at least during the present data entry/modification cycle.

Figure 28:
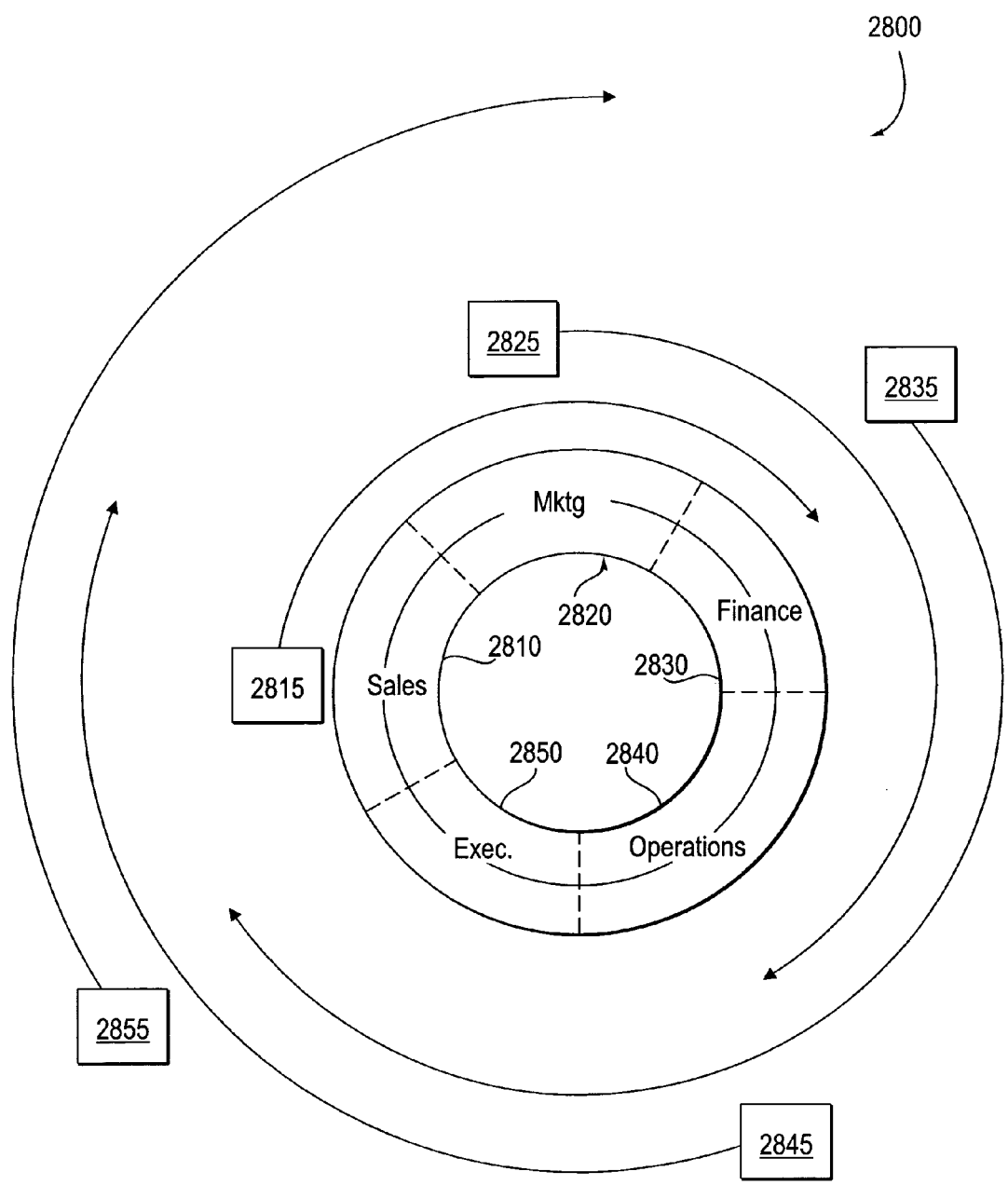
FIG. 28 illustrates relationships between various groups and data associated with those groups in an embodiment.

In some embodiments, real-time forecasting may be used in commercial enterprises to forecast sales, production, and related revenues, for example. FIG. 28 illustrates relationships between various groups and data associated with those groups in an embodiment. System 2800 represents the internal system for forecasting of a commercial enterprise, with relationships between various departments illustrated in an exemplary manner.

Sales group 2810 may present an initial sales forecast 2815, representing an expectation of what sales will be for an upcoming period of time, such as an upcoming month. This sales forecast 2815 may provide a baseline for comparison against actual performance and against forecasts from other parts of the organization. Based on sales forecast 2815, marketing group 2820 may then provide a marketing forecast 2825, providing input on how marketing thinks actual results will differ from the sales forecast 2815, and potentially providing reasoning for differences as well. This input may be provided on a macro or micro level, either as a broad adjustment to an entire category (geographical region, customer, industry, product, for example) or to specific forecasts from particular people, for example. Thus, forecast 2825 may form a marketing baseline in some instances.

Building on forecast 2825, finance group 2830 may then provide forecast 2835, which may be expected to reflect finance group 2830 judgment about forecast 2825. The judgment reflected in forecast 2835 may reflect expectations about cash flow, customer payments, inventory, or other areas of concern tracked by finance group 2830. Similarly, operations group 2840 may provide forecast 2845 based on forecast 2835 and expecations about capacity or other operational factors. Finally, executive group 2850 may use forecast 2845 as a baseline to generate forecast 2855, after applying expecations of executive group 2850 to the data of forecast 2845. Note that forecast 2855 may be dependent on components of various forecasts or baselines, such that the finance baseline 2835 may be deemed more reliable, or the marketing baseline 2825 may be viewed as trustworthy by executive group 2850. Similarly, this strategy may be used for parts of forecasts, thus allowing a baseline 2845 to be adopted for some areas, but allowing other areas of an ultimate forecast to start from one of baselines 2815, 2825 or 2835, for example.

Figure 29:
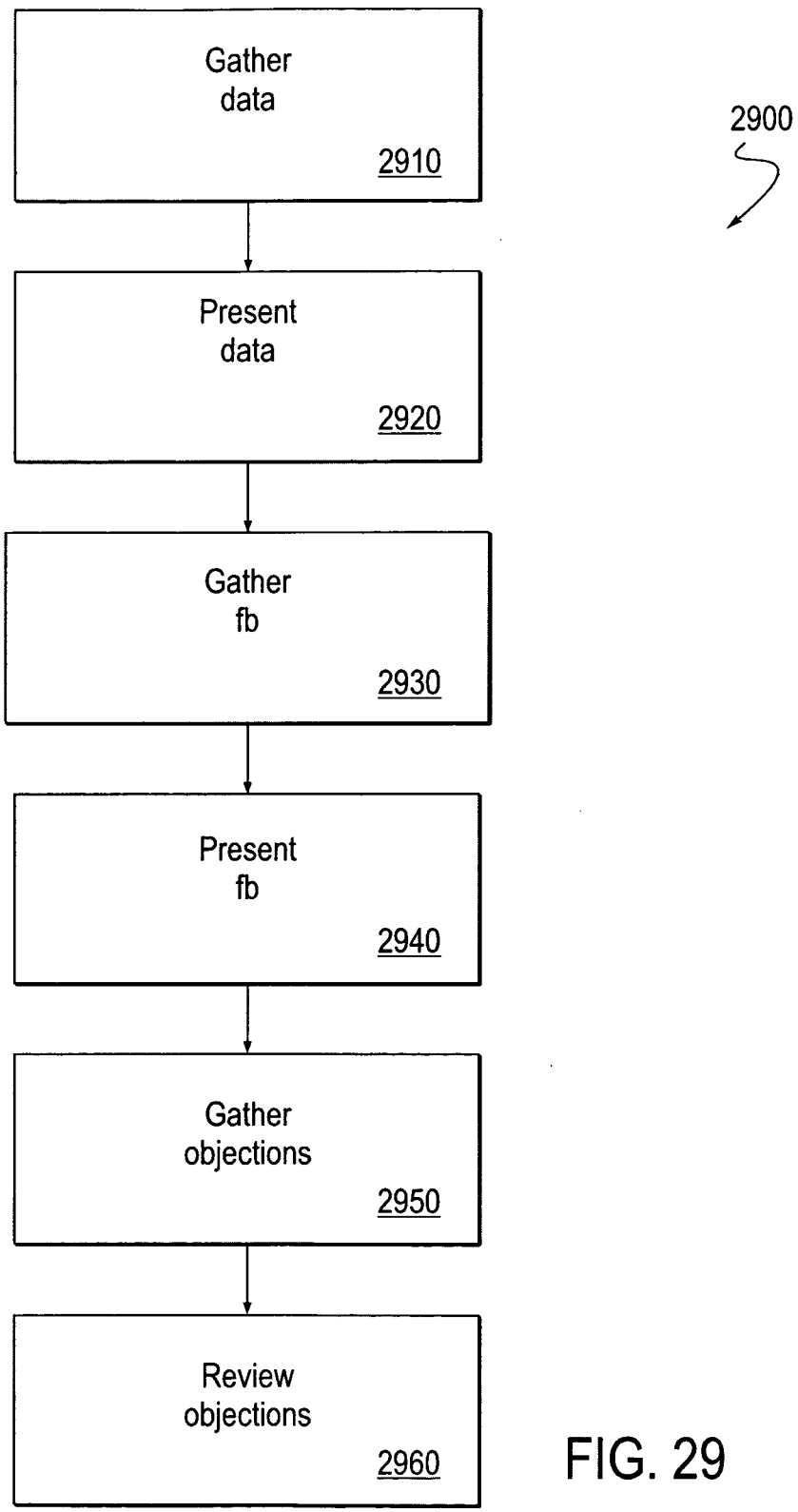
FIG. 29 illustrates another embodiment of a process of providing feedback in a real-time forecasting system.

Preparation of baselines and achievement of related objectives involves forecasting expectations, providing feedback on those forecasts, and reviewing objections to feedback. FIG. 29 illustrates another embodiment of a process of providing feedback in a real-time forecasting system. Process 2900 includes gathering data, presenting the data, gathering feedback, presenting the feedback, gathering objections to the feedback, and reviewing objections.

Figure 30:
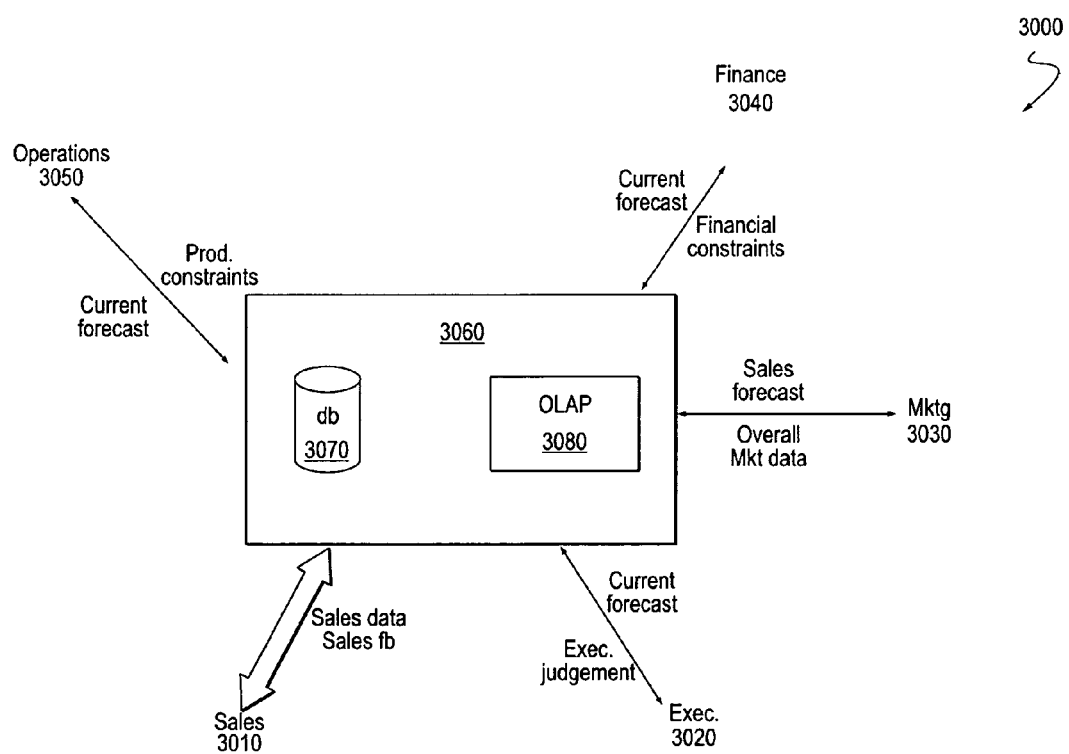
FIG. 30 illustrates a real-time forecasting system and its relationship with various groups in an embodiment.

Process 2900 begins with gathering of forecast data at module 2910. Forecast data is then presented to reviewers at module 2920. Feedback (changes, commentary, for example) on the forecast data is gathered from reviewers at module 2930. The feedback is then presented to providers of the forecast data at module 2940. Objections to the feedback are then gathered at module 2950, and those objections are reviewed as appropriate at module 2960.

Where data comes from (and where it goes) in a forecasting system may illustrate how feedback is provided. FIG. 30 illustrates a real-time forecasting system and its relationship with various groups in an embodiment. System 3000 includes a forecasting system, and interfaces (interaction) with sales, marketing, finance, operations and executive groups. The information flowing back and forth between the forecasting system and the various groups provides for forecasting, feedback and changes to forecasts, and training on future forecasts.

Forecast system 3060 includes a database 3070 which embodies forecast data and an olap engine 3080 which interacts with database 3070 to provide access to data in particularly flexible ways. Sales group 3010 provides forecast data to system 3060 and receives back forecast feedback information, such as indications of whether forecast data seems unreasonable, has been changed due to market conditions, or has been changed due to prior forecast performance, for example. Sales group 3010 may also provide commentary or objections to feedback, either due to organizational commitments or due to differing judgments, for example.

Marketing group 3030 similarly reviews sales forecasts and provides overall market data, either through specific data input or through changes and comments on sales forecast data. Finance group 3040 receives/reviews an overall forecast, and provides information on financial constraints, such as through separate data inputs or through suggested changes to forecast data, for example. Similarly, operations group 3050 reviews the current forecast data and provides data on production constraints, such as by adjusting forecast data for example.

All of this data interaction provides a forecast which executive group 3020 may review and alter. Alteration may occur through application of executive judgment to the forecast, based on knowledge of market conditions, separate conversations with customers, or other sources of knowledge. Such alteration may include commentary along with changes, and the act of alteration may be recorded to allow a user to understand how changes occurred. Thus, sales group 3010 may provide forecast sales data, marketing group 3030, operations group 3050 and finance group 3040 may comment on and change the data, and executive group 3020 may also review, alter and comment on the forecast data, to arrive at an overall forecast. Moreover, various groups may then review the overall forecast to determine how individual forecasts were changed or commented on by other groups, allowing for improved future forecasting and for understanding of expected changes in forecasts.

Figure 31:
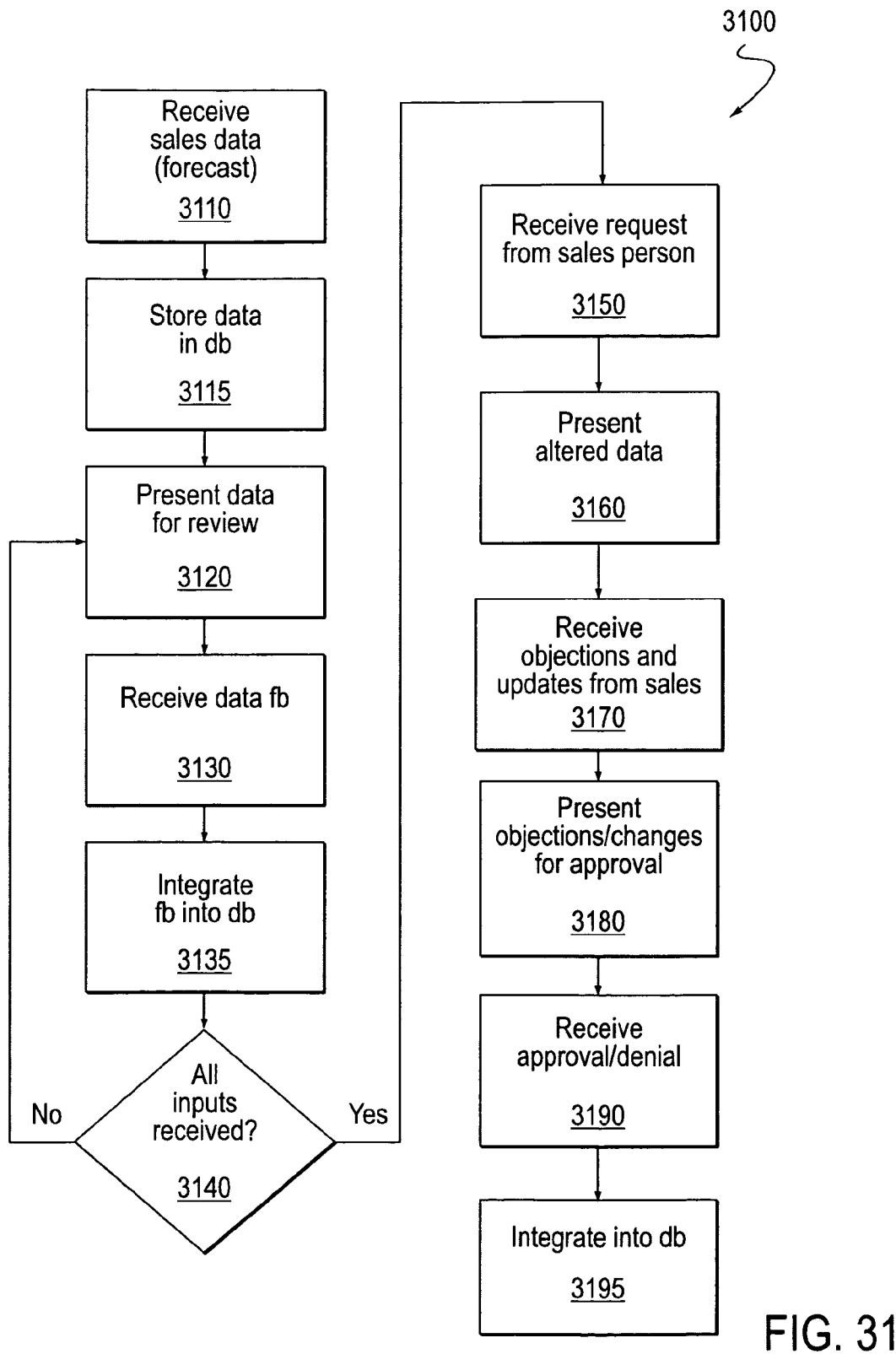
FIG. 31 illustrates an embodiment of a process of providing sales feedback in a real-time forecasting system.

A specific process for sales forecasting and feedback may further illustrate the forecasting system. FIG. 31 illustrates an embodiment of a process of providing sales feedback in a real-time forecasting system. Process 3100 includes receiving sales data, storing the data, presenting data for review, receiving and integrating feedback, receiving a request from a salesperson, presenting altered data, receiving objections and updates, presenting objections and updates for approval, receiving such approval (or denial) and integrating data into the database.

Sales data in the form of forecasts for upcoming time periods is provided at module 3110. This data is stored in a database (as new data or changes) at module 3115. The data is then presented to other stakeholders for review at module 3120. Such other stakeholders may include marketing, production/operations, finance and executive groups, for example. Feedback on the forecast data is provided at module 3130. This feedback, in the form of changes to data, comments on data, and similar changes, is integrated into the database at module 3135. A determination is then made at module 3140 as to whether all feedback has been received. This may relate to receiving feedback from all departments, or may relate to time for feedback ending, for example. If feedback is still to be received, the process returns to module 3120.

If all feedback is received, the process then moves to providing feedback to users. A request from a salesperson for feedback is received at module 3150. This request may be an affirmative request from the salesperson, or may simply be an indication that the salesperson has logged into a system at a time when feedback is automatically provided. Altered data or data with commentary is presented at module 3160, such as by allowing a salesperson to see what changes were made or see what impacts changes had. If the salesperson has objections to changes or updates to data, such objections and updates are received at module 3170. As these objections and updates (changes) are provided after the forecasting period, these changes may be reviewed at module 3180 prior to integration into the forecast. Those changes that are allowed are approved at module 3190, and other changes are denied. The approved changes are then integrated into the database at module 3195.

Figure 32:
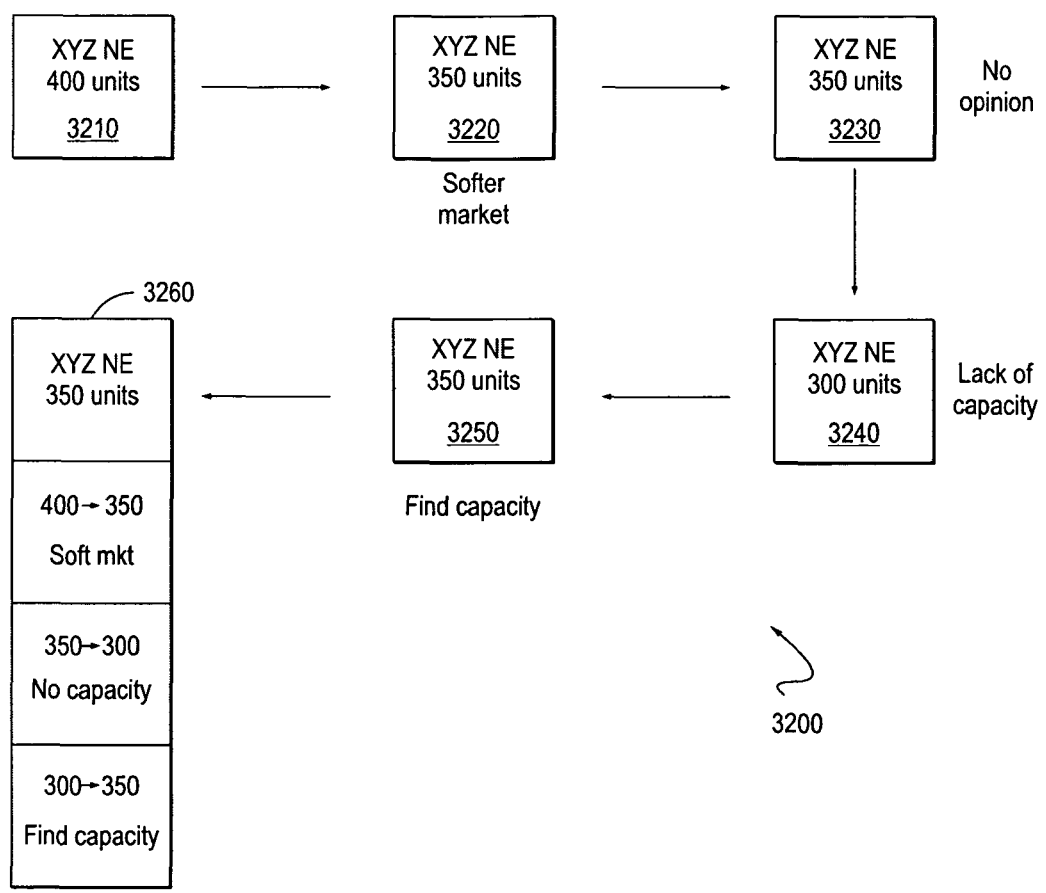
FIG. 32 illustrates changes to an atomic data point in one embodiment.

Understanding potential changes and related feedback of an atomic data point may be useful. FIG. 32 illustrates changes to an atomic data point in one embodiment. Chronolgy 3200 illustrates changes to such a data point. Data at point 3210 includes a forecast of 400 units for xyz company in the northeast. Point 3220 indicates feedback of a softer market (less demand as seen by a marketing department for example) indicates only 350 units will be ordered. Point 3230 has no changes and no opinion expressed (such as a finance department seeing no need for change).

Point 3240 illustrates a further downgrade in an order (or units to fill the order) due to a production constraint (as may come from an operation or production group for example). Point 3250 includes an upgrade in the forecast, back to 350 units, indicating capacity should be found (such as when an executive decision about satisfying a customer occurs for example). Point 3260 illustrates feedback which may be seen by the sales person entering the data, showing the various changes and related commentary.

Note that each of the points in the chronology may also support a baseline, and some or all data points may be used as an objective to be achieved. The baseline may be generated due to timing of data entry (meeting a deadline) or due to a desire to capture a state of the system (taking a snapshot for later reference). Similarly, an objective may be related to an organizational interest in meeting commitments, for example.

Baselines

Figure 33:
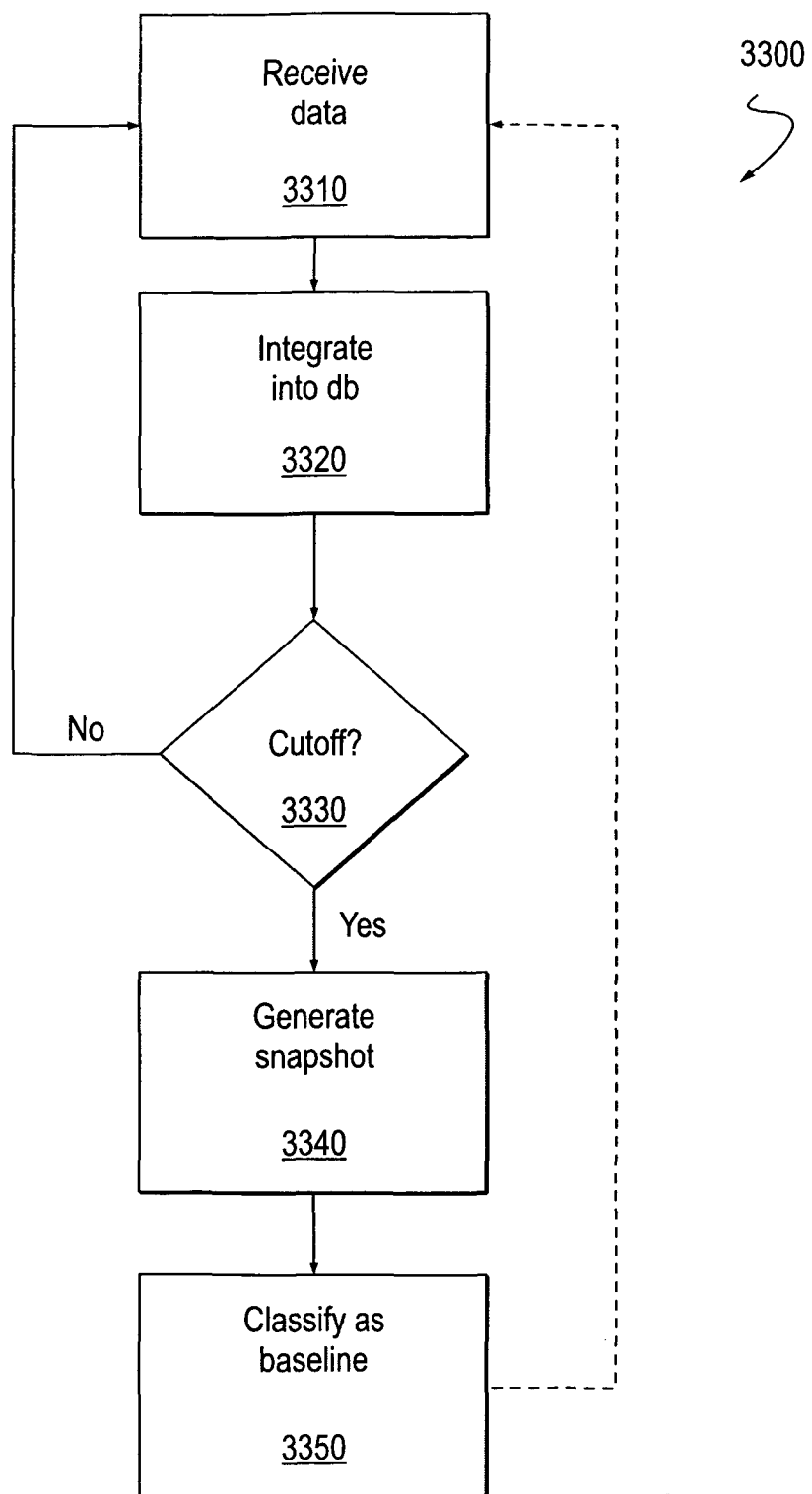
FIG. 33 illustrates an embodiment of a process of generating a baseline.

Generation of a baseline from which objectives may be measured can occur in a variety of ways. FIG. 33 illustrates an embodiment of a process of generating a baseline. Process 3300 includes receiving data, integrating the data into a database, generating a snapshot, and classifying the snapshot as a specific baseline.

Process 3300 includes receiving data at module 3310. The data received may be original data, or a change to existing data. If the data is original, it will be included in the database at module 3320 as a new data entry. If the data is a change, it will be included in the database along with context information about what the change is. Moreover, the data may be a simple numerical value or change, or it may be a comment or annotation on an existing value, for example. All data received includes a timestamp within the database, indicating when it was entered. Receiving and integrating data continues until a cutoff point is reached.

A determination of a cutoff is made at module 3330, and may occur in a variety of ways. Some cutoffs may be automatic, such as generation of a baseline on a preset day of the current week or month. Other cutoffs may be manual, such as a request for a baseline from a user or department. When the cutoff occurs, a snapshot is generated at module 3340.

The snapshot may be implemented in a variety of ways, too. For example, a snapshot may be a recording of the time at which the baseline was requested, or a preset time for a baseline previously requested. This snapshot time marks which changes should be included to calculate a baseline, and which changes should be excluded as they occurred after the time of the baseline. Alternatively, a snapshot of the state of the system may be recorded, much like a backup of data in a static fashion. Such a backup may be resource and time-intensive to complete, but it may also facilitate calculation of differences between values in the baseline or values of the baseline and other values later.

The snapshot is classified as a baseline at module 3350. This may simply include assigning an identifier to the value of the snapshot (or the data stored as the snapshot). Additionally, it may include designation of permissions related to users authorized to view a baseline. For example, a baseline may be a private baseline, created for personal use of a user or restricted use of a group. Alternatively, a baseline may be restricted to those having certain general access rights, although such access rights may change over time, either in an evolutionary manner with an organization or in a cyclical manner, for example. Additionally, the baseline may be restricted in what it includes, such as by restricting it based on various categories within the data such as customer, data source (marketing and operations but not sales, for example), or by restricting it based on how far back data may be retrieved to provide the baseline.

Figure 34:
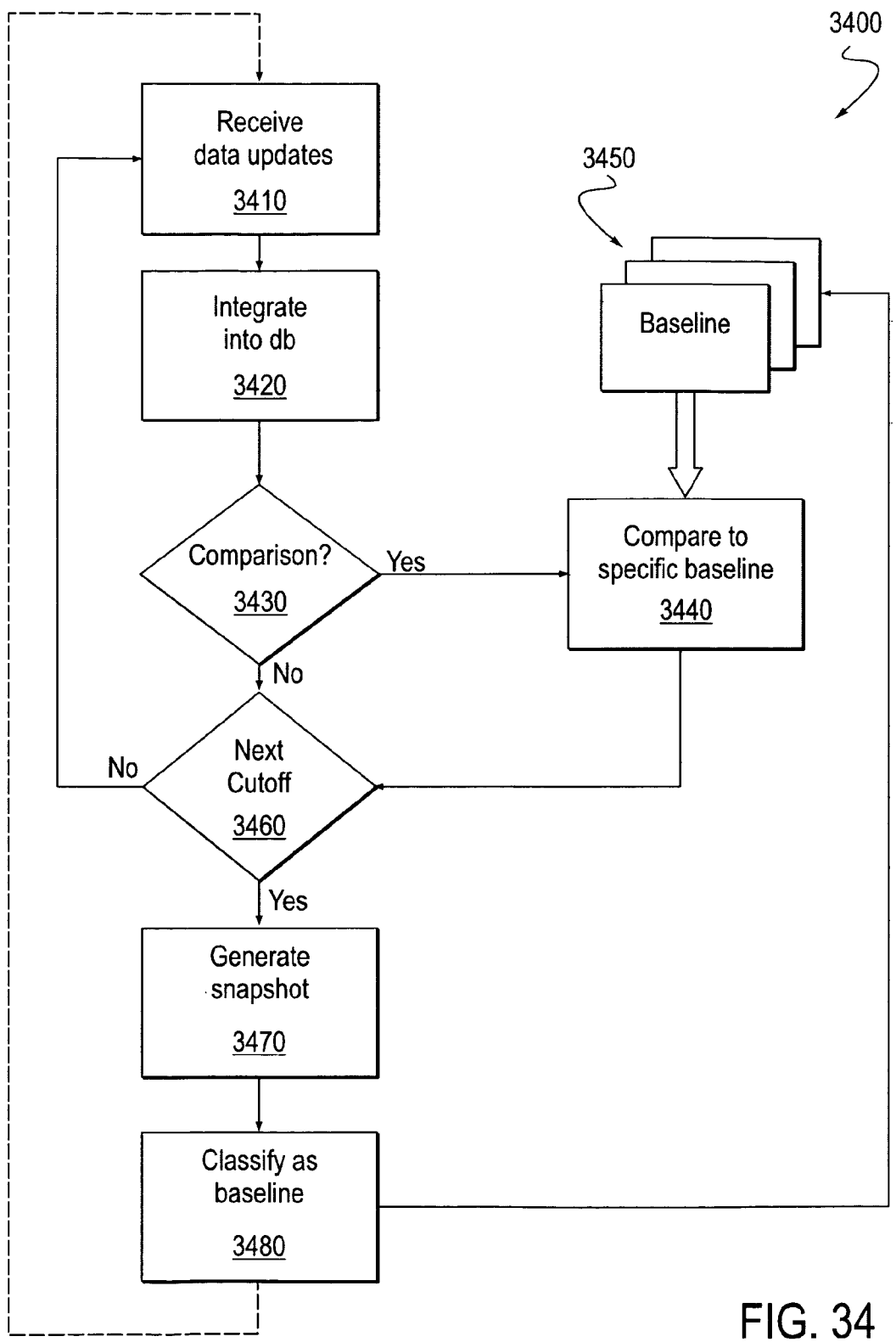
FIG. 34 illustrates an embodiment of a process of operating a real-time forecasting system in conjunction with a baseline.

Baselines may be used in a variety of ways. FIG. 34 illustrates an embodiment of a process of operating a real-time forecasting system in conjunction with a baseline. Process 3400 includes receiving and integrating data, comparing data to established baselines, checking for cutoff points for generation of baselines, and generation of baselines.

Data is received at module 3410, and is then integrated into a database at module 3420. This integration may also include integration into an olap server and data structure, as will be described in greater detail below. If a comparison is desired (requested by a user) then a determination is made to perform a comparison at module 3430. Such as comparison occurs at module 3440, using a baseline previously established as one of baselines 3450. Thus, a user may determine how much a current forecast as represented by data in the database has varied from a baseline forecast established at a previous time. Alternatively, the user may determine how much two different baselines diverged, allowing for post-mortem analysis of changes in data made by various users, and for analysis of differences between forecasts and results.

At module 3460, a determination is made as to whether a cutoff point has been reached. If not, the process returns to receiving data at module 3410. If so, such as due to a predetermined cutoff or a request for a baseline, a snapshot is generated at module 3470. This snapshot may be generated as it would be for module 3340 of FIG. 33. The information of the baseline is then classified as a baseline at module 3480 and added to baselines 3450 for future use in comparisons. Note that such classification may be similar to that of module 3350 of FIG. 33.

Also, note that baselines may, and typically will, be derived from earlier baselines. Typically, baselines will derive in a sequential fashion, one from the previous one. However, private baselines may be derived in some instances, and such baselines may be derived from a selected subset of past data as incorporated in various baselines. The windows discussed later may be used for this purpose, with only some of the earlier windows specified for a particular private window or baseline.

Figure 35:
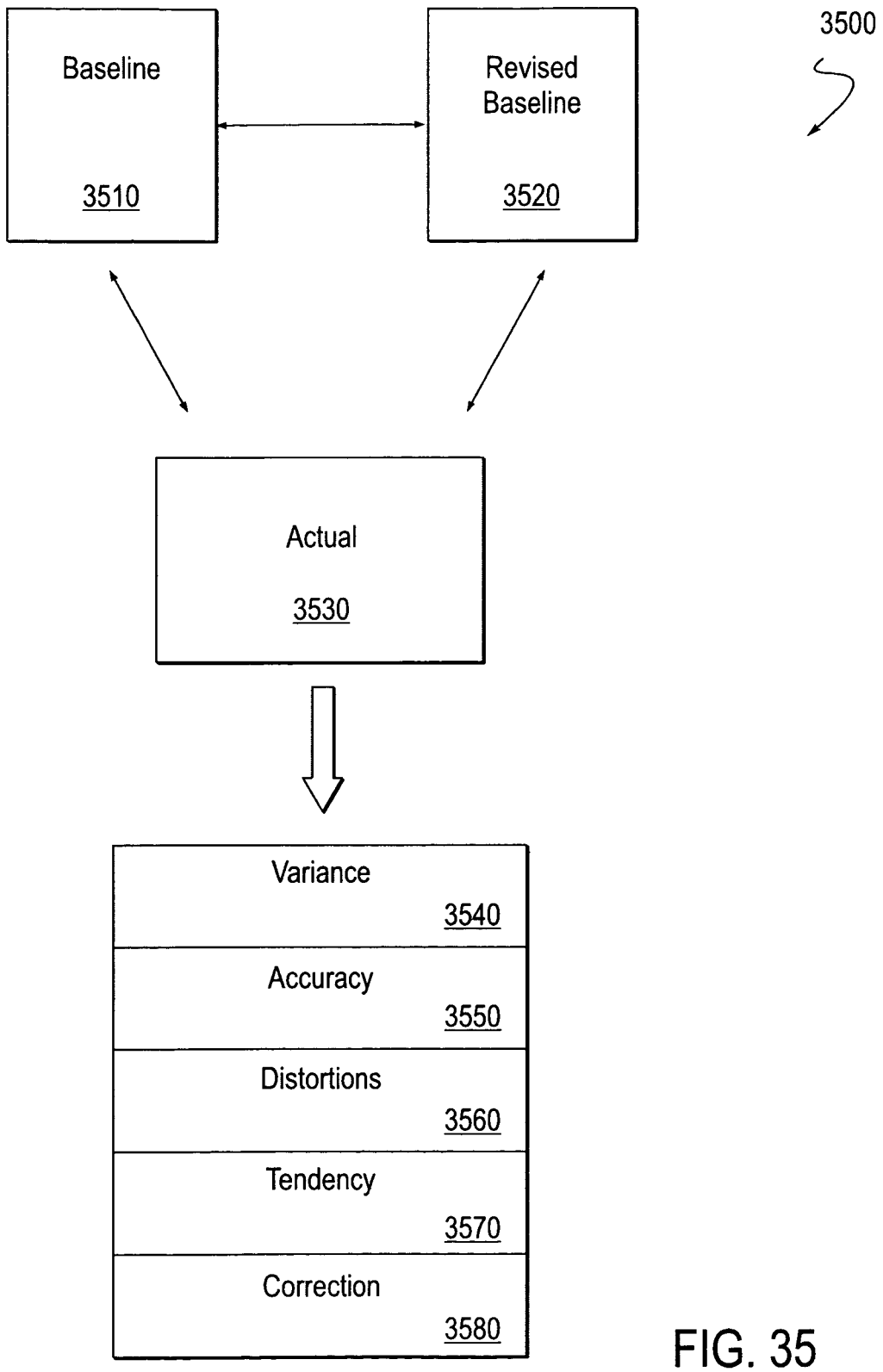
FIG. 35 illustrates relationships between baselines and potential operations in an embodiment.

Baselines may provide a variety of opportunities for analysis. FIG. 35 illustrates relationships between baselines and potential operations in an embodiment. Data collection 3500 includes multiple baselines and illustrates results of analysis that may be achieved. Baseline 3510 is an original baseline in a forecast, such as a baseline established after sales data is initially received. Revised baseline 3520 is a later revised baseline, which may include input from a variety of sources, and potentially has different data from that in baseline 3510. Actual results 3530 are the actual results of operations corresponding to the forecasts of baselines 3510 and 3520.

Comparison of this data results in various analytical results. Variance 3540 represents differences between two sets of data, and illustrates where the forecast did not meet reality. Accuracy 3550 represents how far away a forecast was from reality or a later forecast—accuracy 3550 and variance 3540 may represent the same data, and either present the data differently, or present different aspects of the data, such as percentage versus absolute magnitude for example.

Distortions 3560 represents identified factors distorting the forecast, such as market changes, customer defections, unpredictable events, and other issues which may account for differences between a prediction and a result. Tendency 3570 represents identified trends in predictions, as may be represented by tracking forecasts over time or tracking results of forecasts by users over time. Tendency 3570 may include identification of forecasters who are unpredictable (unreliably inaccurate), regularly optimistic, regularly pessimistic, or generally accurate, for example. Similarly, tendency 3570 may illustrate correlations between different forecasts, or between forecasts and results, for example. Correction 3580 may include an identification of factors which may be used to correct future forecasts. This may include identifying users who should be trained to forecast better. It may also include identifying offsets or multipliers which may be used to correct forecasts of those who are reliably incorrect, for example.

Annotations

While baselines allow for much comparison of results, annotation of results reinforces or potentially corrects predictions during the predictive process. Moreover, annotation of data may raise issues (either actual or anticipated) at an early stage to allow for discussion and resolution of such issues. Annotations may be gathered after initial data is gathered, to indicate whether the initial data looks incorrect to users of the system, and allow for more meaningful interaction between users that simple changes to numbers allows.

Figure 36:
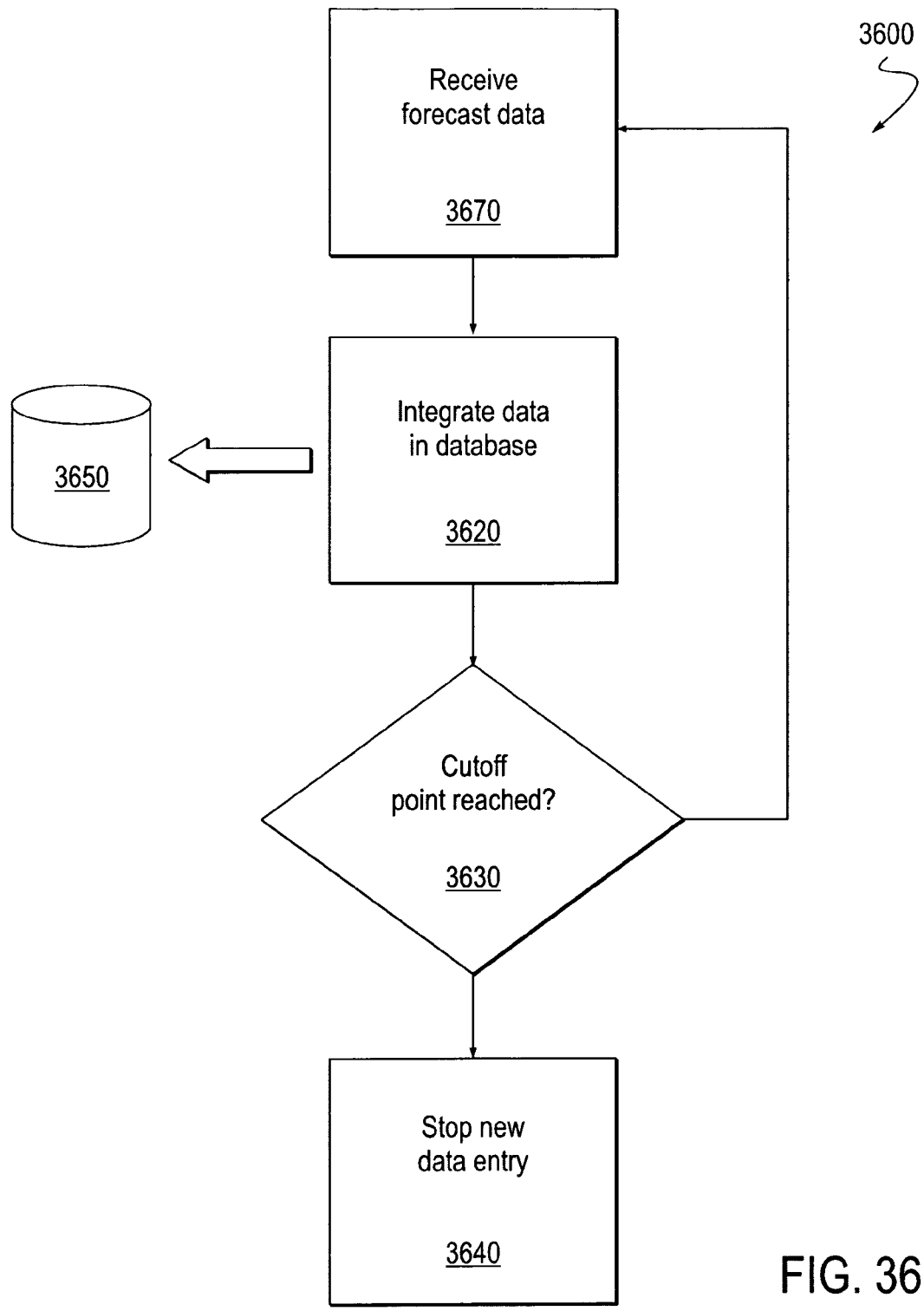
FIG. 36 illustrates an embodiment of a process of gathering data in a real-time forecasting system.

Thus, the data and annotation gathering process may include gathering data, annotating data, displaying annotated data, and revising annotated data. FIG. 36 illustrates an embodiment of a process of gathering data in a real-time forecasting system. Process 3600 includes receiving forecast data, integrating data into the database, determining data gathering should stop, and halting gathering of data.

Forecast data is received at module 3610. This may include initial forecast data from various users such as field operators or sales people, and may relate to what is expected in various timeframes. Typically, the forecast data is a personal forecast which includes business information which is expected to be useful to the organization. The forecast data is integrated into a database 3650 at module 3620. This integration may be entry of initial data with associated parameters, or may be entry of a change to a prior forecast in the case of longer term forecasts. At some point, a cutoff point may be reached, such as an end of a forecasting period. This is determined at module 3630, and when the cutoff is reached, the data entry process halts at module 3640, such as through locking of database 3650 to further changes or changes from designated users. Note that database 3650 may include a classical database, and an associated olap structure as well.

Figure 37:
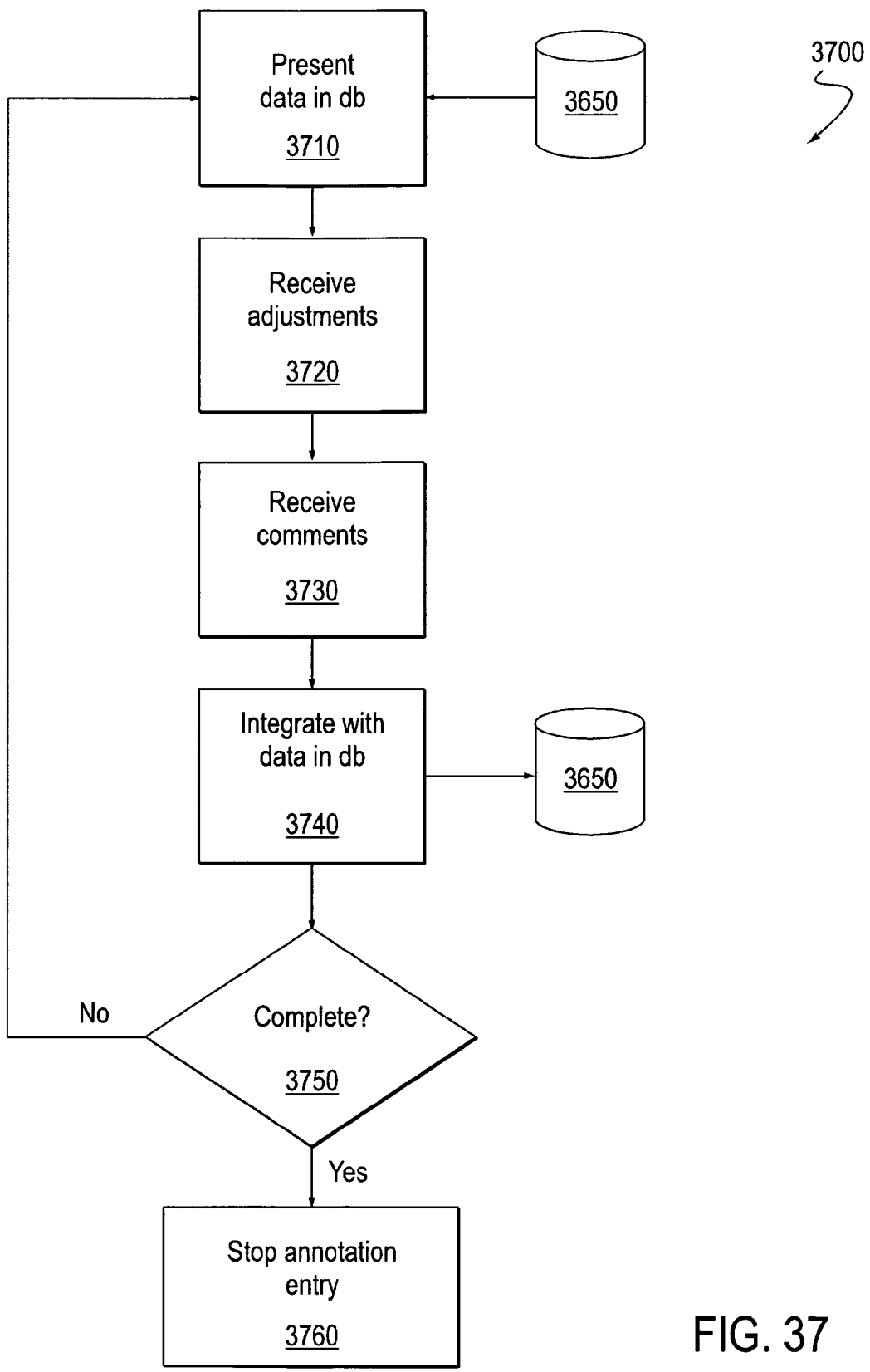
FIG. 37 illustrates an embodiment of a process of annotating data in a real-time forecasting system.

With initial forecast data entered, the forecast is then reviewed by other users. FIG. 37 illustrates an embodiment of a process of annotating data in a real-time forecasting system. Process 3700 includes presenting data to users, receiving adjustments and comments, integrating adjustments and comments into the data base, and completing annotation entry.

At module 3710, data from database 3650 is presented to a user or users. This typically occurs on a wide scale, allowing various users to review and change or comment on data. Adjustments to data are received at module 3720, and comments are received at module 3730. Note that such adjustments (actual changes) and comments (notes about the data) may be received essentially simultaneously, and for a variety of different data points. At module 3740, the adjustments and comments are integrated into database 3650. If the annotation process is complete, this is determined at module 3750. If it is not, then the process returns to module 3710 for presentation of data, whereas if the process is complete, module 3760 halts entry of annotations.

In some embodiments, the initial forecast data is compiled from field operatives such as sales people. Annotations then come from marketing groups, production/operations groups, finance groups and executive groups. Thus, the process of modules 3710 through 3750 may be repeated several times for different groups or users, even for the same piece of atomic data. Also, later users may be able to see some or all annotations from earlier users, allowing for futher commentary or avoiding duplicative (and overly cumulative) changes.

Figure 38:
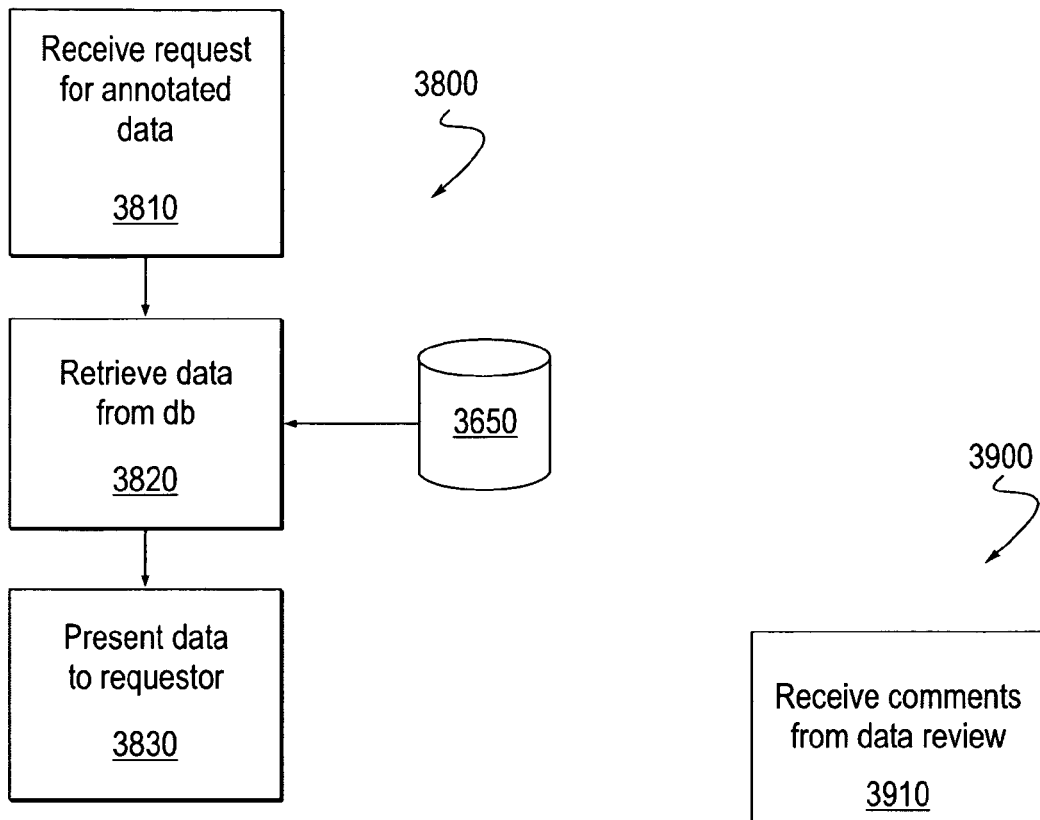
FIG. 38 illustrates an embodiment of a process of displaying annotated data in a real-time forecasting system.

After entry of annotations, the data may be reviewed by users who originally entered it, along with the annotations. FIG. 38 illustrates an embodiment of a process of displaying annotated data in a real-time forecasting system. Process 3800 includes receiving a request for annotated data, retrieiving the requested data, and presenting the data to the requester.

At module 3810, a request for annotated data is received from a user. For example, a sales person may wish to see what marketing, production and finance did with previous projections and whether desired commitments will be met. Alternatively, a sales person may want to see what feedback is available about the overall market or the overall customer relationship. At module 3820, requested data is retrieved from database 3650. Note that requested data is likely to be data requested by the user through a user attempt to access the data, rather than a specific request from the user. At module 3830, the requested data, now retrieved from database 3650 along with associated annotations, is provided to the user, such as through a graphical user interface. Note that if the user has limited rights to access the data, some annotations may not be available to the user in question.

Figure 39:
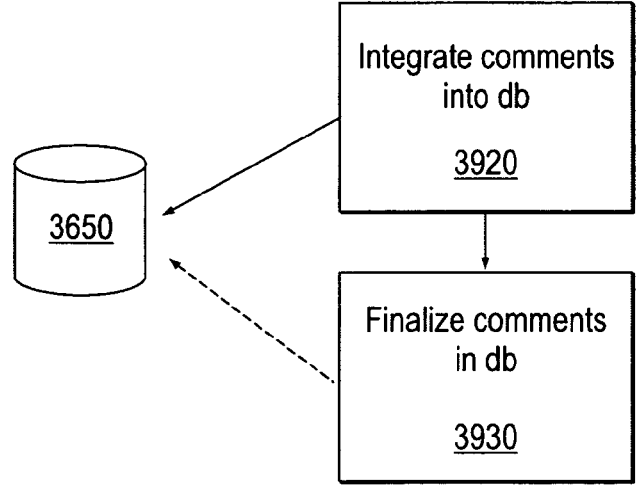
FIG. 39 illustrates an embodiment of a process of revising annotated data in a real-time forecasting system.

The nature of human interaction is that disagreements arise. FIG. 39 illustrates an embodiment of a process of revising annotated data in a real-time forecasting system. A sales person may disagree with changes to forecasts, either because specific information contradicts a more general change or because the sales person simply believes the data to be inaccurate. Both situations may be addressed.

Process 3900 includes receiving comments from data reviewed, integrating comments into the database, and finalizing comments in the database. A sales person or similar forecaster may provide comments about data presented with annotations at module 3910. Such comments may contest annotations and changes, request further changes, or indicate changes are agreeable, for example. At module 3920, these comments are integrated into the database 3650. This integration process may simply be recording the comments, or may involve an effort to alert a supervisory user to the comments. At module 3930, comments in the database are finalized. This may include review by a supervisory user, review by those affected by comments, or some other form of check on the reason for changes.

Note that annotations may involve more active functions than simply providing an opinion or change. For example, in some embodiments, annotations not only raise an issue through a comment, but also provide an indication of a lack of confidence in part or all of a data point without specifically changing that data point. For example, if a sales person indicates 500 parts will be ordered by a customer six months later, that can be annotated to indicate it is contingent on the customer designing in the specified part in a new product.

Thus, the annotation may not only state the concern, but include a tag indicating how much the number should be reduced to handle the contingency. If the part would be ordered in a quantity of 300 units without the design-in, the annotation may indicate 200 units are contingent on a design-in decision. If the decision is slated for a month after the annotation is made, the annotation may be implemented to notify the user making the annotation, and the user whose forecast was annotated, to check on the decision. Such notifications may be email messages sent at specified or predetermined times, and may also show up along with impacts in a dashboard display, for example.

Figure 40:
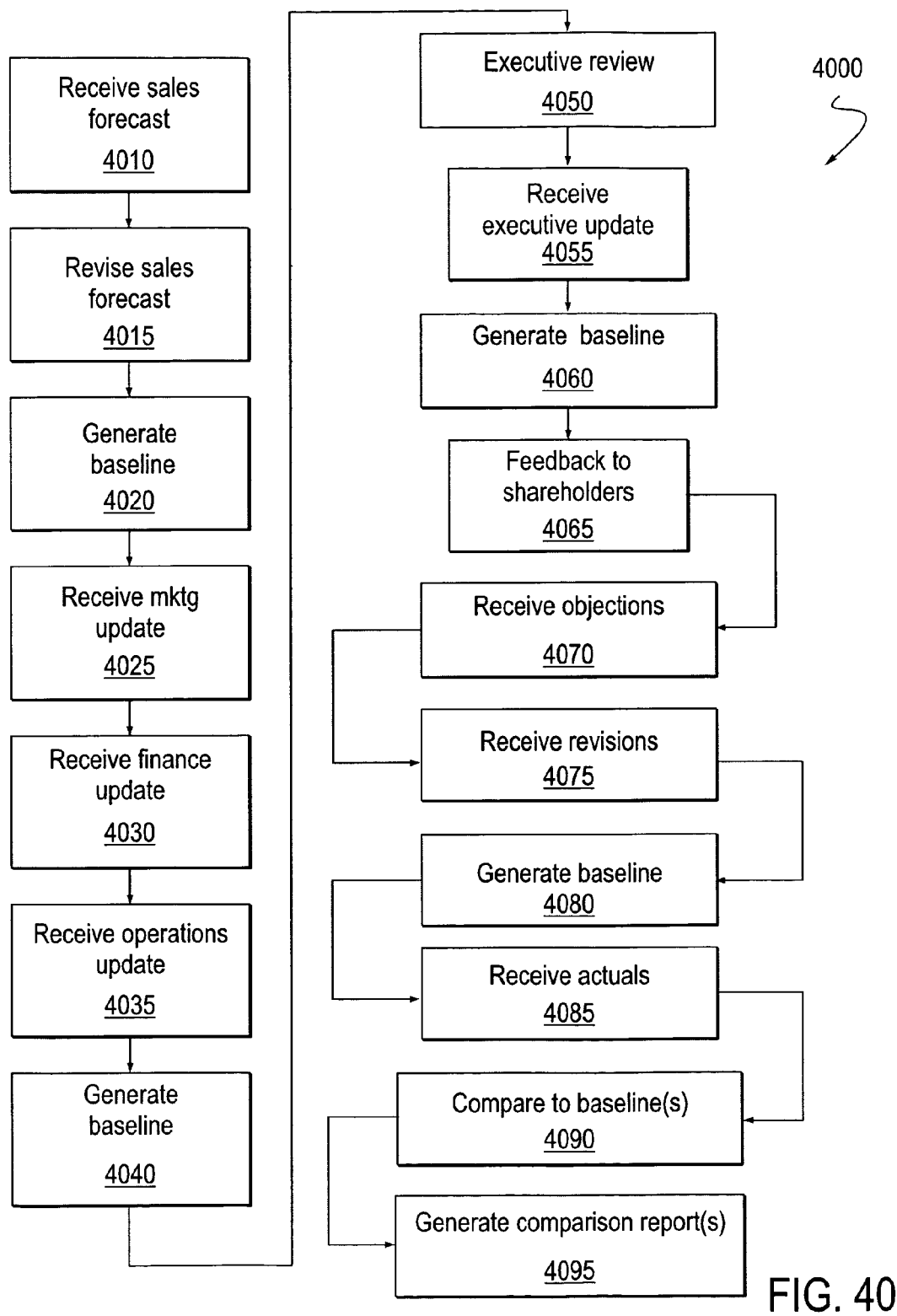
FIG. 40 illustrates an embodiment of a process of operating a real-time forecasting system.

The overall process of data collection, annotation, and further revision, may be even more involved in some embodiments. FIG. 40 illustrates an embodiment of a process of operating a real-time forecasting system. Process 4000 illustrates such collection of data, collection of changes and annotations, collection of objections, and use of the data in both forecasting and review of execution. The actual implementation of this process and similar processes may vary in terms of order of operations, use of all modules, or addition of some modules, for example.

A sales forecast is received from a user or set of users at module 4010. This sales forecast may be initial data related to expected sales, for example. At module 4015, the sales forecast is revised. This may include revisions by those originally entering the data, or revisions by others in the sales group, such as superiors. At module 4020, a baseline is generated using the sales forecasts from the sales group/department.

At module 4025, marketing group updates to the forecast are received. These may be annotations, either comments or changes, entered by various marketing personnel. Such changes may relate to market conditions, overall relationships with customers, and later arriving data, for example. At module 4030, a finance group update is similarly received. The finance group may provide information related to financing constraints or financial market conditions which impact sales forecasts. In a similar manner, an operations or productions set of inputs is received at module 4035. This may include production constraints, inventory considerations, other supply chain issues, and allocations of production capacity, for example. All of these inputs may then be used to generate a new baseline at module 4040. The inputs of modules 4025, 4030 and 4035 may include judgments, watches, changes and comments, for example.

At module 4050, the forecast undergoes executive review. This may involve a review of high-level information (company-wide or organization-wide performance), and may further include drilling down to more specific information in some parts of the forecast. Moreover, executive updates to the forecast may be provided at module 4055. Such updates may reflect expectations for the economy, customer relationships and overall business, or may reflect executive expectations about actual performance (as opposed to forecasted performance) by various parts of the company. Entry of information at module 4055 may include judgments and watches, along with other annotations. At module 4060, another baseline is generated, incorporating executive changes to the forecast.

Feedback is then provided to stakeholders, such as those originally entering information and those entering later changes, at module 4065. This feedback may include annotations and associated updates to forecasts. Note, during the process of entering data, watches may have alerted people to some changes already. Module 4065 may implement a more formal or thorough notification. Objections to changes may be received from stakeholders at module 4070. Such objections may relate to differences of opinions, or to a need to meet organizational and personal commitments to clients or customers, for example. Similarly, revisions to the forecast may be received at module 4075. Objections and revisions may require authorization or approval for actual entry, or may be entered without intervention in various embodiments. Yet another baseline may then be generated at module 4080.

Actual performance data may then be collected at module 4085. Thus, actual sales figures or performance information may be collected. At module 4090, actual performance information may then be compared to the various baselines. Moreover, reports of differences between execution (actual data) and forecasts may be generated for use by various users.

Note that comparison is illustrated at the end of the process. Comparison of various baselines during the process may also be useful. Moreover, determination of why numbers in various baselines do not match may allow for avoidance of hidden problems, for example. Thus, the process may be manipulated by users in various embodiments to achieve useful business results.

Figure 41:
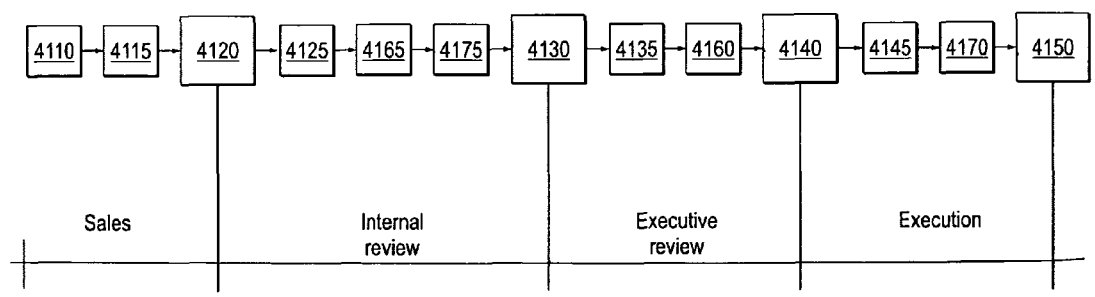
FIG. 41 illustrates a timeline of operations in conjunction with a real-time forecasting system in one embodiment.

Reviewing data collection in a timeline model may also be illustrative. FIG. 41 illustrates a timeline of operations in conjunction with a real-time forecasting system in one embodiment. Timeline 4100 illustrates data gathering and baseline generation in the process in one embodiment. Sales forecast data gathering occurs, and is exemplified by data collection events 4110 and 4115. These may be deadlines for forecast reporting, for example. Baseline generation event 4120 may mark the end of sale forecast collection.

Internal review may include review by marketing, finance and operations groups, for example. Data collection events 4125, 4165 and 4175 illustrate various collection events and data entry by users or groups of users. Some data collection may involve group meetings to decide on what data is entered, other data collection may be individual. A baseline is generated at event 4130, which may be an internal baseline, for example.

Executive review may involve further data collection at events 4135 and 4160. Such data may be collected based on developments in the business, meetings with clients, or other events. An executive baseline is the generated at event 4140. Execution then occurs, although some execution may have been occurring on an ongoing basis (resulting in business developments for example). Actual data is gathered at events 4145, 4170 and 4150, and an actual baseline is generated at event 4150 to allow for comparisons to the prior baselines.

Further Technical Features

Figure 42:
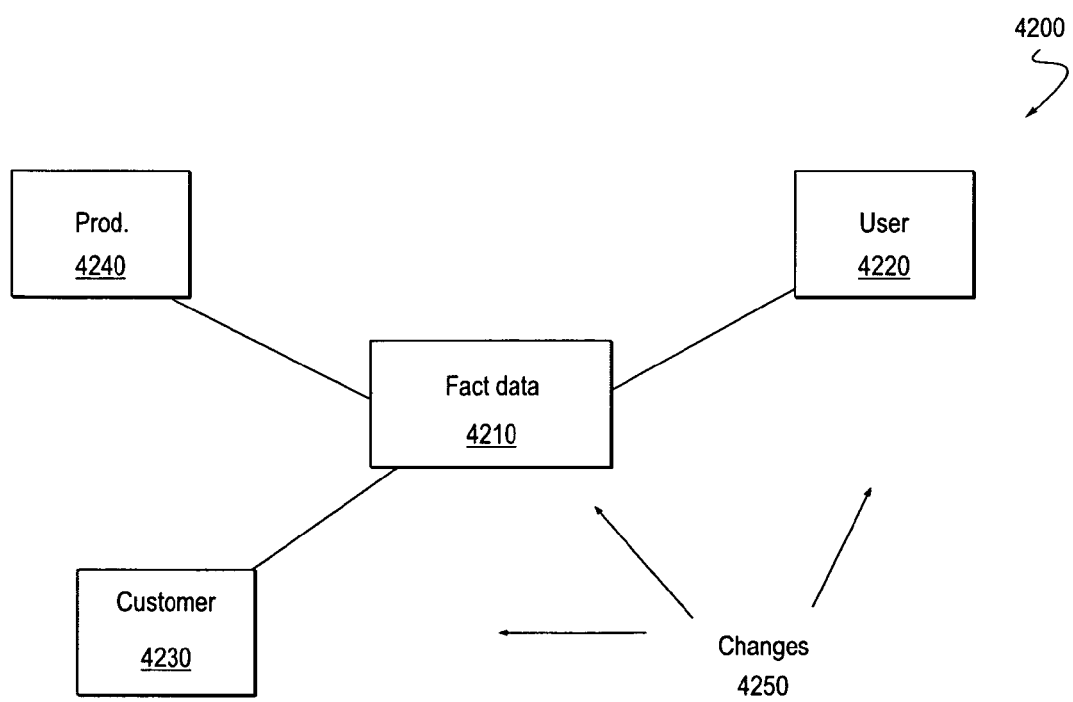
FIG. 42 illustrates an embodiment of a data structure.

Feedback, baselines and annotations may all be supported by various technologies. FIG. 42 illustrates an embodiment of a data structure. Data structure 4200 represents data in a data base, with various tables or dimensions of the data illustrated. Other data may also be involved, depending on implementations and database schema in various embodiments.

Fact data 4210 is the actual data collected in a system. This may be facts such as number of units to be shipped to a customer, for example. User data 4230 is related data indicating where the fact came from. Customer data 4230 is related data indicating which customer the fact datum of 4210 relates to. Product data 4240 is related data indicating which product (or service) the fact datum of 4210 relates to. Thus, a sales person may enter the number 400, representing a number of units or price of units or similar information. From the user interface (where the data was entered), the customer and product may be determined. Similarly, the identity of the user may come from a login procedure. Additional data such as the time of the entry, the timing of the data (when the goods will be shipped or service will be rendered), the type of entry (units, currency, volume, etc.) May be collected and stored as well.

Figure 43:
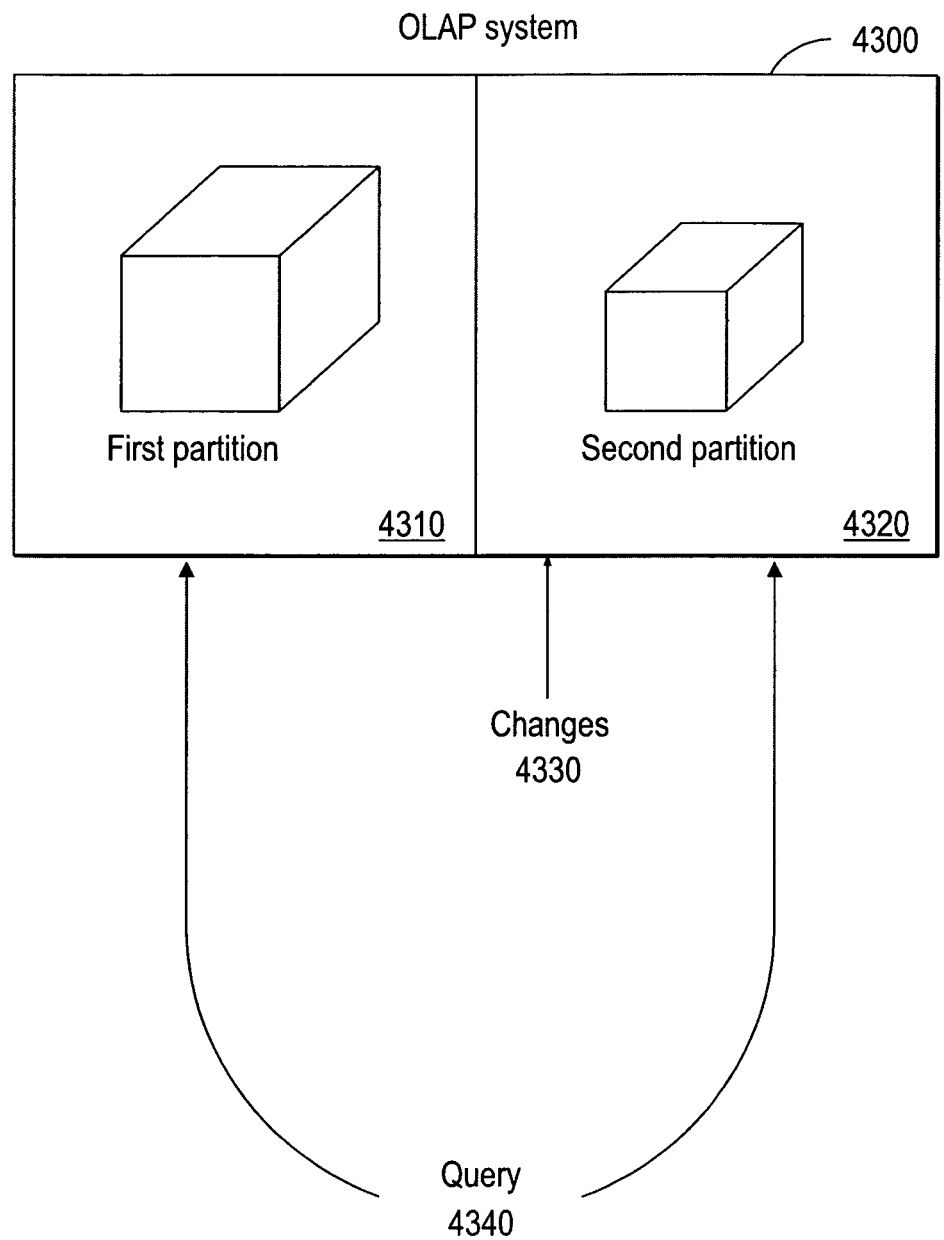
FIG. 43 illustrates an embodiment of an OLAP structure.

Accompanying the database may be an olap structure as discussed previously. FIG. 43 illustrates an embodiment of an olap structure. The olap system 4300 is illustrated with two partitions, though the number of partitions may vary based on various implementation details. In this embodiment, a first partition 4310 includes general data from a database. This partition is updated periodically, such as once a day for example. A second partition 4320 includes change data. This partition is updated much more frequently than partition 4310, and may receive data from a database on a continuous basis, for example.

Updating the olap structure includes both adding data and calculating the effects of that data. Thus, partition 4320, containing change data, may be calculated frequently without using too many resources due to the small amount of data included, whereas partition 4310 with much more data may be calculated and added to less frequently. Changes 4330 are sent to partition 4320, such as from a database. This system may perform particularly well in response to a query 4340. Such a query may be sent to both partitions, receiving data from both, and having the data aggregated to appear as a single response.

Figure 44:
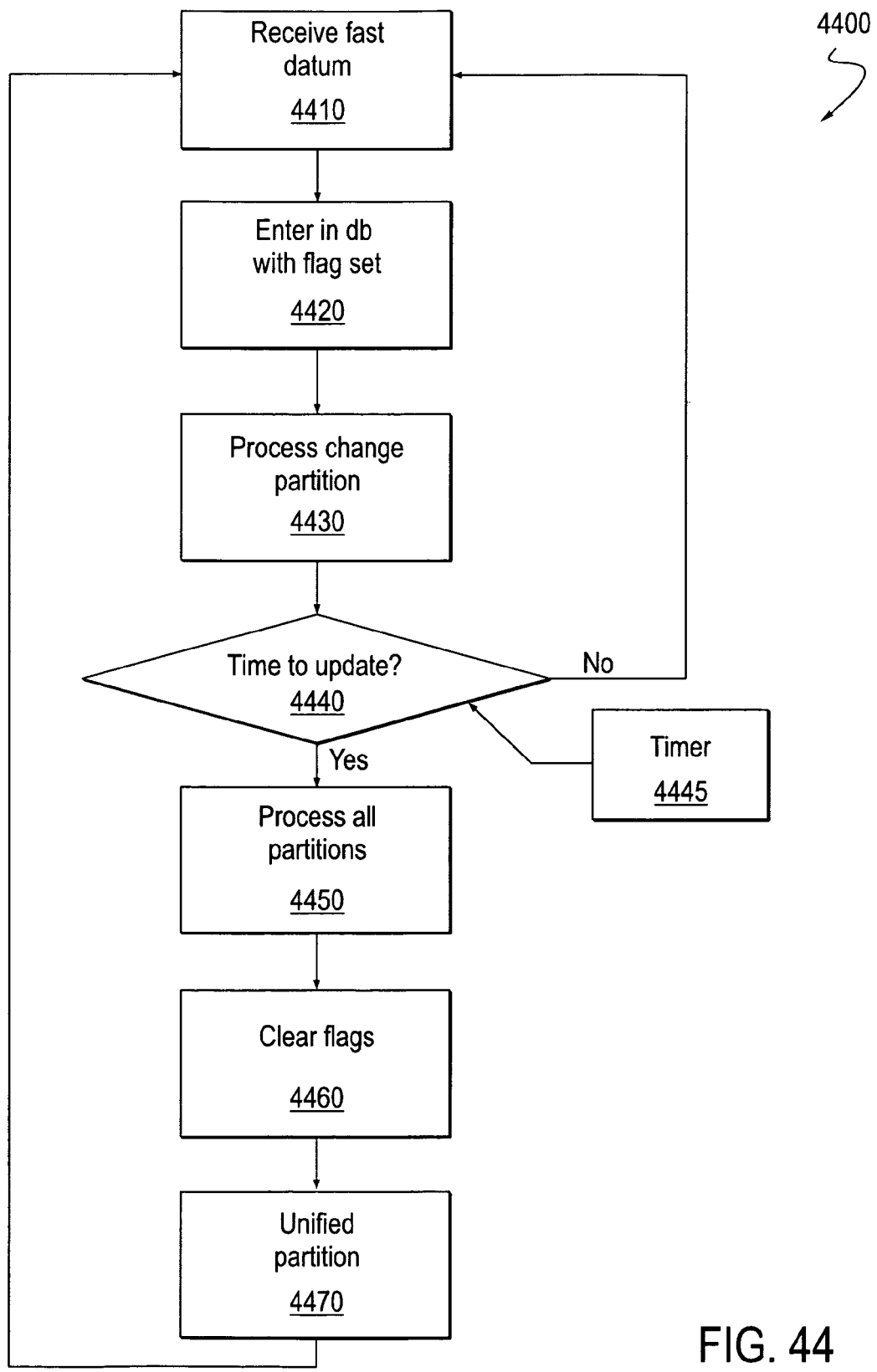
FIG. 44 illustrates an embodiment of a process of making changes in an OLAP structure.

Making the changes in an olap structure is part of the process of providing a fast query response. FIG. 44 illustrates an embodiment of a process of making changes in an olap structure. Process 4400 includes receiving data, entering the data in a database with a flag set, processing the change partition, determining if a periodic update should occur, processing all partitions, clearing flags, and using a unified partition.

A fact datum (new data point or change to data) is received at module 4410. At mdouel 4420, the datum is recorded in a database, with a flag indicating a change has occurred—the recorded datum is new. At module 4430, all data in the database which is flagged is then processed into the change partition of an olap cube. Since this is likely to be a small amount of data relative to the contents of the database, this results in relatively low consumption of resources. Thus, the olap cube has a partition with changed data in it, and that data populates the cube to allow for access to information in a speedy fashion.

At module 4440, a determination is made as to whether the entire olap cube should be updated. This may occur in conjunction with a timer 4445, which may be set to alert to a need for update on a daily or other predetermined basis, for example. If no update is due, the process returns to module

4410 for the next change. If an update is due, changed data is provided to all partitions, and all partitions are processed at module 4450. All flags related to changed data are also cleared at module 4460. This results in a unified partition at module 4470, which may be used to answer queries. As changes accumulate, queries will tend to invoke both the change partition and the previously unified partition, through the same process 4400.

Figure 45:
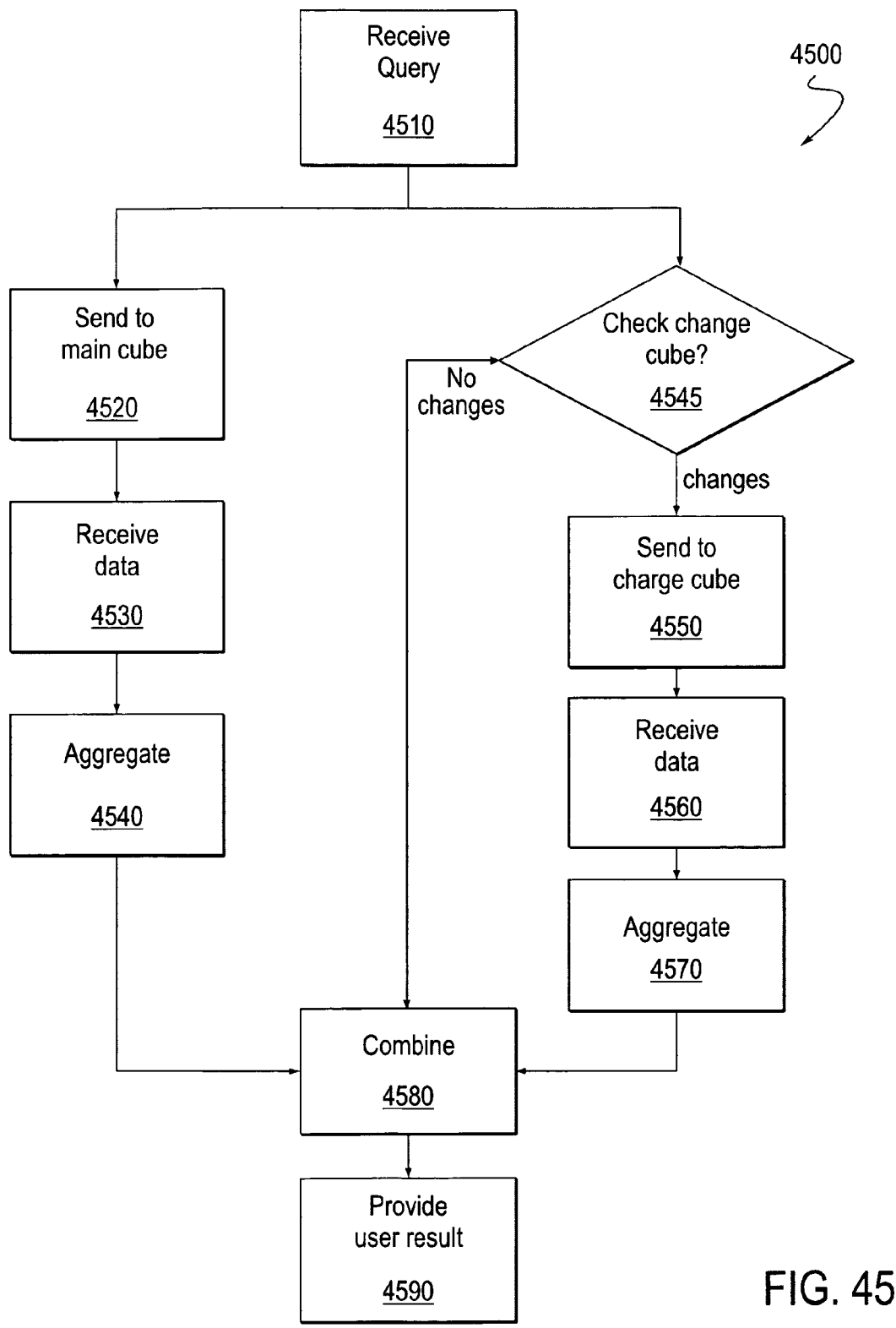
FIG. 45 illustrates an embodiment of a process of responding to a query in an OLAP structure.

With the data in the olap structure, queries may be sent and responsive data supplied. FIG. 45 illustrates an embodiment of a process of responding to a query in an olap structure. Process 4500 includes receiving a query, sending the query to both cubes, receiving data, aggregating the data, combining the results, and providing a user result.

A query is received at module 4510, requesting data from the olap cube and associated database—and which will be serviced from the olap cube. Preferably, the query is then sent in parallel to the two cubes (partitions) or in a nearly parallel manner. At module 4520, the query is passed to the main cube. Ar module 4530, responsive data is received from the main cube, and at module 4540, that data is aggregated into a result.

Correspondingly, at module 4545, a determination is made as to whether any changes are in the change cube. If not, the response of module 4540 is complete at module 4580. If changes are present, the query is sent to the change cube at module 4550. At module 4560, data is received from the change cube responsive to the query. At module 4570, that data is aggregated, and at module 4580, data from the two cubes is combined into a single response. At module 4590 that response is then provided to the user. Aggregation may involve computing final data or combining parts of data which were not previously combined with the cube, or organizing data from a cube into a more useful format, for example.

Figure 46:
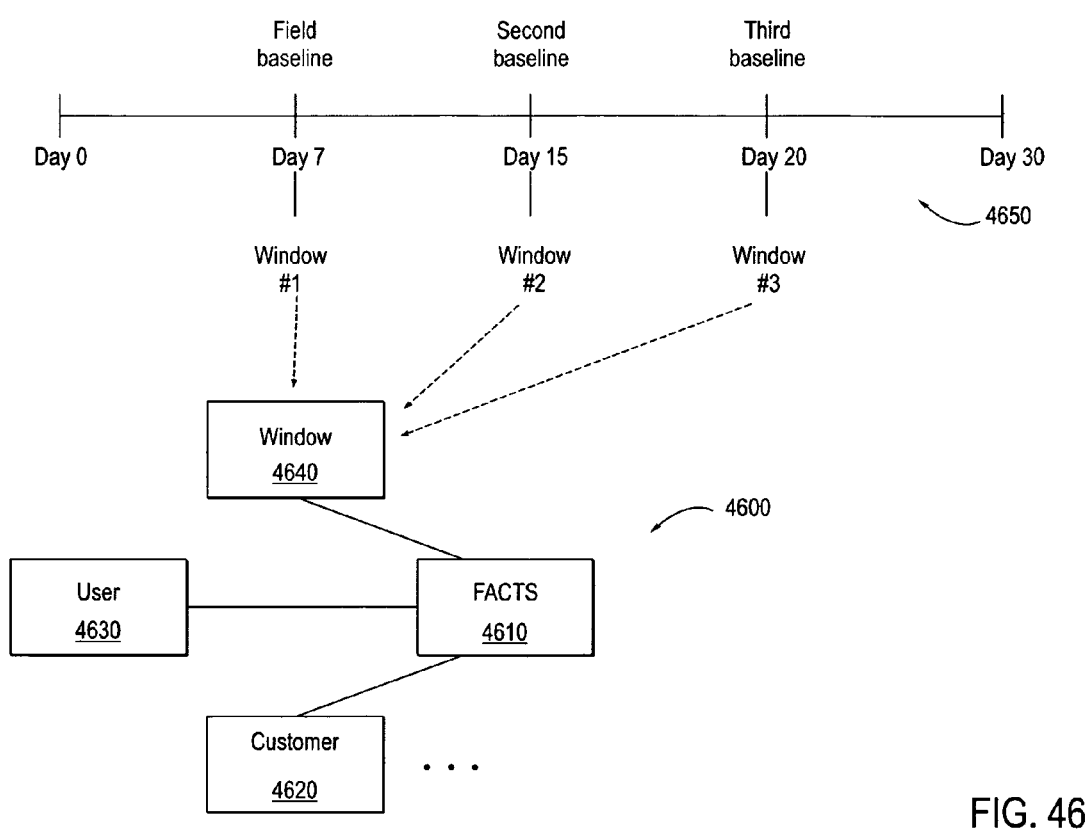
FIG. 46 illustrates an embodiment of a data structure in conjunction with a timeline.

Data from the cubes and database may be organized based on baselines. FIG. 46 illustrates an embodiment of a data structure in conjunction with a timeline. Data structure 4600 is illustrated in conjunction with timeline 4650 to illustrate how baseline information may be stored.

Data structure 4600 includes facts 4610, customer information 4620, user information 4630, and othe associated information. Data structure 4600 also includes window information 4640. Thus, for each fact datum in facts 4610, a customer, user, and window is associated—although this data need not be absolutely populated for all data.

Timeline 4650 illustrates a timeline for a monthly cycle or baselines. A first baseline or field baseline is set at day 7, and designated as window #1. A second baseline is set at day 15, and designated as window #2. A third baseline is set at day 20, and designated as window #3. For each of these windows, data entered prior to the baseline is included and data entered after is excluded. Thus, a fact datum may have a window number associated with it, indicating when it was entered (along with a datestamp which is not shown). Alternatively, datestamps of data may be used in baseline calculation, and windows 4640 may store the set of baselines and associated timestamps for comparisons.

Windows may also be designated privately, thus indicating that additional changes were made in a what-if type of scenario and should not be retained for all forecasts, but should be used in a separate baseline for purposes of experimentation with forecasts. Thus, a window 21 may be designated, for example, with changes associated therewith, and that window 21 and associated baseline may be used for comparison with other baselines. However, changes associated with window 21 may not enter into changes associated with other windows, for example. Moreover, window 21 may be based on a preceding window, and the window it is based on may be changed over time as desired by a user.

Data from the olap cubes may be requested and received in a variety of ways. Understanding how requests and data gathering may interact may also help. FIG. 47 illustrates an embodiment of a process of responding to a request for data. Process 4700 includes requesting data, getting original data, gathering changes, and displaying a response. FIG. 48 illustrates an embodiment of a process of storing a change in data. Process 4800 includes receiving a change, gathering surrounding data, and storing the change.

Thus, a change may be received at module 4810. Surrounding data is then collected (or comes with the change) at module 4820. Surrounding data to a change may be data such as a customer, user, window in which the change was made, product, region, time the change is applicable to (tomorrow, a forecast three months out, for example), and time the change is made, for example. The window may be designated by the user or may default to the window in which the system is to make changes at the time. The data of the change, both actual fact data and surrounding data, is stored at module 4830.

In the meantime, at module 4725, a request for data is received. At module 4740, original data related to the request is retrieved, such as from a main olap cube partition. At module 4750, changes to the data are gathered, such as at a change olap cube partition. The combined response is then displayed at module 4760. If the request includes an indication of a window to be used, data for that window is provided, along with data used as building blocks from prior windows. A default window may be imposed, including all current data, too.

The window specified may dictate that some changes are excluded, either because they are private (specific to a private window) or because the window is private and does not include all changes in a forecast. However, a request may also be set up to include a selection of windows, allowing a user to cut out changes made by the executive suite or marketing group to determine if results are better that way, for example. Similarly, a response may provide a display of the changing information over time—indicating values at various windows, for example. Moreover, if the request of module 4725 is transmitted when changes are being stored at module 4830, the request may overlap the change storage, but the result may include the changes as long as sufficient time is allowed to collect changes.

Figure 49:
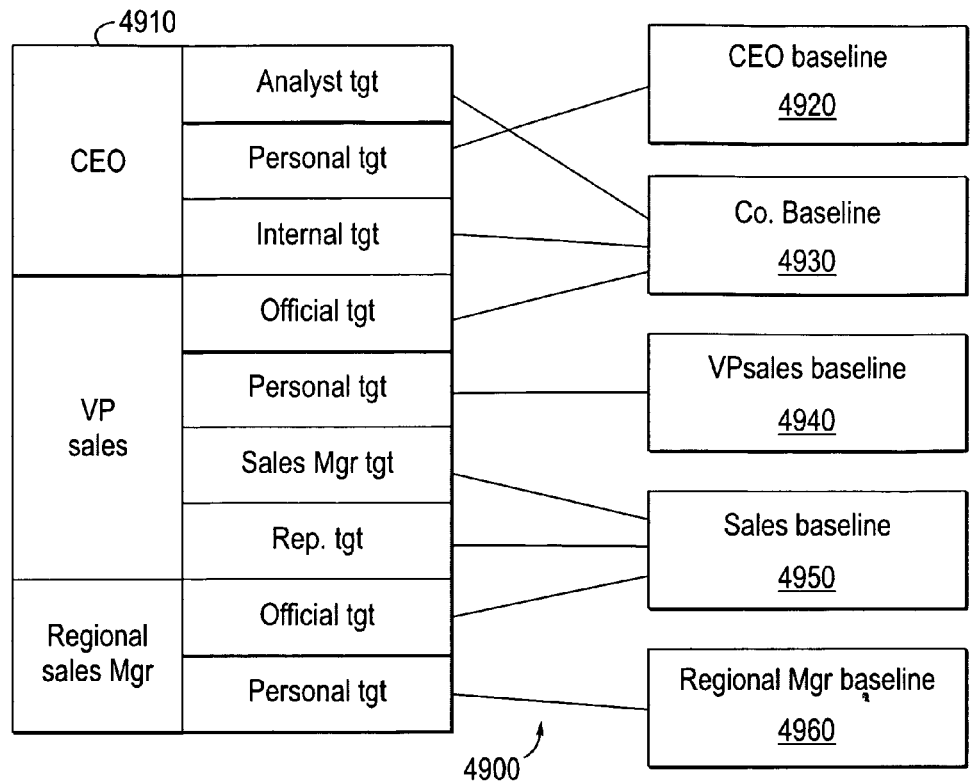
FIG. 49 illustrates an embodiment of a set of baselines and tracked data.

Understanding how information may be applied in this system to various situations may provide further assistance. FIG. 49 illustrates an embodiment of a set of baselines and tracked data. System 4900 includes atomic data and various associated baselines. Data points 4910 are organized for convenience based on users who would use them. Thus, a ceo has an analyst target, a personal target and an internal target. A vp of sales has an official target, a personal target, a sales manager (internal sales group) target and a representative (external sales group) target. Similarly, a regional sales manager may have an official target and a personal target.

Various baselines are prepared. Sales baseline 4950 and company baseline 4930 are public baselines for use within the company for forecasts. Regional manager baseline 4960, vp of sales baseline 4940 and ceo baseline 4920 are personal baselines created to track alternative scenarios or goals which the various users do not wish to have public. Thus, the personal targets are associated with private baselines, and the various public targets are associated with public baselines.

However, these various numbers may each build off of a common history and common set of numbers which are aggregated to arrive at the various expectations. Similarly, the baselines may build selectively off of other baselines—and baselines in general may be expected to depend from earlier baselines in terms of the data used and drawn from for calculations. Thus, each user may have a unique view of the data and still all look at (essentially) the same data. If baselines selectively build from earlier baselines, the information about which baselines are included will generally be accessible when such baseline information is used.

Figure 50:
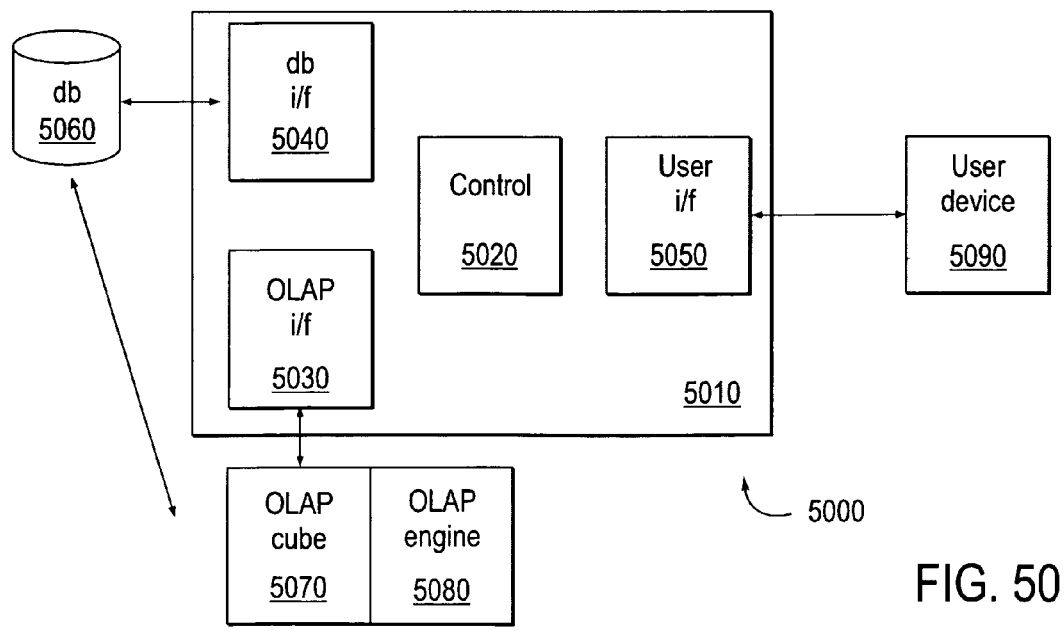
FIG. 50 illustrates an embodiment of a medium and associated devices.

A system may be used to implement the various embodiments, allowing for real-time forecasting. FIG. 50 illustrates an embodiment of a medium and associated devices. System 5000 includes medium 5010, olap engine 5080 and cube 5070, database 5060, and user device 5090. Medium 5010 includes a database interface 5040, an olap interface 5030, a user interface 5050, and a control module 5020. Olap engine 5080 and olap cube 5070 provide the olap data structure, which is populated from the data in database 5060 using olap engine 5080. User device 5090 provides the user entry into the system, for queries and responses.

Thus, a query may go to user interface 5050, and then to control 5020. The query may then go to olap interface 5030, to get data from olap cube 5070, and then relay that data through control module 5020 and user interface 5050 to the user. Similarly, new data or change data may go from user interface 5050 to control module 5020 and then to database interface 5040. Database interface 5040 may then submit the data to database 5060, with the data then populated into a change partition of olap cube 5070. Eventually, the partitions of olap cube 5070 are unified, and the change data is thereby integrated.

From the foregoing, it will be appreciated that specific embodiments of the invention have been described herein for purposes of illustration, but that various modifications may be made without deviating from the spirit and scope of the invention. In some instances, reference has been made to characteristics likely to be present in various or some embodiments, but these characteristics are also not necessarily limiting on the spirit and scope of the invention. In the illustrations and description, structures have been provided which may be formed or assembled in other ways within the spirit and scope of the invention. Moreover, in general, features from one embodiment may be used with other embodiments mentioned in this document provided the features are not somehow mutually exclusive.

In particular, the separate modules of the various block diagrams represent functional modules of methods or apparatuses and are not necessarily indicative of physical or logical separations or of an order of operation inherent in the spirit and scope of the present invention. Similarly, methods have been illustrated and described as linear processes, but such methods may have operations reordered or implemented in parallel within the spirit and scope of the invention. Accordingly, the invention is not limited except as by the appended claims.

We claim:

1. A computer implemented method for propagating information in real-time through OLAP cube database structures to reduce delays in predicting future orders or sales over defined time periods, the method comprising:

for each of multiple organizations, dedicating an instance of one of the OLAP cube database structures and a data repository to each of the organizations;

partitioning of each of the OLAP cube database structures of a computer database into at least a first partition and a second partition;

performing using a computer system programmed with code stored in a memory and executing by a processor of the computer system to configure the computer system into a machine, for each of the multiple organizations:

receiving sales forecast information including forecast numerical values for at least one time period from one or more first entities in a computer, wherein the sales forecast information received forms a baseline forecast;

for each organization, storing the sales forecast information in the first partition of the OLAP cube database structure of the computer database dedicated to the organization;

for each organization, updating the first partition of the OLAP cube database structure of the computer database every time T1, wherein T1 is an amount of time and wherein the updating includes at least data from the second partition;

receiving comments on specific entries of the received sales forecast information from one or more second entities in the computer after receiving the sales forecast information from the one or more first entities;

receiving changes of the sales forecast information from the one or more second entities in the computer after receiving the sales forecast information from the one or more first entities, the changes including time based adjustments to the forecast numerical values;

for each organization, storing the changes in the second partition of the OLAP cube database structure of the computer database dedicated to the organization;

for each organization, updating the second partition of the OLAP cube database structure of the computer database every time T2, wherein T2 is an amount of time and T2 is less than T1 for each organization;

integrating the associated sales forecast information from the first partition, comments, and changes from the second partition into the OLAP cube database structure within the data repository defined in the computer and dedicated to the organization;

propagating the received sales forecast information from the first partition, the received comments, and the received changes of the sales forecast information from the second partition in essentially real-time through the OLAP cube database structure dedicated to the organization by the computer to (i) associate the received comments and changes with the received sales forecast information and (ii) asynchronously update the baseline forecast with the received changes of the sales forecast information in essentially real-time;

generating a particular selected dataset and organization of the particular selected dataset from the OLAP cube database structure within the data repository including from the first partition and the second partition, which are dedicated to the organization, in response to a graphical interface based query from an external requestor wherein generating the particular selected dataset includes:

aggregating data related to changes from the first partition and the second partition to appear as a single response;
analyzing the changes to determine the magnitude of each change; and
providing a set of impacts to the one or more first entities, the impacts showing the changes based on the magnitude of the changes; and
transmitting data to display the generated particular dataset on a graphical interface device that incorporates the integrated comments and the integrated changes to the sales forecast information so that the comments and changes are shown and available for review in association with the sales forecast information including the essentially real-time, asynchronously updated baseline forecast.

2. The method of claim 1, wherein:
the comments are received from marketing and executive personnel.

3. The method of claim 1, wherein:
each multi-dimensional database structure comprises an OLAP cube; and
for each of the organizations, sales forecast information and associated comments and changes are stored in the dedicated data repository and OLAP cube associated with the organization.

4. The method of claim 3, wherein:
the computer is a network of computers hosting the data repository and OLAP cube.

5. The method of claim 3, further comprising:
receiving requests to watch specific data of the sales forecast information; and
providing updates when specific data changes responsive to the requests to watch.

6. The method of claim 5, further comprising:
receiving judgments from the one or more second entities related to a set of data of the sales forecast information; and
changing the set of data of the forecast responsive to the judgments.

7. The method of claim 5, wherein:
analyzing the changes to determine the magnitude of each change comprises analyzing the changes for largest magnitude changes; and
providing a set of impacts to the one or more first entities, the impacts showing the changes based on the magnitude of the changes comprises providing a set of impacts to the one or more first entities, the impacts showing the changes based on a rank ordering of the magnitude of the changes.

8. The method of claim 3, wherein:
the comments and changes are received through devices other than the computer that are coupled to the computer for communication.

9. The method of claim 3, wherein:
the forecast data is received through devices other than the computer that are coupled to the computer for communication.

10. The method of claim 3, wherein:
the interface to the computer is through devices other than the computer that are coupled to the computer for communication.

11. The method of claim 1, wherein:
the method is executed by a processor in response to instructions, the instructions embodied in a machine-readable medium.

12. The method of claim 1, further comprising:
the computer analyzing the changes for largest magnitude changes, the changes specific to data entered by specific sales people; and
the computer providing a set of impacts to the specific sales people, the impacts showing the changes based on a rank ordering of magnitude of the changes.

13. The method of claim 12, further comprising:
receiving judgments from the members of the organization related to a set of data of the sales forecast information, the set of data a subset of the sales forecast information; and
changing the set of data of the forecast responsive to the judgments.

14. The method of claim 1, further comprising:
receiving requests to watch specific data of the sales forecast information; and
providing updates when specific data changes responsive to the requests to watch.

15. The method of claim 1, wherein each instance of the multi-dimensional database structure comprises an OLAP cube and the sales forecast information includes data that populates the OLAP cube, the method further comprising:
receiving a selection of data; and
generating an organization of the data for presenting different displays of the data includes shifting from selecting and organizing and displaying one aspect of the data as it is maintained in the OLAP cube to displaying a different aspect of the data as it is already maintained in the OLAP cube.

16. The method of claim 15, wherein the sales forecast information includes data that is stored with associations to customers, the method further comprising:
generating an organization of the data to display by customer to allow for a determination of which customers are increasing orders or sales, decreasing orders or sales, or experiencing short-term changes in orders or sales.

17. The method of claim 16, wherein transmitting data to display the generated particular dataset on a graphical interface device further comprises transmitting data to allow the generated particular dataset to be selected for organization and display responsive to selecting a tab marked customers.

18. The method of claim 15, the method further comprising:
for each organization, generating an organization of the data to display by specific impact, and where specific impacts are translations into human understandable English text language of changes in data as propagated through the data repository dedicated to the organization when the changes are integrated with the sales forecast information; and wherein the specific impacts are hierarchically organized to allow the drilling down to determine how the impacts came about or determine the source of the impact.

19. The method of claim 15, the method further comprising:
for each organization, generating an organization of the data to display by time updated forecast and provides summary data, with data flagged by symbols indicating changes in the forecast, and where the changes are the result of applications of post-forecast judgment or of actual changes to forecasted data based on real-time updates.

20. The method of claim 15, the method further comprising:
for each organization, generating an organization of the data to display by drill down display of a selected data set of the data repository dedicated to the organization to provide additional detail concerning region specific, sub-region-specific, part-specific, and customer-specific information.

21. The method of claim 20, wherein the display includes an add watch button that allows a user to watch a given data point for changes, including one or more of watching for changes over a certain threshold and watching for changes within a certain time period.

22. The method of claim 20, wherein the display includes a judgment interface and display that further includes a forecast value change option and forecast percentage change option, and wherein the value change option includes value unit type and value amount, and the percentage change option includes change direction increase or decrease, percentage unit type and percentage change amount.

23. The method of claim 22, the method further comprising for each organization:
receiving a judgment selection; and
entering a change; and
with the change entered, providing data to display a view of the original data, which provides a judgment indication that judgment has been applied and indicates a presence of judgment history associated with the displayed data or with data aggregated into a selected and organized displayed data.

24. The method of claim 23, further including and optional selection to drill down to the changed data and to select and display a judgment history.

25. The method of claim 24, wherein the drilling down in the judgment interface provides a further information about who entered the judgment, a type of change, and indication of who it affected, and the amount of the change.

26. The method of claim 1, wherein each multi-dimensional database structure comprises an OLAP cube.

27. The method of claim 1, wherein each multi-dimensional database structure is defined in a server computer, and the comments and changes are received from client computers different from the server computer.

28. The method of claim 1, wherein each computer comprises an analysis server computer and the multi-dimensional database structure comprises an OLAP cube implemented in the analysis server computer.

29. The method of claim 1, wherein the at least one defined time period for the sales forecast information is a period of months or a period of years.

30. The method of claim 1, wherein the at least one defined time period for the sales forecast information comprises a plurality of time periods and the sales forecast information includes a plurality of forecasts corresponding to the plurality of time periods.

31. The method of claim 30, wherein transmitting data to display further comprises transmitting data to display by time period.

32. The method of claim 31, wherein the time periods are scheduled monthly or quarterly forecast time periods.

33. The method of claim 1, the method further comprising:
for each organization, including generating an initial baseline forecast based on the sales forecast information received from the one or more first entities; and
updating the baseline forecast to generate a revised baseline forecast using the changes and comments to generate a revised forecast.

34. The method of claim 33, wherein the revised baseline forecast is generated according to one of the following time periods: yearly, quarterly, monthly, bi-weekly, weekly, or daily.

35. The method of claim 34, further including generating comparisons to selected time periods, where the selected time periods are chosen from a previous forecast, successive quarters, year-on-year comparisons, and current information versus baseline comparisons.

36. The method of claim 1, wherein the received change includes a timestamp associated with the time it is received and the applicable date or time period the change received is applicable to.

37. The method of claim 1, wherein the applicable date or time period the change received is applicable to is selected from one of a particular date and a particular future forecast.

38. The method of claim 1, wherein the transmitted data is configured to display the forecast data through the user interface with feedback as the data changes over time.

39. The method of claim 1, wherein the transmitted data is configured to display the sales forecast information in a cell format, with one or more first entities separated by row and columns devoted to identified time periods.

40. The method of claim 1, wherein the transmitted data is configured to display the sales forecast information in a graphical display forecasting layout displaying predicted values as captured by month and quarter.

41. A system for propagating information in real-time through OLAP cube database structures to reduce delays in predicting future orders or sales over defined time periods, the system comprising:
for each of multiple organizations, a dedicated instance of one of the OLAP cubes database structures and a data repository to each of the organizations;
partitions of each of the OLAP cube database structures of a computer database into at least a first partition and a second partition;
an analysis server having a processing unit and a memory coupled to the processing unit and further including the OLAP cube;
an interface device coupled for communication with the analysis server to receive for each of the multiple organizations:
forecast data;
sales forecast information including forecast numerical values for at least one time period from one or more first entities in a computer, wherein the sales forecast information received represents a baseline forecast;
comments on specific entries of the received sales forecast information from the one or more first entities, wherein the changes are received after receiving the sales forecast information from the one or more first entities;
changes of the sales forecast information from the one or more second entities in the computer after receiving the sales forecast information from the one or more first entities, the changes including time based adjustments to the forecast numerical values;
wherein the analysis server is configured to:
for each organization, store the sales forecast information in the first partition of the OLAP cube database structure of the computer database dedicated to the organization;
for each organization, update the first partition of the OLAP cube database structure of the computer database every time T1, wherein T1 is an amount of time and wherein the update includes at least data from the second partition;

for each organization, store the changes in the second partition of the OLAP cube database structure of the computer database dedicated to the organization;

for each organization, update the second partition of the OLAP cube database structure of the computer database every time T2, wherein T2 is an amount of time and T2 is less than T1 for each organization;

integrate the associated sales forecast information from the first partition, comments, and changes from the second partition into the OLAP cube within the data repository defined in the computer and dedicated to the organization;

propagate the received sales forecast information from the first partition, the received comments, and the received changes of the sales forecast information from the second partition in essentially real-time through the OLAP cube database structure dedicated to the organization by the computer to (i) associate the received comments and changes with the received sales forecast information and (ii) asynchronously update the baseline forecast with the received changes of the sales forecast information in essentially real-time;

generate a particular selected dataset and organization of the particular selected dataset from the OLAP cube database structure within the data repository including the first partition and the second partition, which are dedicated to the organization, in response to a graphical interface based query from an external requestor wherein generating the particular selected dataset includes:

aggregating data related to changes from the first partition and the second partition to appear as a single response;

analyzing the changes to determine the magnitude of each change; and providing a set of impacts to the one or more first entities, the impacts showing the changes based on the magnitude of the changes; and communicate the generated particular dataset that incorporates the integrated comments and the integrated changes to the sales forecast information to a client device having a graphical display so that the comments and changes are shown and available for review in association with the sales forecast information including the essentially real-time, asynchronously updated baseline forecast.

42. The system of claim 41, further comprising:
an identification server coupled to the analysis server.

43. The system of claim 42, further comprising:
a means for communicating remotely with the system coupled to the user interface.

44. The system of claim 42, further comprising:
a client coupled through the user interface to the analysis server and to the identification server.

45. The system of claim 41, wherein: the multi-dimensional database structure stores financial information.

46. A server computer having a processing unit and a memory coupled to the processing unit and having or coupled with a data repository and a database structure for propagating information in real-time through multi dimensional OLAP cube database structures to reduce delays in predicting future orders or sales over defined time periods, the server computer comprising:

for each of multiple organizations, a dedicated instance of one of the OLAP cubes database structures and a data repository to each of the organizations;

partitions of each of the OLAP cube database structures of a computer database into at least a first partition and a second partition;

a first input for receiving sales forecast information including forecast numerical values for at least one time period from one or more first entities in a computer, wherein the sales forecast information received represents a baseline forecast;

a second input for receiving comments on specific entries of the received sales forecast information from one or more second entities in the computer after receiving the sales forecast information from the one or more first entities;

a third input for receiving changes of the sales forecast information from the one or more second entities in the computer after receiving the sales forecast information from the one or more first entities, the changes including time based adjustments to the forecast numerical values;

code stored in the memory and executable by the processing unit for propagating information in real-time for predicting future orders or sales over defined time periods, the code is executable by the processing unit to:

for each organization, store the sales forecast information in the first partition of the OLAP cube database structure of the computer database dedicated to the organization;

for each organization, update the first partition of the OLAP cube database structure of the computer database every time T1, wherein T1 is an amount of time and wherein the update includes at least data from the second partition;

for each organization, store the changes in the second partition of the e OLAP cube database structure of the computer database dedicated to the organization;

for each organization, update the second partition of the OLAP cube database structure of the computer database every time T2, wherein T2 is an amount of time and T2 is less than T1 for each organization;

integrate the associated sales forecast information from the first partition, comments, and changes from the second partition into the OLAP cube database structure within the data repository defined in the computer and dedicated to the organization;

propagate the received sales forecast information from the first partition, the received comments, and the received changes of the sales forecast information from the second partition in essentially real-time through the OLAP cube database structure dedicated to the organization by the computer to (i) associate the received comments and changes with the received sales forecast information and (ii) asynchronously update the baseline forecast with the received changes of the sales forecast information in essentially real-time to reduce delays in predicting future orders or sales over defined time periods;

generate a particular selected dataset and organization of the particular selected dataset from the OLAP cube database structure within the data repository including the first partition and the second partition, which are dedicated to the organization, in response to a graphical interface based query from an external requestor wherein generating the particular selected dataset includes:
aggregating data related to changes from the first partition and the second partition to appear as a single response;
analyzing the changes to determine the magnitude of each change; and
providing a set of impacts to the one or more first entities, the impacts showing the changes based on the magnitude of the changes; and
transmit data to display the generated particular dataset on a graphical interface device that incorporates the integrated comments and the integrated changes to the sales forecast information so that the comments changes are shown and available for review in association with the sales forecast information including the essentially real-time, asynchronously updated baseline forecast.

47. The server computer of claim 46, further comprising for each of the organizations, a communications link for communicating the generated particular dataset that incorporates the integrated comments and the integrated changes to the forecast to a client device having a graphical display so that the comments and changes are shown in association with the sales forecast information and available for review.

48. The server computer of claim 46, wherein propagation of the received sales forecast information, the received comments, and the received changes of the sales forecast information occurs in essentially real-time.

* * * * *